(12) United States Patent
Kato et al.

(10) Patent No.: US 9,716,834 B2
(45) Date of Patent: Jul. 25, 2017

(54) IMAGE DISPLAY DEVICE AND IMAGE PROCESSING DEVICE

(71) Applicant: Panasonic Intellectual Property Management Co., Ltd., Osaka (JP)

(72) Inventors: Yumiko Kato, Osaka (JP); Jun Ozawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 63 days.

(21) Appl. No.: 14/952,893

(22) Filed: Nov. 25, 2015

(65) Prior Publication Data
US 2016/0344934 A1 Nov. 24, 2016

(30) Foreign Application Priority Data
May 20, 2015 (JP) .................. 2015-103224

(51) Int. Cl.
*H04N 5/232* (2006.01)
*G06F 3/01* (2006.01)
*G09G 5/00* (2006.01)

(52) U.S. Cl.
CPC ......... *H04N 5/23264* (2013.01); *G06F 3/013* (2013.01); *G09G 5/001* (2013.01);
(Continued)

(58) Field of Classification Search
CPC .......................... H04N 5/23293; H04N 5/3698
(Continued)

(56) References Cited

U.S. PATENT DOCUMENTS

| 9,300,942 B2* | 3/2016 | Zeng .................. H04N 13/0022 |
| 2006/0098087 A1 | 5/2006 | Brandt et al. |

(Continued)

FOREIGN PATENT DOCUMENTS

JP 11-266389 9/1999

OTHER PUBLICATIONS

Atsushi Komatsuzaki et al., "The Neurology of Eye Movements" Igaku-Shoin Ltd., p. 8, 1985.
(Continued)

*Primary Examiner* — Anthony J Daniels
(74) *Attorney, Agent, or Firm* — McDermott Will & Emery LLP

(57) ABSTRACT

An image display device includes: an eyeball angular velocity calculation unit that calculates an eyeball angular velocity of a viewer viewing an object by an equation: eyeball angular velocity=(2 arctan(s/2d))/t, using a movement distance moved by the object included in a moving image between two sequential frames on a screen, a time interval between the two sequential frames, and a viewing distance, a distance between the viewer and the screen; a determination unit that determines whether the calculated eyeball angular velocity is not less than a lower limit of an eyeball angular velocity in a saccadic eye movement; an image processor that (a) stops the moving image or replaces the moving image with a single color image when it is determined that the calculated eyeball angular velocity is not less than the lower limit, (b) does not stop the moving image and does not replace the moving image with the single color image when it is determined that the eyeball angular velocity is less than the lower limit.

9 Claims, 34 Drawing Sheets

(52) U.S. Cl.
CPC ..... *H04N 5/232* (2013.01); *G09G 2320/0247* (2013.01); *G09G 2320/0261* (2013.01); *G09G 2320/103* (2013.01); *G09G 2320/106* (2013.01)

(58) Field of Classification Search
USPC .................................................. 348/333.01
See application file for complete search history.

(56) References Cited

U.S. PATENT DOCUMENTS

| | | | | |
|---|---|---|---|---|
| 2007/0159470 A1* | 7/2007 | Jeng | ..................... | G06F 1/3218 345/204 |
| 2008/0188777 A1* | 8/2008 | Bedziouk | ................. | A61B 5/16 600/595 |
| 2014/0228704 A1* | 8/2014 | Seassau | ................. | A61B 3/113 600/558 |
| 2015/0338915 A1* | 11/2015 | Publicover | ......... | H04N 5/23229 345/633 |

OTHER PUBLICATIONS

Masatoshi Okutomi et al., "Digital Imaging Processing" Computer Graphic Arts Society (CG-ARTS), pp. 243-245, 2009.
The Extended European Search Report dated Sep. 23, 2016 for the related European Patent Application No. 15196479.8.

* cited by examiner

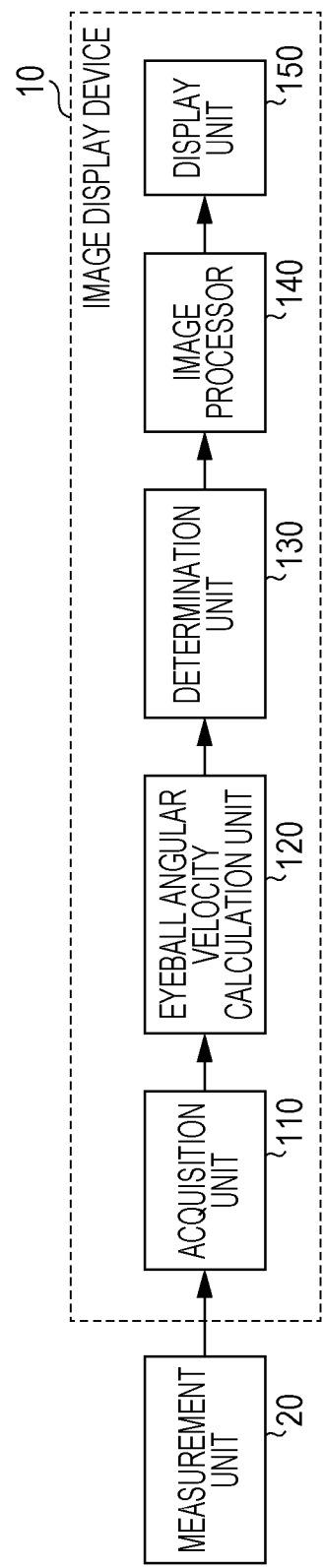

FIG. 18

| SCREEN SIZE | | | VIEWING DISTANCE |
|---|---|---|---|
| INCH | VERTICAL LENGTH | HORIZONTAL LENGTH | |
| 32-INCH | 398 mm | 707 mm | 1200 mm |
| 40-INCH | 498 mm | 884 mm | 1500 mm |
| 48-INCH | 597 mm | 1060 mm | 1800 mm |

| RATIO OF DISPLAY SCREEN TO VISUAL FIELD | THRESHOLD ADJUSTMENT RATIO |
|---|---|
| ⋮ | ⋮ |
| 0.2 TO 0.25 | 1.2 |
| 0.25 TO 0.3 | 1.1 |
| 0.3 OR MORE | 1.0 |

FIG. 26

| SCREEN SIZE | | | | VIEWING DISTANCE |
|---|---|---|---|---|
| NUMBER OF VERTICAL PIXELS | NUMBER OF HORIZONTAL PIXELS | VERTICAL LENGTH | HORIZONTAL LENGTH | |
| ⋮ | ⋮ | ⋮ | ⋮ | ⋮ |
| 1600 | 900 | 249 mm | 443 mm | 750 mm |
| 1920 | 1080 | 274 mm | 487 mm | 820 mm |
| 1920 | 1080 | 324 mm | 576 mm | 970 mm |
| ⋮ | ⋮ | ⋮ | ⋮ | ⋮ |

```
⋮
<stop motion> more than 900 </stop motion>
       <start>00:36:25.341</start>
       <end>00:36:27.101</end>
⋮
<stop motion> more than 700 </stop motion>
       <start>01:11:09.002</start>
       <end>01:11:09.128</end>
⋮
```

FIG. 30

| FRAME SECTION | TYPE OF OPERATION | AMOUNT OF MOVEMENT |
|---|---|---|
| ⋮ | ⋮ | ⋮ |
| 23452469 – 23452520 | UPPER-RIGHT 16-DEGREE ROTATION | 3 DEGREES |
| 23452521 – 23452816 | UPPER-RIGHT 13-DEGREE ROTATION | 4 DEGREES |
| 23452817 – 23453011 | UPPER-RIGHT 9-DEGREE ROTATION | 6 DEGREES |
| ⋮ | ⋮ | ⋮ |

IMAGE DISPLAY DEVICE AND IMAGE PROCESSING DEVICE

BACKGROUND

1. Technical Field

The present disclosure relates to an image display device that displays a moving image and an image processing device that processes the moving image.

2. Description of the Related Art

While viewing a moving image, a user may suffer from visually induced motion sickness or eye fatigue. Visually induced motion sickness or eye fatigue is believed to result from a discrepancy between a movement of an image and a posture or movement of the user, or from a characteristic such as a change in brightness or contrast of the moving image. For example, hand-held camera shake at a time of capturing of a moving image is well known as a cause of visually induced motion sickness.

In particular, a moving image captured through, for example, magnification of a small object, and a moving image captured by zooming in on a distant object have a lot of camera shake due to magnification processing at a time of capturing. Accordingly, the moving image captured through magnification or zooming is likely to cause visually induced motion sickness.

In contrast, for example, PTL 1 discloses an image pickup device for compensating a moving image that is determined to include a camera shake. Specifically, the image pickup device described in PTL 1 discriminates the camera shake from a shake caused by intentional panning or tilting by a camera operator, depending on an effective image circle diameter of a variable power imaging optical system, and compensates the moving image that is determined to include the camera shake.

CITATION LIST

Patent Literature

PTL 1: Unexamined Japanese Patent Publication No. H11-266389

Non-Patent Literatures

NPL 1: Gankyu Undono Shinkeigaku (*The Neurology of Eye Movements*) First Edition by Atsushi Komatsuzaki, Yoshikazu Shinoda, Toshio Maruo, p 8, 1985, published by IGAKU-SHOIN Ltd.

NPL 2: Digital Gazou Shori (*Digital Imaging Processing*) Second Edition by Masatoshi Okutomi, p 243, published by The Computer Graphic Arts Society (CG-ARTS)

The above-described conventional image pickup device, which compensates the moving image determined to include the camera shake, is capable of alleviating visually induced motion sickness and eye fatigue of a user resulting from the camera shake. However, visually induced motion sickness and eye fatigue of the user occur not only from the camera shake but also based on a factor different from the camera shake. Accordingly, the above-described conventional image pickup device fails to alleviate visually induced motion sickness and eye fatigue of the user in some cases.

SUMMARY

One non-limiting and embodiment has been made to solve such problems and provides an image display device and image processing device capable of alleviating visually induced motion sickness and eye fatigue of a user.

In one general aspect, the techniques disclosed here feature an image display device comprises:

a display and circuitry which, in operation:

acquires (i) a size of a screen a viewer views, (ii) a movement distance moved by at least one object included in a moving image including a plurality of frames between sequential two of the frames on the screen that has the size, (iii) a time interval between the sequential two of the frames, and (iv) a viewing distance that is a distance between the viewer and the screen;

calculates an angular velocity of an eyeball of the viewer viewing the at least one object as an eyeball angular velocity by an equation:

$$\text{eyeball angular velocity} = (2\ \arctan(s/2d))/t,$$

where the movement distance is s, the time interval is t, and the viewing distance is d;

determines whether the calculated eyeball angular velocity is equal to or greater than a lower limit of an eyeball angular velocity in a saccadic eye movement;

stops the moving image or replaces the moving image with a single color image, in a case where the calculated eyeball angular velocity is determined to be equal to or greater than the lower limit of the eyeball angular velocity in the saccadic eye movement, wherein the display unit that displays the moving image stopped by or the single color image replaced by the circuitry.

These comprehensive or specific aspects may be implemented as a system, a method, an integrated circuit, a computer program, a computer-readable storage medium such as a CD-ROM, or any selective combination thereof.

The present disclosure is capable of alleviating visually induced motion sickness and eye fatigue of a user.

BRIEF DESCRIPTION OF THE DRAWINGS

FIG. 1 is a block diagram illustrating an example of a configuration of an image display device according to a first embodiment;

FIG. 18 is a diagram illustrating an example of a distance correspondence table that indicates a correspondence between a screen size and a viewing distance according to the second variation of the second embodiment;

FIG. 21 is a diagram illustrating an example of a threshold adjustment table indicating a correspondence between a ratio of the screen size to the size of the visual field of the viewer and an adjustment ratio of a threshold angular velocity according to the third variation of the second embodiment;

FIG. 26 is a diagram illustrating an example of the distance correspondence table that indicates a correspondence between the screen size and the viewing distance according to the third embodiment;

FIG. 27 is a diagram illustrating an example of tag information according to the third embodiment;

FIG. 30 is a diagram illustrating an example of history information on a camera operation according to the fourth embodiment;

DETAILED DESCRIPTION

Figure 2A:
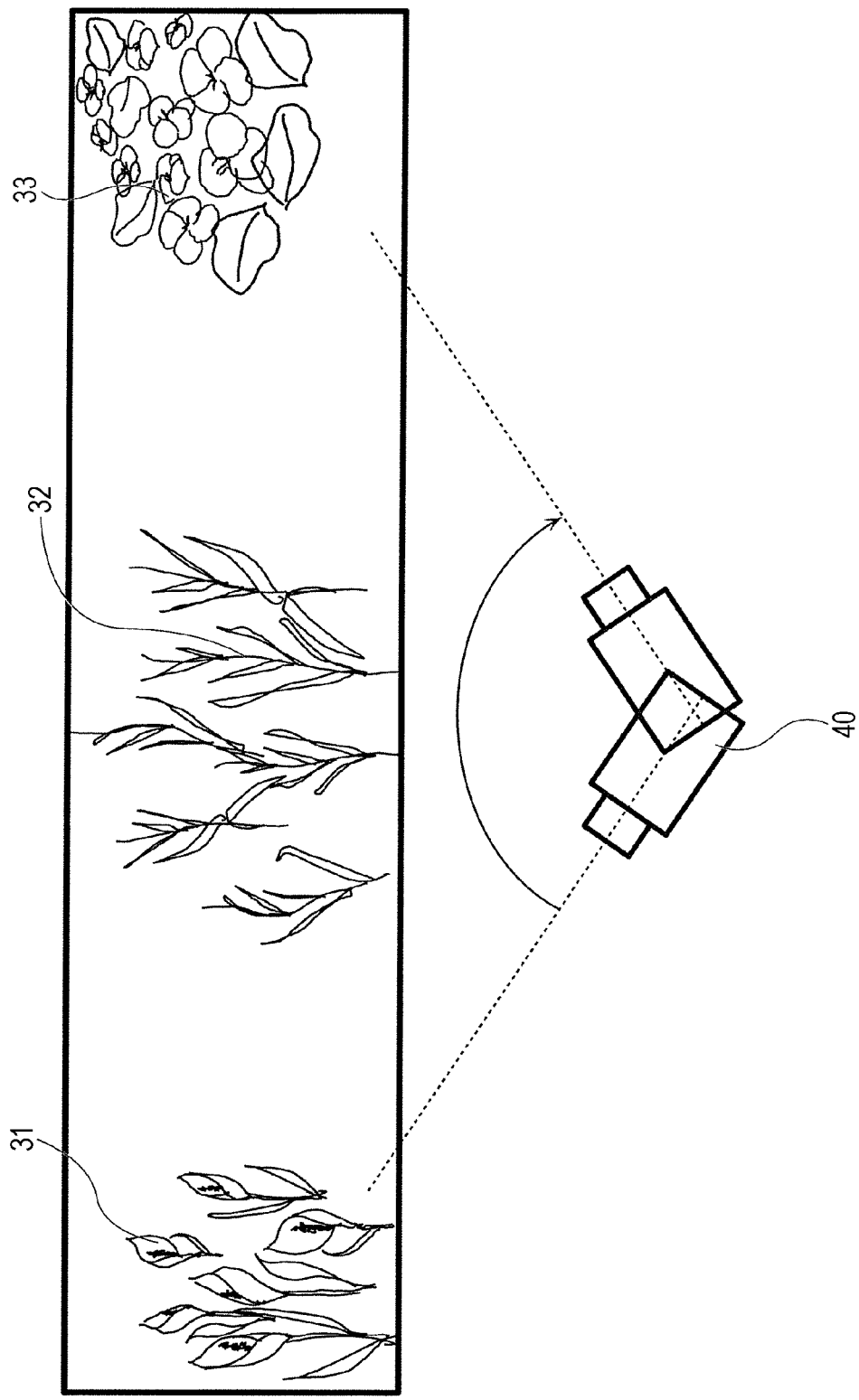
FIG. 2A is a diagram schematically illustrating how a camera captures an image of an unmoving object while panning.

Underlying Knowledge Forming Basis of the Present Disclosure

The present inventors have found out that the following problem occurs regarding the conventional imaging device described in the paragraph of "BACKGROUND".

Visually induced motion sickness and eye fatigue occur not only depending on a characteristic of a moving image but also depending on a characteristic of human vision. For example, visually induced motion sickness occurs also by a motion blur when an eyeball follows the moving image. The motion blur refers to a state where a pixel in a closely watched portion of an image is perceived to be fogged by an eye of a user following the moving image (an object included).

Examples of a method for alleviating visually induced motion sickness and eye fatigue include a technique to fix a screen by camera shake compensation in order to inhibit a shake of the screen repeated like the shake of a hand, as described in PTL 1. In addition, there is a technique to prevent the motion blur for the moving image followed by the eyeball of the user.

However, if an image moves at a velocity the eyeball of the user cannot follow, the image blurs by the motion. Accordingly, the user watches a degraded image that indicates only a direction of the motion.

A human being sometimes moves a visual point abruptly during daily life. For example, while driving an automobile, a human being moves the visual point to a traffic signal, a pedestrian, an oncoming car, a traffic sign, etc. quickly. Such eye movement is called a saccadic eye movement (Saccade).

At the time, scenery during movement of the visual point is "invisible" to the human being. That is, although a light stimulus of the scenery flowing quickly by the saccadic eye movement is input into a retina, the human being recognizes only input to the retina at a time when the visual point is fixed, before and after the visual point is moved. That is, the flowing blurred scenery is not perceived by the human being. Specifically, in a visual system inside the human brain, during the saccadic eye movement, a threshold of whether to perceive a visual input is elevated, and vision is inhibited (refer to NPL 1).

A state where the image moves at a velocity that cannot be followed by the eyeball during viewing of the moving image, that is, a state where the image moves at a velocity corresponding to the saccadic eye movement means a state where the visual system in the brain originally should be inhibited in the human visual system. However, while viewing the moving image, the visual system in the brain is not inhibited because the user is not moving the eyeball, and a retinal image that originally should not be perceived is activating the visual system in the brain. Accordingly, abrupt movement of the image can cause visually induced motion sickness and eye fatigue.

For example, particularly in a moving image captured while magnified or zoomed, slight panning or tilting during capturing appears as abrupt large motion on the screen. However, the above-described camera shake compensation technique does not compensate these problems. The technique to prevent the motion blur corresponding to a following velocity of the eyeball of the user does not support motion of the image at the velocity corresponding to the saccadic eye movement.

Thus, there is a problem that the abrupt motion of the image causes the user who views the moving image to suffer from visually induced motion sickness or eye fatigue.

In order to solve such problems, an image display device according to one aspect of the present disclosure includes:
a display and
circuitry which, in operation:
acquires (i) a size of a screen a viewer views, (ii) a movement distance moved by at least one object included in a moving image including a plurality of frames between sequential two of the frames on the screen that has the size, (iii) a time interval between the sequential two of the frames, and (iv) a viewing distance that is a distance between the viewer and the screen;
calculates an angular velocity of an eyeball of the viewer viewing the at least one object as an eyeball angular velocity by an equation:

eyeball angular velocity=(2 arctan($s/2d$))/$t$, where the movement distance is s, the time interval is t, and the viewing distance is d;
determines whether the calculated eyeball angular velocity is equal to or greater than a lower limit of an eyeball angular velocity in a saccadic eye movement;
stops the moving image or replaces the moving image with a single color image, in a case where the calculated eyeball angular velocity is determined to be equal to or greater than the lower limit of the eyeball angular velocity in the saccadic eye movement,
wherein
the display unit that displays the moving image stopped by or the single color image replaced by the circuitry.

Needless to say, the circuitry does not stop the moving image and does not replace the moving image with the single color image, in a case where the calculated eyeball angular velocity is determined to be less than the lower limit of the eyeball angular velocity in the saccadic eye movement.

According to the present aspect, in a case where it is determined that the eyeball angular velocity of the viewer during viewing of the object is equal to or greater than a threshold angular velocity that is the lower limit of the eyeball angular velocity in the saccadic eye movement, stop processing or replacement processing is performed to display the processed moving image. That is, in a case where the object in the moving image moves at a velocity corresponding to the saccadic eye movement and there is a possibility that a light stimulus that the viewer originally should not perceive is input, the moving image to be displayed on the screen is stopped, or the moving image is replaced with the single color image.

The case where the eyeball angular velocity of the viewer during viewing of the object included in the moving image is equal to or greater than the threshold angular velocity may occur, for example, when the camera that captures the image of the object changes an image-capturing direction of the camera rapidly in order to capture an image of another object. In such a case, an article captured while the camera changes its image-capturing object from one object to another object, that is, an article, such as scenery, captured by the camera during a period from the object before the change to another object is information unnecessary for the viewer in many cases. Therefore, displaying of these pieces of unnecessary information to the viewer by, for example, slow playback of the moving image is obtrusive to the viewer in many cases, and further leads to eye fatigue of the viewer.

Therefore, in the present aspect, in order to avoid displaying unnecessary information to the viewer, stop processing for stopping the moving image or replacement processing for replacing the moving image with a single color image is performed. This allows the viewer to view necessary information in the moving image efficiently. Even in a case where a moving image including a light stimulus that causes saccadic eye movement of the eyeball is displayed on the screen, the stopped image or single color image of the moving image is displayed on the screen. Accordingly, it is unlikely that the viewer receives the light stimulus that causes the viewer to suffer from the saccadic eye movement. This results in alleviation of visually induced motion sickness and eye fatigue of the viewer.

According to the present aspect, stop processing or replacement processing is performed only in a case where it is determined that the eyeball angular velocity is equal to or greater than the threshold angular velocity. This makes it possible to perform stop processing or replacement processing only in the case where the viewer is likely to suffer from visually induced motion sickness and eye fatigue. In a case where the viewer is unlikely to suffer from visually induced motion sickness and eye fatigue, the moving image may be displayed to the viewer as it is. Therefore, this makes it possible to shorten a stop period of the moving image (that is, a period during which the moving image is not displayed), and to inhibit the stop period from obstructing viewing by the viewer.

According to the present aspect, a size and viewing distance of the screen that displays the moving image are acquired to calculate the eyeball angular velocity by using the acquired viewing distance. Therefore, the eyeball angular velocity can be calculated accurately, and determination of the eyeball angular velocity can be made accurately.

For example, the moving image includes the at least one object comprising a plurality of objects. The circuitry calculates the eyeball angular velocities of the viewer with respect to the plurality of respective objects. The circuitry stops the moving image or replaces the moving image with the single color image, in a case where all of the calculated eyeball angular velocities are determined to be equal to or greater than the lower limit of the eyeball angular velocity in the saccadic eye movement.

Thus, in a case where at least one of the plurality of eyeball angular velocities corresponding to the plurality of objects is less than the lower limit of the eyeball angular velocity, the image processor performs neither stop processing nor replacement processing. In this case, the viewer is likely to be visually following a specific object, and is unlikely to suffer from visually induced motion sickness, etc. That is, the moving image that the viewer is viewing is a following moving image. In a case where the moving image is a following moving image, failure to perform stop processing or replacement processing may inhibit obstruction to viewing of the specific object by the viewer.

According to the present aspect, in a case where all of the plurality of eyeball angular velocities are equal to or greater than the lower limit of the eyeball angular velocity, stop processing or replacement processing is performed. This makes it possible to perform stop processing or replacement processing only in a case where the viewer is likely to suffer from visually induced motion sickness and eye fatigue, while inhibiting obstruction to viewing by the viewer.

For example, in the image display device according to one aspect of the present disclosure, the circuitry determines a motion vector that indicates an amount of movement and a direction of movement of the at least one object between the sequential two of the frames. The circuitry calculates a size of the motion vector on the screen as the movement distance, based on the size of the screen.

The image display device according to the present aspect calculates the movement distance of the object and the eyeball angular velocity corresponding to the movement distance, based on the motion vector between two frames included in the moving image. This makes it possible to determine whether the eyeball angular velocity is equal to or greater than the threshold angular velocity without observing movement of the eyeball of the viewer. Therefore, it is not necessary to use a device such as a camera or a sensor for observing movement of the eyeball of the viewer, and a simple configuration may alleviate visually induced motion sickness and eye fatigue of the viewer.

For example, in the image display device according to one aspect of the present disclosure, the circuitry divides the image included in the sequential two of the frames into a plurality of blocks. The circuitry calculates a degree of difference between each of a plurality of first blocks included in a first frame of the sequential two of the frames, and each of a plurality of second blocks included in a second frame of the sequential two of the frames. The circuitry determines a vector that connects a center of gravity of each of the first blocks and a center of gravity of each of the second blocks in which the calculated degree of difference becomes smallest, as the motion vector.

This allows accurate calculation of the motion vector.

For example, in the image display device according to one aspect of the present disclosure, the circuitry divides the image included in the sequential two of the frames into the plurality of blocks so that a number of blocks may become larger in a central portion of each of the frames than in a peripheral portion of each of the frames.

Since a movable body followed by the viewer is often positioned in the central portion of the frame, providing larger number of blocks in the central portion of the frame than in the peripheral portion of the frame allows calculation of a large number of motion vectors in the central portion. This is effective for following a small movable body, for example, and provides more accurate determination of the eyeball angular velocity.

For example, in the image display device according to one aspect of the present disclosure, when the motion vectors of respective two of the blocks included in one of the sequential two of the frames are similar, the circuitry combines the two of the blocks into one block.

Accordingly, combining the two blocks into one block may reduce a number of blocks to be processed. Therefore, an amount of processing needed for calculation of the eyeball angular velocity may be reduced.

For example, a method for displaying an image on a display according to one aspect of the present disclosure includes: acquiring (i) a size of a screen a viewer views, (ii) a movement distance moved by an object included in a moving image including a plurality of frames between sequential two of the frames on the screen that has the size, (iii) a time interval between the sequential two of the frames, and (iv) a viewing distance that is a distance between the viewer and the screen; calculating an angular velocity of an eyeball of the viewer viewing the object as an eyeball angular velocity by an equation: eyeball angular velocity=(2 arctan(s/2d))/t, where the movement distance is s, the time interval is t, and the viewing distance is d; determining whether the calculated eyeball angular velocity is equal to or greater than a lower limit of an eyeball angular velocity in a saccadic eye movement; determining whether the calculated eyeball angular velocity is equal to or greater than a lower limit of an eyeball angular velocity in a saccadic eye movement; adding, to the moving image, tag information for stopping the moving image or for replacing the moving image with a single color image, in a case where the calculated eyeball angular velocity is determined to be equal to or greater than the lower limit of the eyeball angular velocity in the saccadic eye movement; and outputting the moving image which the tag information has been added to the display.

Accordingly, in a case where the eyeball angular velocity becomes equal to or greater than the threshold angular velocity, tag information is added to the moving image for causing stop processing or replacement processing to be performed. Thus, based on the tag information, the image display device may perform stop processing or replacement processing when displaying the moving image. In this way, it is not necessary to perform determination processing, etc. for each display of the moving image, and the amount of processing in display of the moving image may be reduced.

These comprehensive or specific aspects may be implemented as a system, a method, an integrated circuit, a computer program, a computer-readable storage medium such as a CD-ROM, or any selective combination thereof.

Hereinafter, the image display device and image processing device according to one aspect of the present disclosure will be specifically described with reference to the drawings.

It is to be noted that all of the embodiments to be described below indicate comprehensive or specific examples. Numerical values, shapes, materials, elements, arranged positions and connection forms of the elements, steps, and order of the steps indicated in the following embodiments are an example, and are not intended to limit the present disclosure. Also, among the elements described in the following embodiments, elements that are not described in an independent claim which represents the highest concept are described as optional elements.

FIRST EMBODIMENT

An image display device according to a first embodiment calculates an eyeball angular velocity from (i) a size of a screen a viewer views, (ii) movement distance s moved by an object included in a moving image including a plurality of frames on a screen having the above-described size between two sequential frames, (iii) time interval t between the two sequential frames, and (iv) viewing distance d between the viewer and the screen. The image display device determines whether the calculated eyeball angular velocity is equal to or greater than a lower limit of the eyeball angular velocity in a saccadic eye movement (hereinafter described as "threshold angular velocity"), and displays the moving image that undergoes image processing based on determination results. Specifically, if the angular velocity of rotational movement of the eyeball when the viewer views the object in the moving image is equal to or greater than the lower limit of the angular velocity of the saccadic eye movement, the image display device according to the present embodiment performs stop processing for stopping the moving image or replacement processing for replacing the moving image with a single color image.

Configuration of the Image Display Device

First, the image display device according to the first embodiment will be described with reference to FIG. 1. FIG. 1 is a block diagram illustrating an example of a configuration of image display device 10 according to the present embodiment.

Image display device 10 according to the present embodiment determines whether to perform processing on the moving image based on the movement distance of the object included in the moving image on the screen, the movement distance being measured by measurement unit 20. The moving image includes two or more frames. Each of the frames is a still image.

Measurement unit 20 measures the movement distance of the object included in the moving image displayed on the screen. The movement distance is a distance moved by the object on the screen between the two sequential frames. For example, measurement unit 20 calculates the distance that the object included in the moving image moves on the screen during a predetermined period of time as the movement distance of the object, by image processing such as block matching. The predetermined period of time is specifically a time interval between the two sequential frames. That is, the predetermined period of time is a reciprocal of a frame rate of the moving image. The calculated movement distance is output to image display device 10.

The object is a body included in the moving image, and is a body that moves as generally one body in the moving image, for example. Specifically, the object is a group of pixels that have substantially identical motion vectors in the moving image.

For example, the object is an image that indicates a predetermined photographic subject to be captured by a camera. For example, the photographic subject is a movable body, such as a robot and a human being, and a background. That is, the object is the predetermined movable body and background in the moving image, or an overall image including the movable body and the background. For example, in a case where the camera captures the image of the movable body, when the movable body does not move, the object is the overall image. Alternatively, when the movable body moves, the object is the movable body or the background.

Figure 2B:
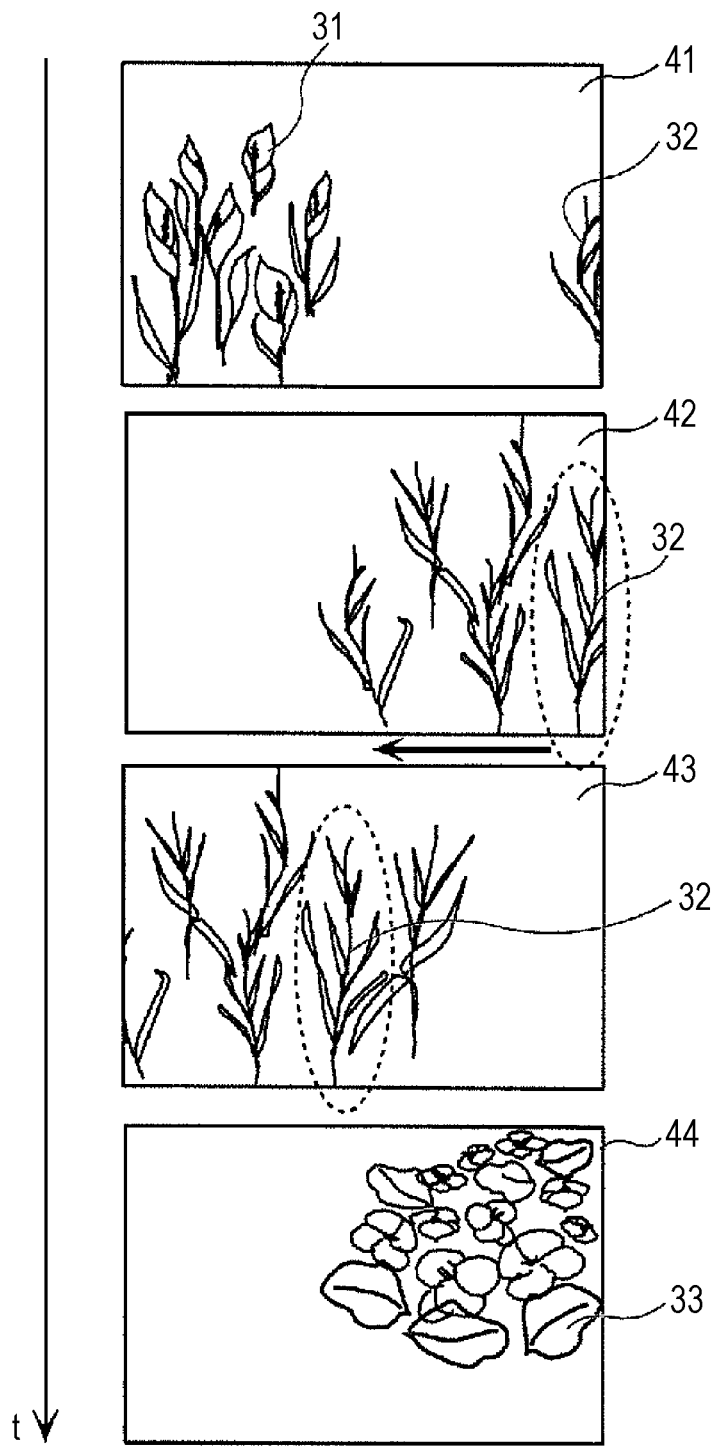
FIG. 2B is a diagram illustrating a plurality of frames included in a moving image captured by the camera illustrated in FIG. 2A.

With reference to FIG. 2A and FIG. 2B, the following schematically describes a case where, even if there is no moving object, all the objects included in the moving image move as generally one body, by the camera that captures the moving image panning greatly.

FIG. 2A is a diagram schematically illustrating how camera 40 captures an unmoving object while panning. FIG. 2B is a diagram illustrating the plurality of frames 41 to 44 included in the moving image captured by camera 40 illustrated in FIG. 2A.

FIG. 2A illustrates scenery including flower 31 on a left side, grass 32 in front, and flower 33 of a different type from the left flower on a right side, viewed from camera 40. Camera 40, which is capturing the image of left flower 31, pans rightward greatly, and captures the image of right flower 33.

FIG. 2B schematically illustrates a case where frames 41 to 44 included in the moving image captured while camera 40 is moving as illustrated in FIG. 2A are sequentially placed on a time-series basis. The image captured by camera 40 moves from left flower 31 to right flower 33 abruptly. At this time, grass 32 that lies between both flowers 31 and 33 moves from right to left abruptly, contrary to the motion of camera 40 from left to right.

Measurement unit 20 measures a velocity of such movement of the object on the screen. The velocity of movement is the movement distance of the object on the screen between two adjacent frames.

In frame 42 and frame 43 illustrated in FIG. 2B, grass 32 on a right edge of the screen in frame 42 moves to a center-left position of the screen in frame 43. When display unit 150 is a 40-inch display measuring approximately 88 cm wide, movement distance s of the object (for example, grass 32) on the screen in frame 42 and frame 43 is approximately 44 cm/frame, which is approximately ½ of the screen width.

When the moving image is recorded at the frame rate of 30 Hz, time interval t between the two adjacent frames is approximately 33 ms (=1 second/30).

As illustrated in FIG. 1, image display device 10 includes acquisition unit 110, eyeball angular velocity calculation unit 120, determination unit 130, image processor 140, and display unit 150.

Acquisition unit 110 acquires the size of the screen the viewer views. For example, acquisition unit 110 acquires the size of the screen of display unit 150. Acquisition unit 110 further acquires movement distance s moved by the object included in the moving image including the plurality of frames, between the two sequential frames on the screen that has the above size. For example, acquisition unit 110 acquires movement distance s measured by measurement unit 20.

Acquisition unit 110 further acquires time interval t between the two sequential frames. For example, acquisition unit 110 acquires time interval t by calculating a reciprocal of the frame rate of the moving image. Acquisition unit 110 acquires viewing distance d, which is the distance between the viewer and the screen. For example, acquisition unit 110 acquires viewing distance d that is input by the viewer via an unillustrated input section.

Eyeball angular velocity calculation unit 120 calculates the eyeball angular velocity by using the screen size, movement distance s, time interval t, and viewing distance d acquired by acquisition unit 110. The eyeball angular velocity is an angular velocity of the eyeball of the viewer when the viewer views the object that moves on the screen.

Determination unit 130 determines whether the eyeball angular velocity is equal to or greater than the threshold angular velocity. The threshold angular velocity is the lower limit of the angular velocity in the saccadic eye movement. The threshold angular velocity is, for example, 350 degrees/second. For example, when the viewer views the object included in the moving image displayed on display unit 150, determination unit 130 determines whether the eyeball angular velocity of the viewer calculated by eyeball angular velocity calculation unit 120 is equal to or greater than the threshold angular velocity.

Here, the eyeball angular velocity and the threshold angular velocity are expressed as an angular velocity of a rotational movement around the eyeball. The angular velocity is a rotation angle around the eyeball in a predetermined period of time. The predetermined period of time is, for example, a time interval between the two sequential frames, that is, a one-frame period of the moving image.

Figure 3:
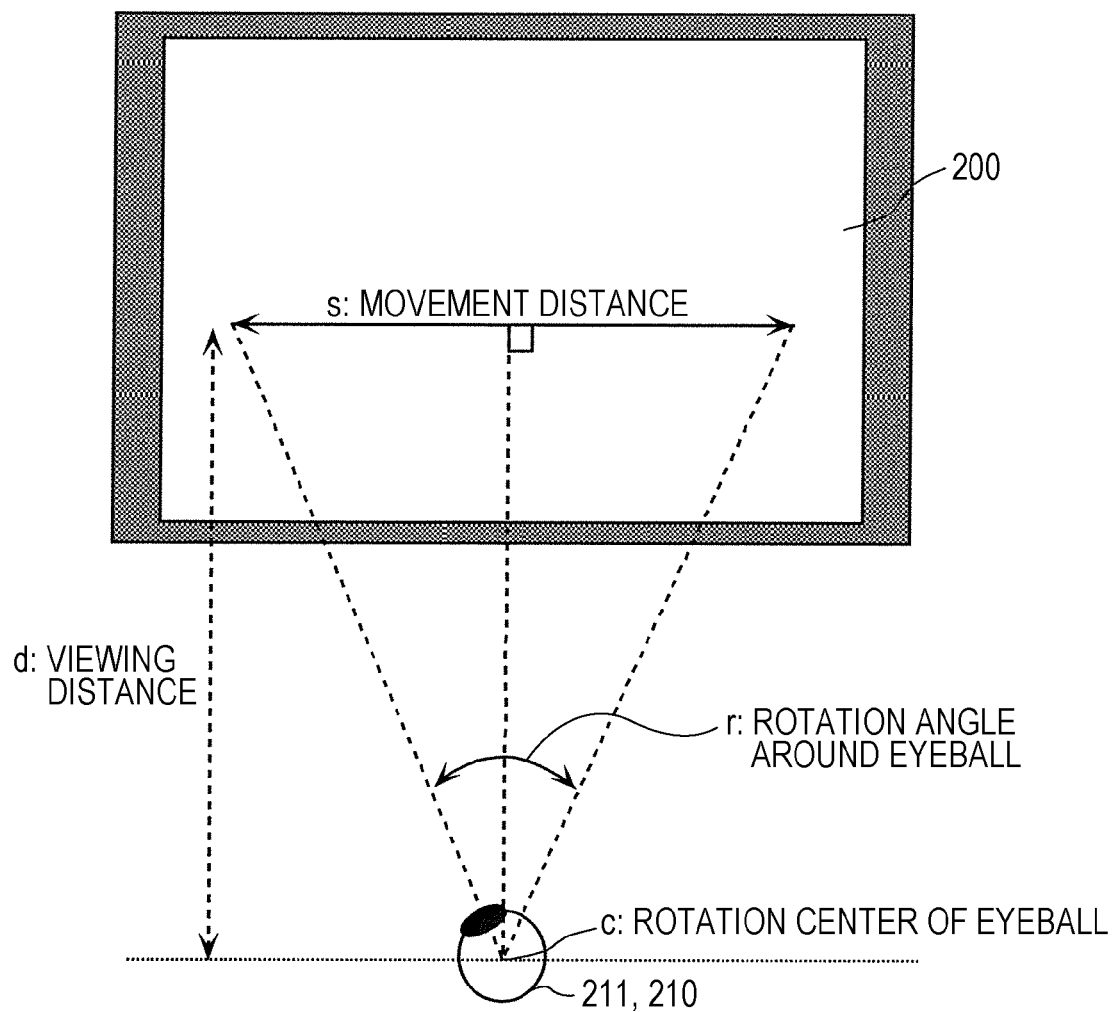
FIG. 3 is a schematic diagram illustrating a correspondence between a movement distance of the object on a screen and a rotation angle around an eyeball of a viewer.

The angular velocity of the rotational movement of the eyeball is a rotation angle of the eyeball per unit time, and is expressed by angle/second. FIG. 3 is a schematic diagram illustrating a correspondence between movement distance s of the object on screen 200 and rotation angle r around the eyeball of the viewer.

Determination unit 130 determines whether the calculated eyeball angular velocity is equal to or greater than the threshold angular velocity at predetermined time intervals. That is, determination unit 130 outputs the determination results at predetermined time intervals.

Hereinafter, specific processing of eyeball angular velocity calculation unit 120 and determination unit 130 will be described.

As illustrated in FIG. 3, it is assumed that the movement distance of the object on screen 200 is s. It is assumed that the distance from screen 200 to viewer 210 (viewing distance) is d.

It is assumed here that eyeball 211 of viewer 210 is on a straight line that passes through a horizontal center of screen 200 and that is orthogonal to screen 200. It is also assumed that movement distance s is a bilaterally symmetrical line segment relative to a central point of a horizontal direction of the screen. Therefore, eyeball 211 of viewer 210 is on a plane that is orthogonal to screen 200 and that includes a line segment that represents movement distance s.

It is assumed that eyeball center rotation angle r is an angle made by a straight line drawn from rotation center c of eyeball 211 of viewer 210 to a first end (left end) of a line segment that represents movement distance s, and a straight line drawn from rotation center c of eyeball 211 to a second end (right end) of the line segment that represents movement distance s. Eyeball center rotation angle r is a rotation angle formed by viewer 210 positioned in front of screen 200 following a motion of the object corresponding to movement distance s with eyeball 211 when the object is displayed near a center of screen 200.

At this time, there is a relationship of [Equation 1] below among movement distance s, viewing distance d, and eyeball center rotation angle r $$\tan(r/2)=(s/2)/d \quad \text{[Equation 1]}$$

Accordingly, eyeball center rotation angle r is expressed by [Equations 2] below.

$$r=2 \arctan(s/2d) \quad \text{[Equation 2]}$$

Furthermore, eyeball angular velocity calculation unit 120 calculates the angular velocity of the eyeball following the motion of the object by dividing eyeball center rotation angle r by time interval t of two frames used for calculation of the motion vectors. Specifically, by dividing eyeball center rotation angle r by the one-frame period, eyeball angular velocity calculation unit 120 calculates the angular velocity of the eyeball movement when the viewer follows the motion of the object between an object frame and a next frame, that is, the eyeball angular velocity.

As described above, when screen 200 of FIG. 3 has a 40-inch display, the width of the screen is 88.39 cm, and a vertical length is 49.78 cm. Since the object displayed on screen 200 (for example, grass 32) moves ½ of the screen width in one-frame period between frame 42 and frame 43 illustrated in FIG. 2B, movement distance s is approximately 44 cm/frame.

Accordingly, eyeball center rotation angle r of viewer 210 corresponding to movement distance s on screen 200 is calculated by [Equation 2].

It is assumed here that viewer 210 maintains, as an example, the viewing distance three times the vertical length of the screen, which is a standard viewing distance. The vertical length of the screen of the 40-inch display is 49.78 cm, and three times thereof is 149.34 cm. For example, when the viewing distance d is approximately 150 cm, eyeball center rotation angle r is approximately 17 degrees (=2× arctan (44 cm/2×150 cm)) from [Equation 2].

When the moving image is recorded by the frame rate of 30 Hz, time interval t between the two sequential frames is approximately 33 ms. Accordingly, the eyeball angular velocity is 515 degrees/second (=17 degrees/0.033 seconds), which exceeds the threshold angular velocity of 350 degrees/second.

Thus, in the present disclosure, the eyeball angular velocity is calculated by [Equation 3] from three parameters, movement distance s, time interval t, and viewing distance d.

$$\text{eyeball angular velocity}=(2 \arctan(s/2d))/t \quad \text{[Equation 3]}$$

Image processor 140 performs stop processing or replacement processing when determination unit 130 determines that the eyeball angular velocity is equal to or greater than the threshold angular velocity. The stop processing is processing for stopping the moving image. The replacement processing is processing for replacing the moving image with a single color image.

For example, image processor 140 performs stop processing or replacement processing on the moving image of only a period of time during which the eyeball angular velocity is equal to or greater than the threshold angular velocity. Hereinafter, the period of time during which it is determined that the eyeball angular velocity is equal to or greater than the threshold angular velocity may be described as "a processing object period".

For example, image processor 140 stops the moving image of the processing object period by replacing the plurality of frames included in the processing object period with a head frame of the processing object period or a frame immediately before the processing object period (stop processing). Alternatively, for example, image processor 140 replaces the moving image of the processing object period with a single color image by replacing the plurality of frames included in the processing object period with the single color image frame (replacement processing). The processing object period is a one-frame period or a plurality-of-frames period of the moving image. Note that the single color image frame is, for example, a frame in which all pixels have a single brightness value (for example, a brightness value that represents black).

When determination unit 130 determines that the eyeball angular velocity is less than the threshold angular velocity, image processor 140 performs neither stop processing nor replacement processing. That is, image processor 140 outputs the moving image of a period other than the processing object period as it is without processing. For example, after the processing object period elapses, image processor 140 outputs the moving image in the next frame of the processing object period, without performing stop processing or replacement processing.

Accordingly, when the moving image that is output from image processor 140 is displayed on the screen, the moving image is stopped or is not displayed during the processing object period (the single color image is displayed), and the normal moving image is displayed before and after the processing object period. In other words, the moving image to be displayed during the processing object period is skipped, and after the processing object period elapses, the moving image from a time when the processing object period elapses is displayed.

Display unit 150 displays the moving image that is output from image processor 140 on the screen. Display unit 150 has a screen for displaying images, such as a monitor and a display, for example.

Operation of the Image Display Device

Figure 4:
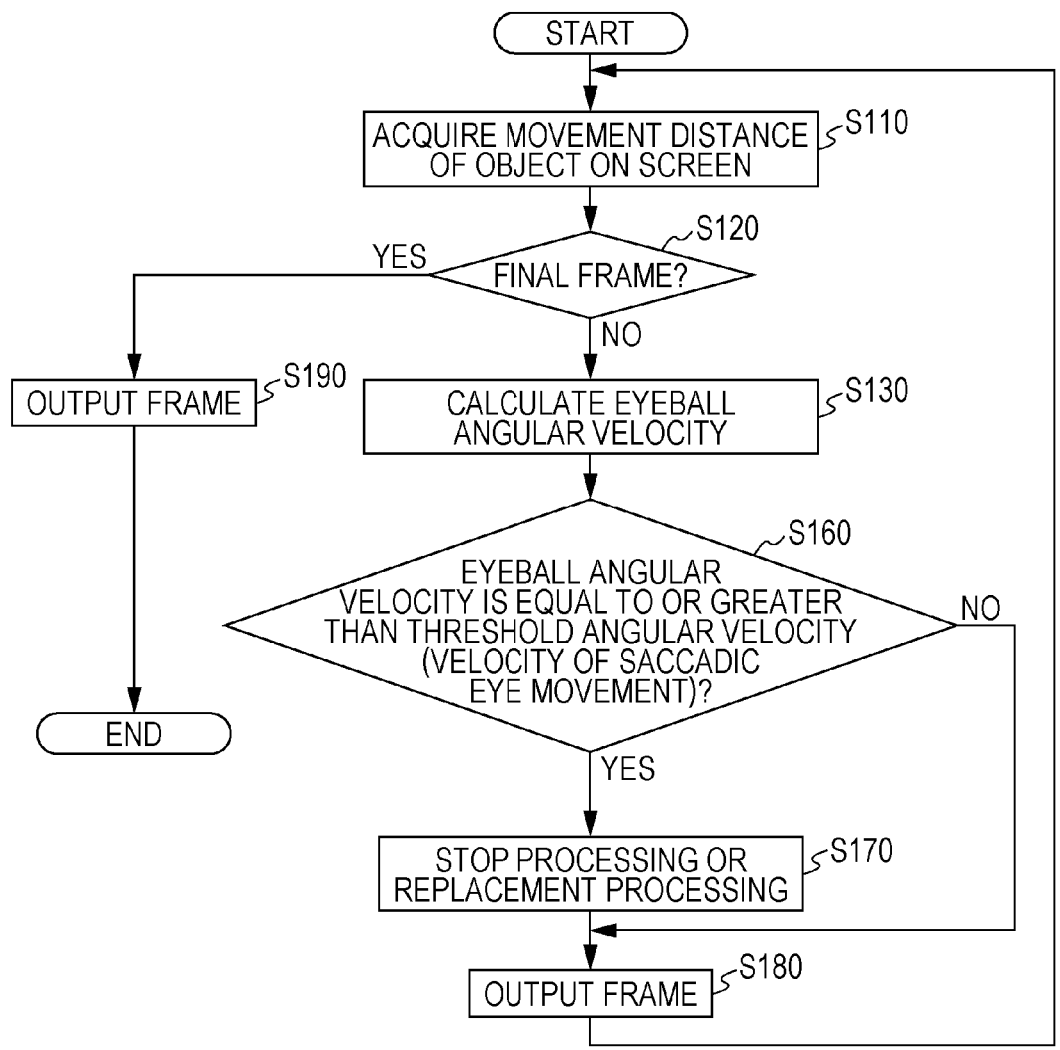
FIG. 4 is a flowchart illustrating an example of an operation of the image display device according to the first embodiment.

Subsequently, an operation of image display device 10 according to the present embodiment will be described with reference to FIG. 4. FIG. 4 is a flowchart illustrating an example of the operation of image display device 10 according to the present embodiment.

Image display device 10 starts processing with an unillustrated switch or the like.

First, acquisition unit 110 acquires the movement distance, on the screen, of the object included in the moving image to be displayed on display unit 150 (step S110). Next, acquisition unit 110 acquires one frame of the moving image data as an object frame, and determines whether the object frame is a final frame of the moving image data (step S120).

If it is determined that the object frame is the final frame (Yes in step S120), display unit 150 displays the image of the object frame, that is, the final frame (step S190). Image display device 10 then ends the operation.

If it is determined that the object frame is not the final frame (No in step S120), eyeball angular velocity calculation unit 120 calculates the eyeball angular velocity (step S130). Determination unit 130 then determines whether the eyeball angular velocity is equal to or greater than the threshold angular velocity (step S160).

If it is determined that the eyeball angular velocity is equal to or greater than the threshold angular velocity (Yes in step S160), image processor 140 performs stop processing or replacement processing (step S170). Specifically, image processor 140 performs stop processing by replacing the object frame with an immediately preceding frame. Alternatively, image processor 140 performs replacement processing by replacing the object frame with the predetermined frame of the single color image.

if it is determined that the eyeball angular velocity is less than the threshold angular velocity (No in step S160), display unit 150 outputs, that is, displays the object frame of the moving image (step S180). That is, display unit 150 displays the unstopped or unreplaced object frame as it is.

After outputting the object frame or the replaced frame, image display device 10 acquires a next frame as a new object frame, and repeats the processing after step S110.

Summary

Thus, in a case where the viewer views the object included in the acquired moving image, if the eyeball angular velocity is equal to or greater than the threshold angular velocity, image display device 10 performs stop processing or replacement processing to display the moving image. Specifically, image display device 10 performs processing for stopping or replacing with the single color image the moving image of the processing object period in which it is determined that the eyeball angular velocity is equal to or greater than the angular velocity of the saccadic eye movement. That is, if movement on the screen is faster than the angular velocity of the saccadic eye movement the eyeball of the viewer cannot follow, image display device 10 stops the moving image or replaces the moving image with the single color image on the screen.

Thus, as is the case where the visual system in the brain originally does not process a retinal image when a human being moves a visual point by the saccadic eye movement, visually induced motion sickness and eye fatigue of the viewer may be alleviated by not displaying to the viewer the moving image that moves at the angular velocity equal to or greater than the lower limit of the angular velocity of the saccadic eye movement.

For example, when capturing the moving image, the camera for capturing moves an image-capturing position by a manipulation by a camera operator or by an automatic manipulation program, or changes an image-capturing direction by an operation for changing an angle such as panning and tilting. The camera for capturing also changes a magnification.

The captured moving image includes a motion linked to the operation of the camera. An amount of movement of the image at a time of playing or displaying the moving image changes depending on the size of the screen to display, or on the magnification at a time of capturing. For example, if the magnification at the time of capturing is large, a slight motion of the camera results in a large movement on the screen.

Accordingly, for example, in cases where the viewer watches the moving image on a large screen from a nearby position, where the motion of the camera is abrupt, or where the magnification is large, resulting in abrupt movement of the displayed image, the viewer watching the moving image cannot follow the movement of the image, but watches the screen on which the image flows.

When watching an object with eyes, a human being performs a first movement of following the object to be closely watched by movement of the eyeball, and a second movement of moving the point to be closely watched by abrupt movement. The first movement is called smooth pursuit eye movement (Smooth Pursuit), and the angular velocity thereof is limited to about 90 degrees/second. On the other hand, the second movement is called the saccadic eye movement (Saccade), and the angular velocity thereof is larger than about 350 degrees/second.

In the smooth pursuit eye movement, a state is maintained where a moving object is closely watched, and a stimulus to the retina during movement is processed by the visual system. In the saccadic eye movement, the stimulus to the retina during movement is not processed by the visual system. Accordingly, when abrupt motion similar to the saccadic eye movement is displayed on the screen, it can be said that the image is an inadequate moving image that a human being is originally supposed to not process with the visual system. The magnification or operation of the camera during capturing of a moving image, and the size of the screen to display the image may enable display of the abruptly moving image a human being originally does not process with the visual system. Such an inadequate moving image causes visually induced motion sickness and eye fatigue of the viewer.

Therefore, when the movement distance of the image on the screen corresponds to abrupt movement equivalent to the saccadic eye movement, performing editing processing such as stopping display of only moving portion of the moving image allows alleviation of the cause of visually induced motion sickness and eye fatigue. Thus, image display device 10 according to the present embodiment is capable of displaying, to the viewer, the moving image with little load on a human being. Specifically, image display device 10 according to the present embodiment is capable of alleviating visually induced motion sickness and eye fatigue of the viewer caused by abrupt movement of the image, by determining and editing the image in accordance with the human eye movement and a characteristic of the visual system.

SECOND EMBODIMENT

An image display device according to a second embodiment calculates a movement distance of an object on a screen, and converts the calculated movement distance into an angular velocity around an eyeball of a viewer (eyeball angular velocity). The image display device then performs processing for avoiding display of a moving image while the eyeball angular velocity is equal to or greater than a predetermined threshold angular velocity.

The present embodiment describes an example in which a number of the object in the moving image is one. Specifically, the present embodiment describes an example in which an overall image of one frame of the moving image is the object. In other words, the present embodiment makes a determination based on the object, that is, the movement distance of the overall image. For example, as illustrated in FIG. 2A and FIG. 2B, the present embodiment describes an example of the moving image obtained by capturing an image of a stationary object while a camera pans greatly.

Configuration of the Image Display Device

Figure 5:
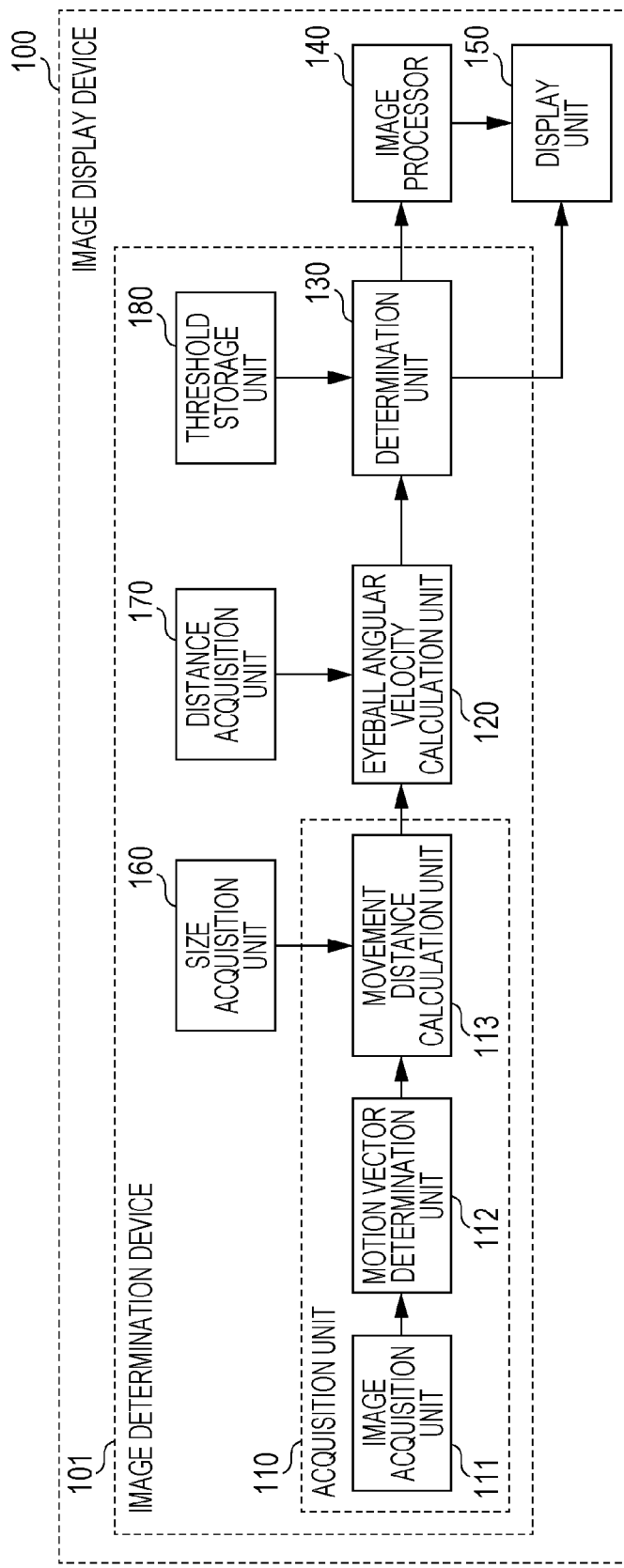
FIG. 5 is a block diagram illustrating an example of the configuration of the image display device according to a second embodiment.

FIG. 5 is a block diagram illustrating an example of a configuration of image display device 100 according to the present embodiment. As illustrated in FIG. 5, image display device 100 includes image determination device 101, image processor 140, and display unit 150. Image display device 100 is capable of acquiring a moving image, and editing and displaying the acquired moving image.

As illustrated in FIG. 5, image determination device 101 includes acquisition unit 110, eyeball angular velocity calculation unit 120, determination unit 130, size acquisition unit 160, distance acquisition unit 170, and threshold storage unit 180. Acquisition unit 110 includes image acquisition unit 111, motion vector determination unit 112, and movement distance calculation unit 113.

Image acquisition unit 111 acquires the moving image. Image acquisition unit 111 may acquire a recorded moving image stored in an unillustrated image storage unit, and may acquire a moving image from an image sensor included in an unillustrated camera, etc.

Motion vector determination unit 112 determines a motion vector that indicates an amount of movement and a direction of movement of the object between two sequential frames included in the moving image acquired by image acquisition unit 111. The motion vector is, for example, a vector representing movement of a point on the image (pixel) in a predetermined period of time.

Here, for example, the predetermined period of time is time interval t of the two sequential frames, that is, a one-frame period. Motion vector determination unit 112 spatially divides the image into a plurality of regions, and determines the motion vector for each region (refer to NPL 2). This region corresponds to an extraction block to be described later. Motion vector determination unit 112 determines a mean vector generated by averaging the motion vector for each extraction block as a motion vector representing an object frame.

For example, for each object frame, motion vector determination unit 112 determines the motion vector by using the object frame and a next (or previous) frame. Detailed operation of motion vector determination unit 112 will be described later with reference to FIG. 7.

Based on a size of the screen, movement distance calculation unit 113 calculates a size of the motion vector on the screen as movement distance s. Specifically, movement distance calculation unit 113 calculates the distance moved by the object on the screen as movement distance s of the object, from size information acquired by size acquisition unit 160 and the motion vector for each object frame determined by motion vector determination unit 112. That is, movement distance s is not a distance the object moves in actual space, not a distance the object moves in the image, but is a distance the object moves on the screen. For example, movement distance calculation unit 113 calculates the movement distance by converting a scalar quantity of the motion vector into the distance on the screen. Detailed operation of movement distance calculation unit 113 will be described later with reference to FIG. 9.

Based on movement distance s and viewing distance d, eyeball angular velocity calculation unit 120 calculates the angular velocity of the eyeball when the viewer views the object that moves on the screen, as the eyeball angular velocity. Specifically, eyeball angular velocity calculation unit 120 converts the movement distance into the eyeball angular velocity by using the movement distance calculated by movement distance calculation unit 113 and distance information acquired by distance acquisition unit 170. A specific example of a method for calculating the eyeball angular velocity is as described above with reference to FIG. 3.

Determination unit 130 determines whether the eyeball angular velocity is equal to or greater than the threshold angular velocity. Specifically, determination unit 130 determines whether the eyeball angular velocity calculated by eyeball angular velocity calculation unit 120 is equal to or greater than the threshold angular velocity stored in threshold storage unit 180. This allows determination whether the movement distance of the object on the screen is so large, that is, a movement velocity of the object on the screen is so fast that the eyeball of the viewer cannot follow, which may cause visually induced motion sickness.

Size acquisition unit 160 acquires the size of the screen. Specifically, size acquisition unit 160 acquires the size information that indicates the size of the screen that displays the moving image acquired by image acquisition unit 111. Size acquisition unit 160 may acquire, for example, the size information that is input by a user via an unillustrated input section, or may read and acquire the size information previously stored in an unillustrated storage section.

Distance acquisition unit 170 acquires the viewing distance, which is the distance between the screen and the viewer. Specifically, distance acquisition unit 170 acquires the distance information that indicates viewing distance d, which is the distance between the screen that display the moving image and the viewer.

Distance acquisition unit 170 may acquire, for example, the distance information that is input by the user via an unillustrated input section, or may acquire the distance information measured by an unillustrated distance measuring section. Alternatively, distance acquisition unit 170 may read and acquire the distance information previously stored in an unillustrated storage section.

Threshold storage unit 180 is, for example, a memory for storing the threshold angular velocity, which is a lower limit of the eyeball angular velocity in a saccadic eye movement (Saccade). The threshold angular velocity corresponds to a limit value of a following velocity of the eyeball when a human being follows a moving object with an eye. That is, when the eyeball moves at an angular velocity equal to or greater than the threshold angular velocity, the eyeball movement is the saccadic eye movement.

Image processor 140 and display unit 150 are similar to those in the first embodiment, and thus description will be omitted here.

A method for calculating the eyeball angular velocity is identical to the method described in the first embodiment with reference to FIG. 2A and FIG. 2B.

Operation of the Image Display Device

Figure 6:
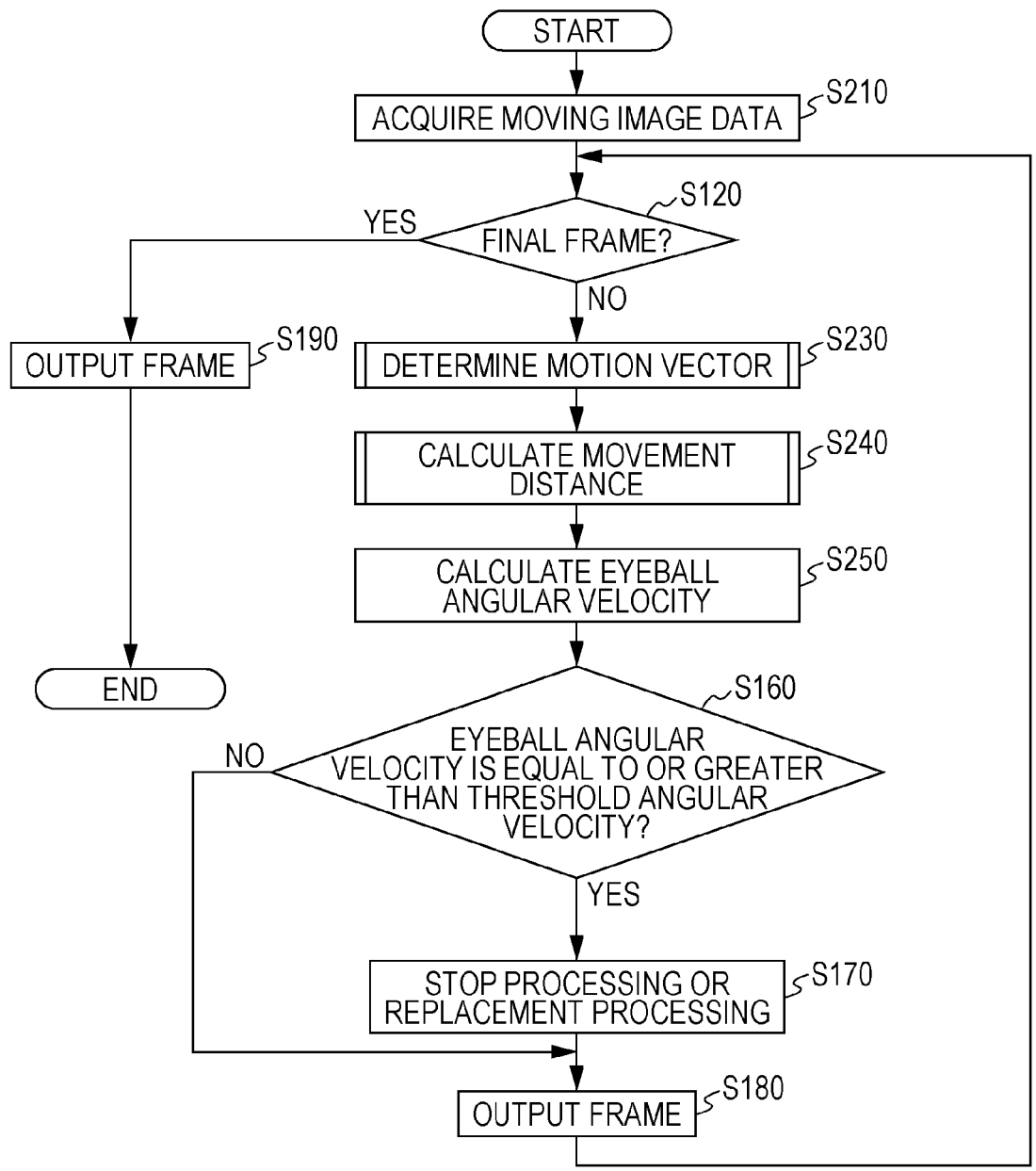
FIG. 6 is a flowchart illustrating an example of the operation of the image display device according to the second embodiment.

Subsequently, the operation of image display device 100 according to the present embodiment will be described with reference to FIG. 6. FIG. 6 is a flowchart illustrating an example of the operation of image display device 100 according to the present embodiment.

Image display device 100 starts processing with an unillustrated switch or the like.

First, image acquisition unit 111 acquires moving image data from an unillustrated image storage unit, camera, etc. (step S210). Next, motion vector determination unit 112 acquires one frame of the moving image data acquired by image acquisition unit 111 as the object frame, and determines whether the object frame is a final frame of the moving image data (step S120). Motion vector determination unit 112 acquires the frames included in the moving image in time-series order from image acquisition unit 111.

If it is determined that the object frame is the final frame (Yes in step S120), display unit 150 displays the object frame, that is, the image of the final frame. For example, display unit 150 outputs the object frame to an unillustrated display, etc. Image display device 100 then ends the operation.

If it is determined that the object frame is not the final frame (No in step S120), motion vector determination unit 112 acquires a next frame of the object frame from image acquisition unit 111, and determines the motion vector between the object frame and the next frame (step S230). Motion vector determination unit 112 determines one motion vector that represents the object frames. A method for calculating the motion vector will be described later with reference to FIG. 7.

Next, movement distance calculation unit 113 calculates movement distance s by using the motion vector of the object frame and the size information acquired by size acquisition unit 160 (step S240). A method for calculating the movement distance will be described later with reference to FIG. 9.

Eyeball angular velocity calculation unit 120 calculates the eyeball angular velocity (step S250). Specifically, eyeball angular velocity calculation unit 120 first calculates rotation angle r around the eyeball of the viewer based on movement distance s. Furthermore, eyeball angular velocity calculation unit 120 calculates the angular velocity as the eyeball angular velocity by dividing calculated rotation angle r by the one-frame period. Details are as described with reference to FIG. 3.

Subsequently, determination unit 130 determines whether the eyeball angular velocity is equal to or greater than the threshold angular velocity (step S160). Specifically, determination unit 130 reads the threshold angular velocity stored in threshold storage unit 180, and determines whether the angular velocity calculated by eyeball angular velocity calculation unit 120 (eyeball angular velocity) is equal to or greater than the threshold angular velocity.

Subsequent processing is similar to the processing in the first embodiment, and thus description will be omitted.

After outputting the object frame or the replaced frame (step S180), image display device 100 acquires the next frame as a new object frame, and repeats the processing after step S120.

Determination of the Motion Vector

Figure 7:
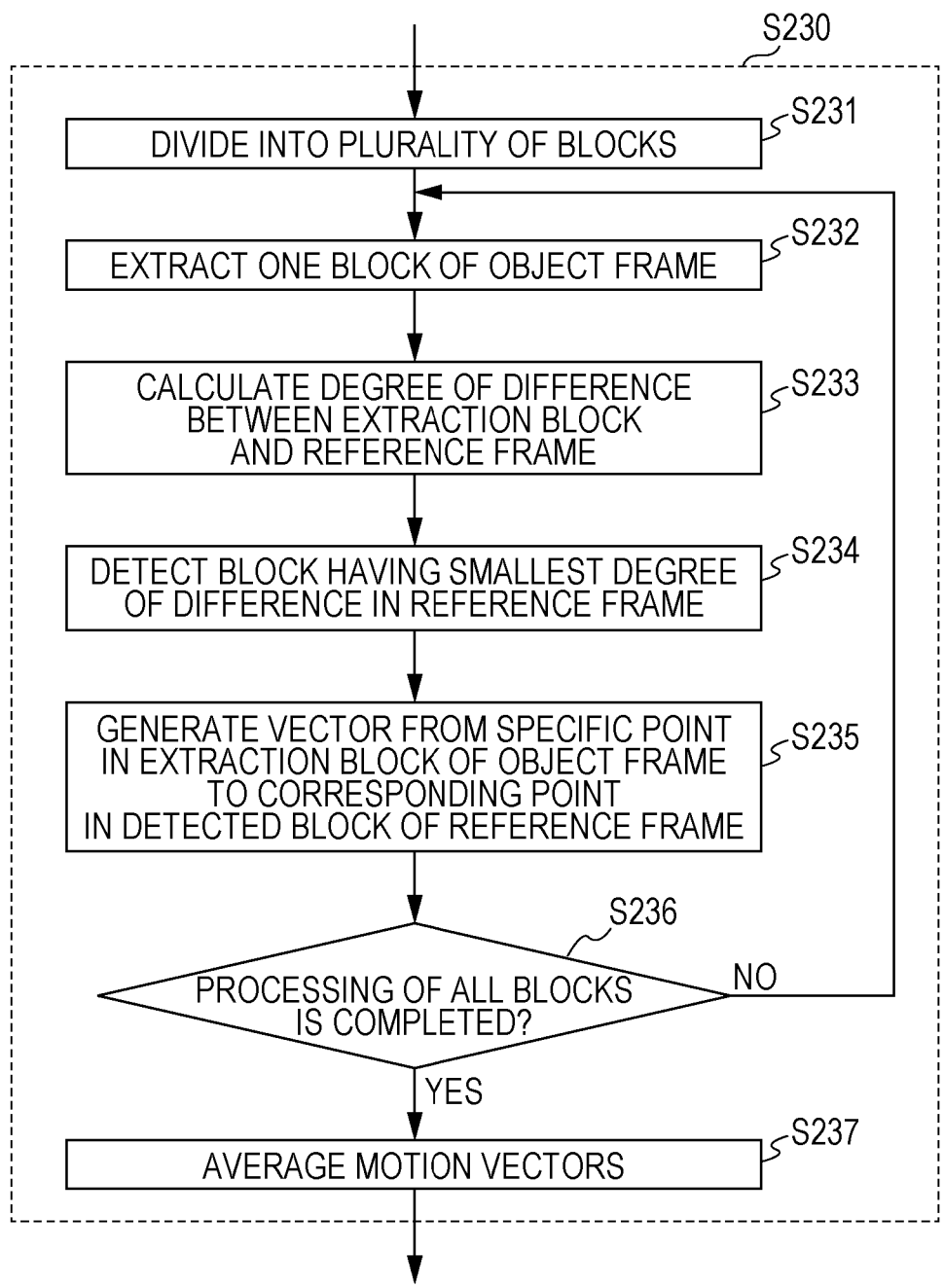
FIG. 7 is a flowchart illustrating an example of a method for determining a motion vector by the image display device according to the second embodiment.

Subsequently, detailed operation of the method for determining the motion vector of step S230 illustrated in FIG. 6 will be described with reference to FIG. 7. FIG. 7 is a flowchart illustrating an example of the method for determining the motion vector by image display device 100 according to the present embodiment. Here, an example of determining the motion vector by a block matching algorithm will be described.

First, motion vector determination unit 112 divides the image of the object frame into a plurality of blocks (step S231).

Figure 8A:
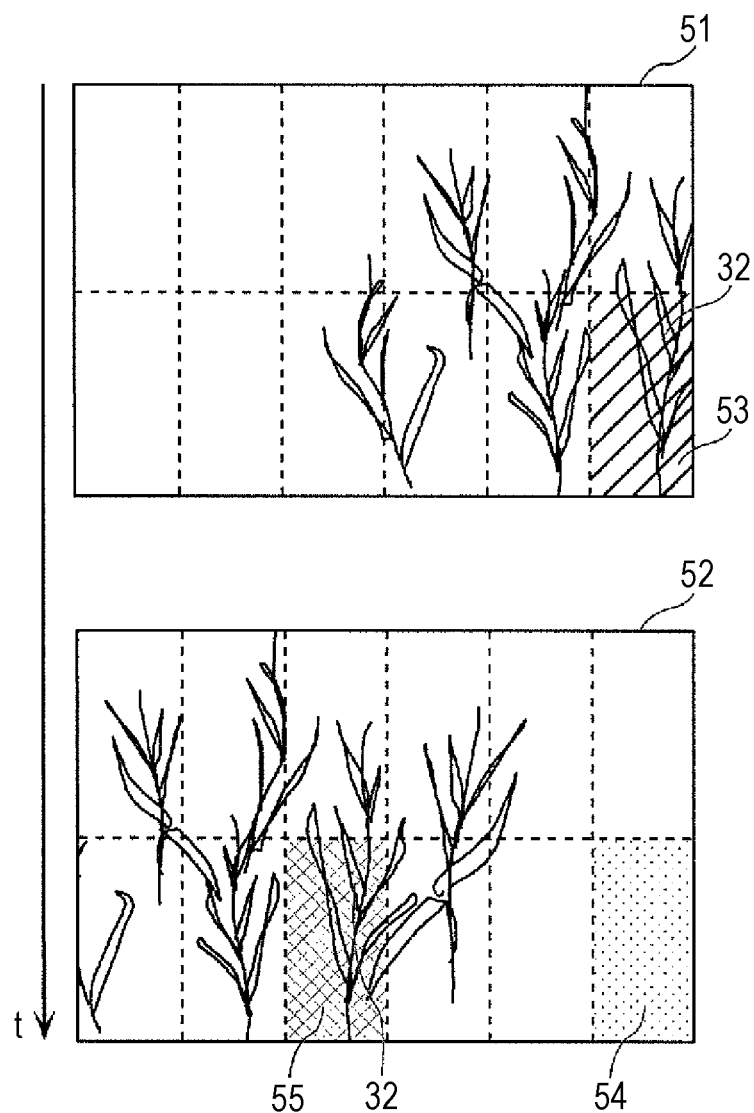
FIG. 8A is a diagram schematically illustrating an example of dividing an image included in two sequential frames into a plurality of blocks.
Figure 8B:
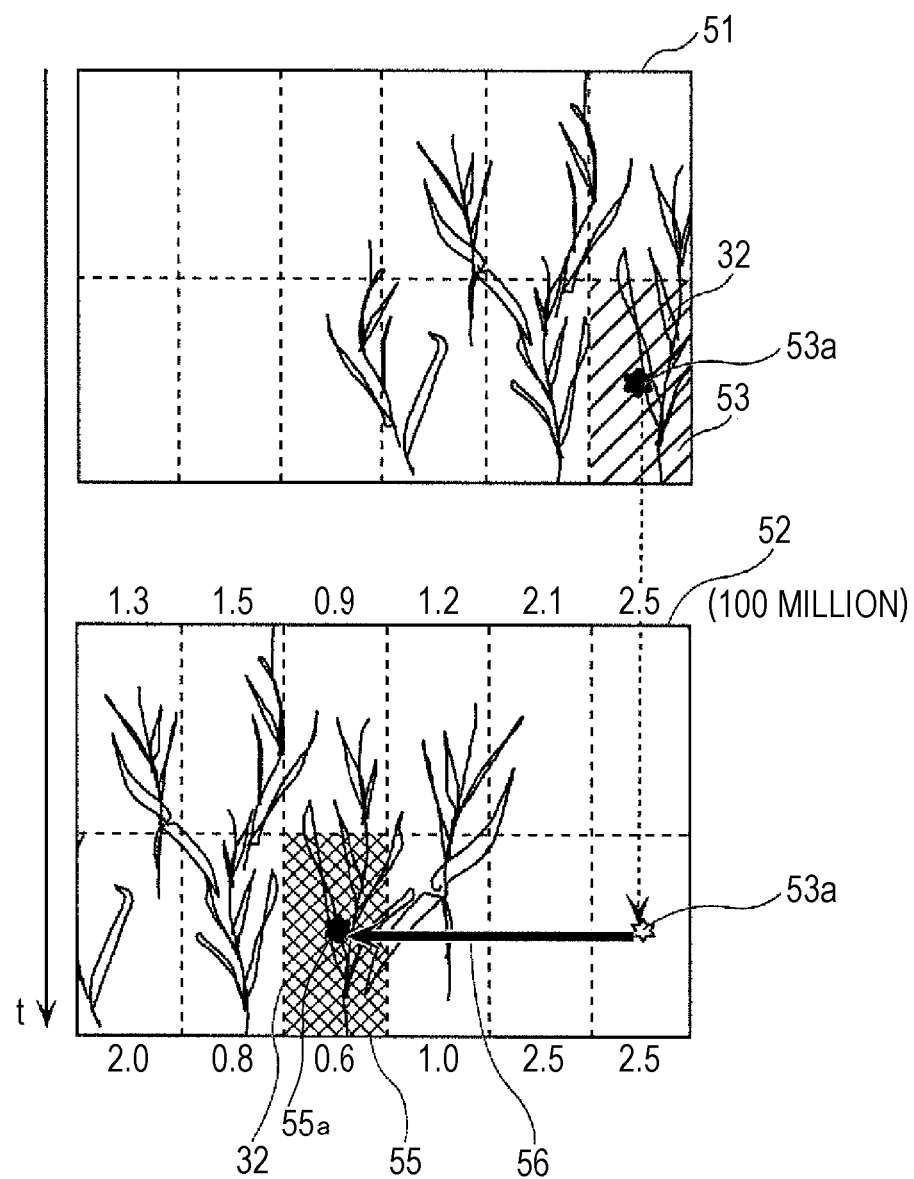
FIG. 8B is a diagram illustrating an method for determining the motion vector of the divided blocks illustrated in FIG. 8A.

Here, FIG. 8A is a diagram illustrating an example of dividing the image included in two sequential frames into a plurality of blocks. FIG. 8B is a diagram illustrating the method for determining the motion vector of the divided blocks illustrated in FIG. 8A.

FIG. 8A is a diagram schematically illustrating the example of dividing the image included in the two sequential frames into the plurality of blocks. In the example of FIG. 8A, each of object frame 51 and reference frame 52 is divided in half vertically and in six horizontally. That is, motion vector determination unit 112 divides each of object frame 51 and reference frame 52 into 12 blocks.

Next, motion vector determination unit 112 extracts one unprocessed block from the plurality of divided blocks (step S232). Next, motion vector determination unit 112 uses the extracted block (hereinafter described as an extraction block) as a template, to calculate a degree of difference between image data of each of the blocks within reference frame 52 (for example, a frame immediately after object frame 51) and image data of the template (step S233).

For example, as illustrated in FIG. 8A, motion vector determination unit 112 extracts lower rightmost block 53 (hatched section). Motion vector determination unit 112 uses, as the template, an image of a lower portion of slightly right-inclined grass 32 included in block 53, and calculates the degree of difference between the template and all the blocks included in reference frame 52. For example, grass 32 is not in block 54, a lower rightmost block of reference frame 52 (dotted section), and all portions corresponding to grass 32 in the template image are a difference from reference frame 52. In contrast, grass 32 identical to grass 32 in the template is in block 55, a third lower block from left in reference frame 52 (meshed section). Extremely many portions of the images overlap, and the difference is small.

The degree of difference is a value that indicates the difference between the extraction block and the predetermined block in the reference frame. The extraction block and the predetermined block in the reference frame become more similar as the degree of difference decreases. For example, in FIG. 8A, block 53 and block 55 have small degree of difference, and are similar.

Specifically, the degree of difference is calculated based on a difference in pixel values between the extraction block and the predetermined block in reference frame 52. For example, the degree of difference is calculated by SSD (Sum of Squared Difference), which is a method for calculating a sum of squared difference for each pixel, or by SAD (Sum of Absolute Difference), which is a method for calculating a sum of absolute difference for each pixel. That is, the degree of difference is represented by, for example, the sum of absolute difference or the sum of squared difference of the extraction block.

For example, it is assumed that a number of pixels of the image included in each of object frame 51 and reference frame 52 is 1280 pixels wide by 720 pixels high. In this case, when each image of object frame 51 and reference frame 52 is divided into 12 blocks as illustrated in FIG. 8A, one block includes 213 pixels wide by 360 pixels high.

In a case where the degree of difference is the sum of absolute difference (SAD) between pixels with corresponding positions, for example, when 20% of the pixels have approximately 16000 absolute differences on an average, the degree of difference between the template and block 54 is approximately 250 million. In contrast, the degree of difference between the template and block 55 that includes an identical portion of identical grass 32 to the template is approximately 60 million, for example, when 10% of the pixels have 8100 absolute differences on an average.

Furthermore, motion vector determination unit 112 detects a block having a smallest degree of difference in reference frame 52, that is, a block the most similar to the extraction block (step S234). Motion vector determination unit 112 then generates a vector from a coordinate of a specific point in the extraction block of object frame 51 to a coordinate of a corresponding point in the block of reference frame 52 detected in step S234 (step S235). This generated vector is the motion vector of the extraction block. The specific point is a position that becomes a starting point or end point of the motion vector, and for example, is a center of gravity of the block.

FIG. 8B illustrates values of the degree of difference between each of the plurality of blocks in reference frame 52, and the image of block 53 in object frame 51 as the template. As illustrated in FIG. 8B, block 55 that includes the identical portion of identical grass 32 to the template is a block with the smallest degree of difference.

In a case where the specific point is the center of gravity of the block, in the example of FIG. 8B, a coordinate position of block 53 of the template is center of gravity 53a of block 53, and the center of gravity of the block having the smallest degree of difference detected in reference frame 52 is center of gravity 55a of block 55. Therefore, vector 56 from center of gravity 53a to center of gravity 55a is the motion vector of the extraction block.

Motion vector determination unit 112 may calculate the plurality of motion vectors for each pixel (specific point) for one extraction block, or may calculate one motion vector that represents one extraction block.

Motion vector determination unit 112 then determines whether processing of all the blocks of the divided object frame is completed (step S236). If it is determined that processing of all the blocks is completed (Yes in step S236), motion vector determination unit 112 averages all the motion vectors to generate the mean vector (step S237). Motion vector determination unit 112 then outputs the generated mean vector to movement distance calculation unit 113 as the motion vector of the object frame.

If it is determined that processing of all the blocks is not completed (No in step S236), returning to step S232, motion vector determination unit 112 repeats subsequent processing by considering an unprocessed block as a new extraction block.

Motion vector determination unit 112 according to the present embodiment calculates the motion vector by the block matching algorithm, but calculation of the motion vector is not limited to this method. Motion vector determination unit 112 may calculate the motion vector at each point within the block by another method, such as a gradient-based method.

Motion vector determination unit 112 according to the present embodiment determines the mean vector obtained by averaging the plurality of motion vectors calculated for each extraction block as a motion vector that represents the object frame, but the determination of the motion vector is not limited to this example. For example, motion vector determination unit 112 may consider a vector with a largest absolute value among the plurality of motion vectors as the motion vector of the object frame.

Motion vector determination unit 112 according to the present embodiment calculates the motion vector by comparing the object frame with the next frame, but calculation of the motion vector is not limited to this example. For example, motion vector determination unit 112 may calculate the motion vector through combination of the object frame and a frame other than sequential frames, such as a frame subsequent to the object frame by a plurality of frames, or a frame before the object frame.

Calculation of the Movement Distance

Figure 9:
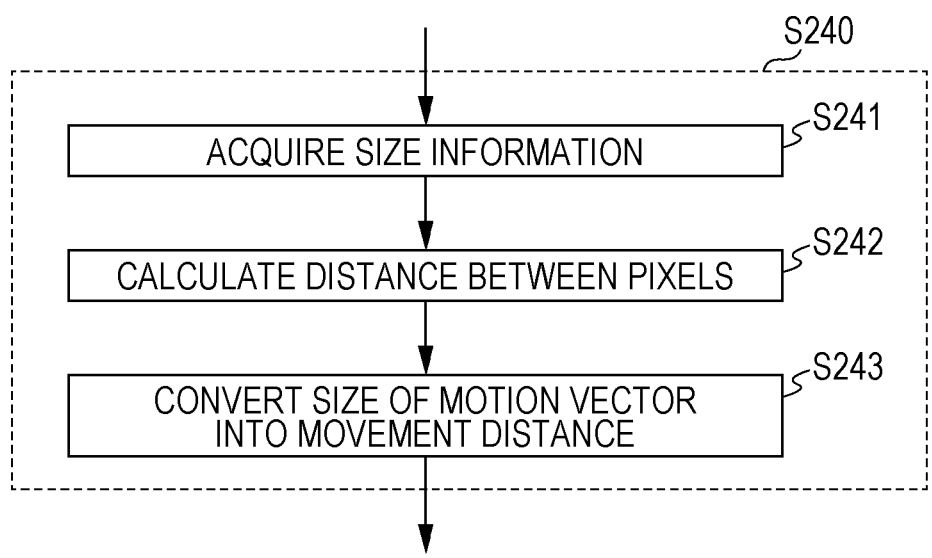
FIG. 9 is a flowchart illustrating an example of a method for calculating the movement distance by the image display device according to the second embodiment.

Subsequently, detailed operation of the method for calculating the movement distance of step S240 illustrated in FIG. 6 will be described with reference to FIG. 9. FIG. 9 is a flowchart illustrating an example of the method for calculating the movement distance by image display device 100 according to the present embodiment.

First, movement distance calculation unit 113 acquires the size information from size acquisition unit 160 (step S241). The size information refers, for example, to numbers of vertical and horizontal pixels of the screen, and to vertical and horizontal lengths of the screen.

Next, based on the acquired size information, movement distance calculation unit 113 calculates a distance between the pixels (pixel pitch) of the screen that displays the moving image (a display or a monitor) (step S242). For example, movement distance calculation unit 113 calculates the vertical distance between the pixels by dividing the vertical length of the screen indicated by the size information by the number of vertical pixels. Similarly, movement distance calculation unit 113 calculates the horizontal distance between the pixels by dividing the horizontal length of the screen indicated by the size information by the number of horizontal pixels.

For example, for a 40-inch display with a screen measuring 88.39 cm wide by 49.78 cm high, in the present embodiment, a one-frame image is 1280 pixels wide by 720 pixels high. Therefore, the horizontal distance between the pixels is approximately 0.7 mm obtained by dividing 88.39 cm by 1280 pixels.

Next, movement distance calculation unit 113 calculates the movement distance by using the motion vector determined by motion vector determination unit 112 and the distance between the pixels calculated in step S242 (step S243). For example, movement distance calculation unit 113 calculates the movement distance by multiplying an absolute value of the motion vector determined by motion vector determination unit 112 (that is, a scalar quantity of the motion vector) by the distance between the pixels.

In the example illustrated in FIG. 8B, the motion vector is a vector from center of gravity 53a of block 53 (block 54) to center of gravity 55a of block 55. The absolute value of this vector is exactly three times the width of the block, and three times the width of 213 pixels of one block, which is 639 pixels. Therefore, this is multiplied by the horizontal distance 0.7 mm of one pixel, and the movement distance is approximately 447 mm.

Summary

As described above, image display device 100 according to the present embodiment determines the motion vector of the object frame of the moving image data acquired by image acquisition unit 111, and calculates the movement distance corresponding to the determined motion vector. Image display device 100 then calculates the eyeball angular velocity based on the calculated movement distance, and compares the eyeball angular velocity with the threshold angular velocity for each object frame.

When the eyeball angular velocity is equal to or greater than the threshold angular velocity, image display device 100 performs, for example, processing for replacing the image of the object frame with the image of an immediately preceding frame, in other word, processing for stopping the moving image. Alternatively, image display device 100 replaces the image of the object frame with, for example, a black single color image, that is, causes blackout.

Thus, when the object moves on the screen faster than the velocity the viewer can follow with the eyeball, it is possible to alleviate visually induced motion sickness and eye fatigue by stopping the moving image at an image of the frame immediately before the movement, or by replacing the image with a black single color image. That is, according to the present embodiment, as is the case where, when a human being moves a visual point by the saccadic eye movement, the visual system in the brain originally does not process a retinal image, it is possible to alleviate visually induced motion sickness and eye fatigue of the viewer by not displaying to the viewer the image that moves at the velocity equal to or faster than the velocity at which the image can be followed for visual processing.

The First Variation of the Second Embodiment

The first variation of the second embodiment describes a case where a moving image includes a plurality of objects. In addition to functions of the image display device of the second embodiment, the image display device according to the present variation has a function to determine whether an overall image of a frame is an image that moves in an identical direction based on a motion vector, thereby determining whether stop processing and replacement processing are necessary. Accordingly, the image display device processes the moving image for only rapid movement of the overall image corresponding to the saccadic eye movement that may cause visually induced motion sickness and eye fatigue. The image display device does not process an image in which a point to be closely watched does not move rapidly, like an image following a moving body. This allows inhibition of degradation in the image and obstruction to viewing of the image cause by the processing.

Configuration of the Image Display Device

Figure 10:
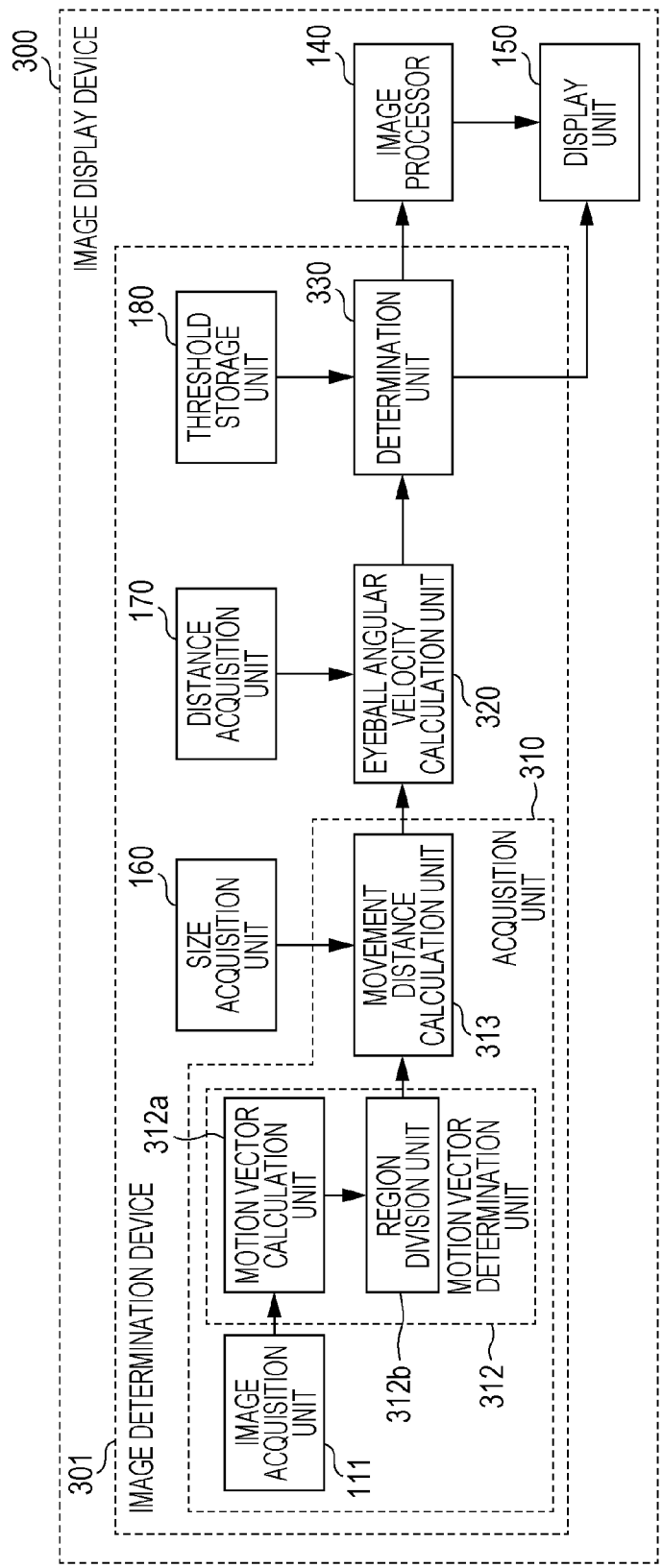
FIG. 10 is a block diagram illustrating an example of the configuration of the image display device according to the first variation of the second embodiment.

First, the image display device according to the present variation will be described with reference to FIG. 10. FIG. 10 is a block diagram illustrating an example of a configuration of image display device 300 according to the present variation.

As illustrated in FIG. 10, image display device 300 includes image determination device 301, image processor 140, and display unit 150. Image determination device 301 differs from image determination device 101 illustrated in FIG. 5 in that image determination device 301 includes acquisition unit 310, eyeball angular velocity calculation unit 320, and determination unit 330 instead of acquisition unit 110, eyeball angular velocity calculation unit 120, and determination unit 130. Acquisition unit 310 differs from acquisition unit 110 illustrated in FIG. 5 in that acquisition unit 310 includes motion vector determination unit 312 and movement distance calculation unit 313 instead of motion vector determination unit 112 and movement distance calculation unit 113. The following description focuses on differences from the second embodiment, and a description about components identical to components of FIG. 5 may be omitted.

Motion vector determination unit 312 determines a plurality of motion vectors that each indicate an amount of movement and direction of movement of each of the plurality of objects between a plurality of frames included in the moving image. Motion vector determination unit 312 includes motion vector calculation unit 312a and region division unit 312b, as illustrated in FIG. 10.

Motion vector calculation unit 312a performs operations of motion vector determination unit 112 according to the second embodiment other than processing for calculating the mean vector. For example, motion vector calculation unit 312a determines the motion vectors between the plurality of frames included in the moving image acquired by image acquisition unit 111. Specifically, for each object frame, motion vector calculation unit 312a determines the motion vector by using the object frame and a next (or a previous) frame. Motion vector calculation unit 312a spatially divides the image into a plurality of extraction blocks, and determines the motion vector for each extraction block. Specifically, motion vector calculation unit 312a performs the operation of steps S231 to S236 illustrated in FIG. 7.

Region division unit 312b performs region division of the object frame based on distribution of a direction and size of the motion vector for each extraction block of the object frame calculated by motion vector calculation unit 312a. The plurality of divided regions are regions that have motion vectors different from each other. For example, region division unit 312b performs region division of the object frame by clustering of the motion vector.

When the object frame is not divided into the plurality of regions, the object frame has an identical motion vector over the overall image. That is, it can be determined that the object frame is an image in which the overall image moves in a common direction. Alternatively, when the object frame is divided into the plurality of regions, it can be determined that the object frame includes a portion that moves differently from the motion of the overall screen.

For example, when a camera follows and captures motion of a predetermined movable body, the movable body and a background move in directions different from each other. In this case, the plurality of objects is the movable body and the background, and has motion vectors that differ from each other. Therefore, for example, the plurality of regions divided by image processing corresponds to the plurality of objects one-to-one.

Figure 11A:
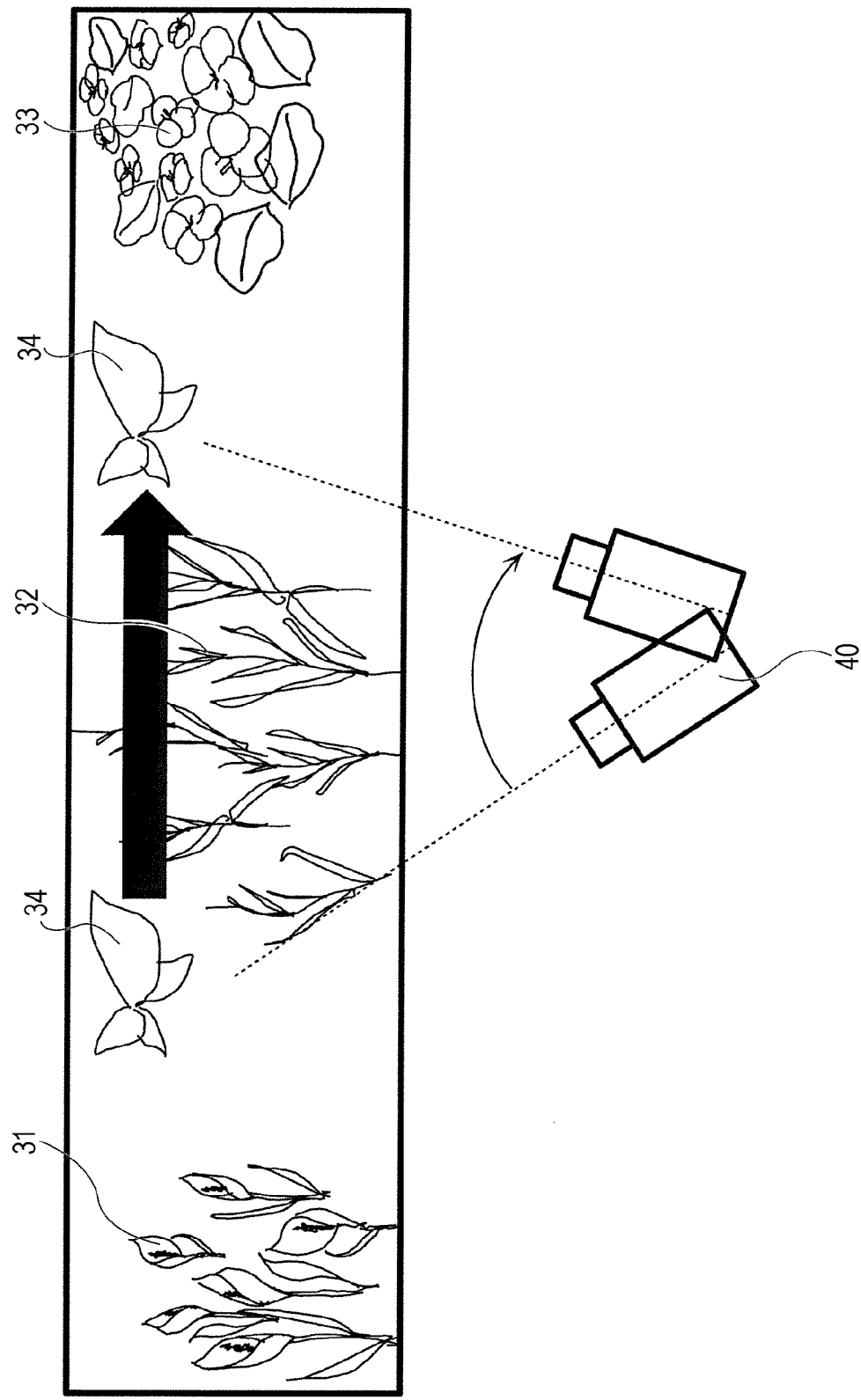
FIG. 11A is a diagram schematically illustrating how the camera captures an image of a moving object while following the object.

FIG. 11A is a diagram schematically illustrating how camera 40 captures an image of a moving object (movable body) while following the object. Here, FIG. 11A illustrates a case where the movable body and the background are the objects. Specifically, as illustrated in FIG. 11A, butterfly 34 is the movable body, and left flower 31, central grass 32, and right flower 33 are unmoving objects (stationary articles).

Butterfly 34 moves as an arrow from a position between left flower 31 and central grass 32 to a position between central grass 32 and right flower 33. In the example illustrated in FIG. 11A, camera 40 rotates following movement of butterfly 34 from left to right.

Figure 11B:
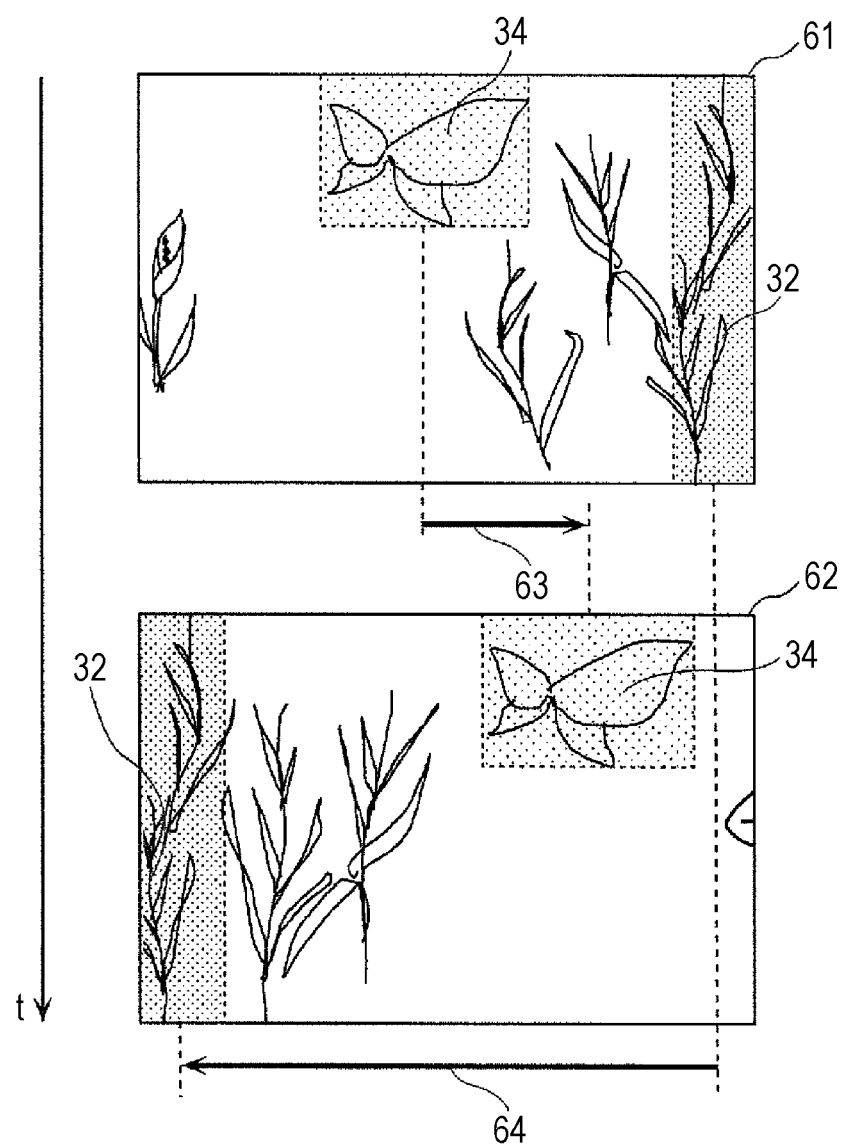
FIG. 11B is a diagram illustrating a plurality of frames included in the moving image captured by the camera illustrated in FIG. 11A.

FIG. 11B is a diagram illustrating the plurality of frames included in the moving image captured by camera 40 illustrated in FIG. 11A. It is assumed here that frame 62 is acquired following frame 61. Note that in FIG. 11B, different types of shading are given to blocks including butterfly 34 and blocks including part of grass 32, respectively.

Movement distance calculation unit 313 calculates a size of each of the plurality of motion vectors on the screen as the movement distance of each of the plurality of objects, based on the screen size. Specifically, movement distance calculation unit 313 calculates the movement distance for each of the regions divided by region division unit 312b with reference to the size information acquired by size acquisition unit 160.

As illustrated in FIG. 11B, butterfly 34 positioned at center left in frame 61 is positioned at center right in next frame 62. As described in the second embodiment, the motion vectors are determined by using the block matching algorithm. Specifically, the motion vector from the blocks that include butterfly 34 in frame 61 to the blocks that include butterfly 34 in frame 62 is motion vector 63. For example, when the image measures 1280 pixels wide by 720 pixels high, the size of motion vector 63 is 320 pixels, for example. That is, butterfly 34 moves approximately ¼ of the screen during a time between frame 61 and frame 62.

Grass 32 positioned at a right end of the screen in frame 61 is positioned at a left end in frame 62. The motion vector from the blocks that include grass 32 at the right end in frame 61 to the blocks that include grass 32 in frame 62 is motion vector 64. The size of motion vector 64 is 1150 pixels, for example. That is, grass 32 moves approximately 9/10 of the screen during the time between frame 61 and frame 62 by panning of camera 40.

For example, in the case where display unit 150 is a 40-inch display, the screen has a size of 88.39 cm wide by 49.78 cm high, and thus the size of motion vector 63 is approximately 22 cm on the screen. The size of motion vector 64 is approximately 79 cm on the screen.

That is, movement distance calculation unit 313 according to the present variation differs from movement distance calculation unit 113 according to the second embodiment in that, while movement distance calculation unit 113 calculates one movement distance per object frame, movement distance calculation unit 313 calculates the movement distance for each of the regions divided by region division unit 312b. A specific method for calculating the movement distance is as described with reference to FIG. 9.

Eyeball angular velocity calculation unit 320 calculates the plurality of eyeball angular velocities based on each of the plurality of movement distances and viewing distance d. That is, eyeball angular velocity calculation unit 320 calculates the angular velocity of the eyeball of the viewer for each of the plurality of objects. Specifically, eyeball angular velocity calculation unit 320 calculates the eyeball angular velocity for each of the regions divided by region division unit 312b with reference to the distance information acquired by distance acquisition unit 170.

For example, it is assumed from the distance information acquired by distance acquisition unit 170 that viewing distance d between the viewer and the screen is, for example, 150 cm, and that display unit 150 is the 40-inch display. When the viewer watches butterfly 34 calculated as motion vector 63 included in the moving image, an angle at which the eyeball of the viewer moves is approximately 8 degrees. For example, when a frame rate of the moving image is 30 Hz, the eyeball angular velocity of the viewer who watches butterfly 34 included in the moving image is approximately 254 degrees/second. In contrast, when the viewer watches grass 32 included in the moving image, the angle at which the eyeball of the viewer moves is approximately 30 degrees, and thus the eyeball angular velocity is approximately 894 degrees/second.

In addition to the function of determination unit 130, determination unit 330 further determines whether the moving image is a following moving image, based on the plurality of motion vectors determined by motion vector determination unit 312. The following moving image is a moving image that follows a specific object among the plurality of objects. That is, the following moving image is a moving image generated by a camera following and capturing an image of a predetermined photographic subject.

For example, when the camera follows and captures an image of a predetermined movable body by panning or tilting, while a motion is small in an image region corresponding to the movable body, a surrounding background moves greatly. For example, in the example illustrated in FIG. 11A and FIG. 11B, the camera follows and captures an image of butterfly 34. Accordingly, the motion is small in a region in which butterfly 34 is positioned in the image, and other objects, for example, the surrounding background other than butterfly 34 like grass 32 moves greatly.

Thus, the moving image obtained by following and capturing the image of the movable body may include a region where the eyeball angular velocity is less than the threshold angular velocity, and a region where the eyeball angular velocity is equal to or greater than the threshold angular velocity. Therefore, determination unit 330 can determine whether the moving image is a following moving image, by comparing the eyeball angular velocity with the threshold angular velocity for each region, for example. Thus, determination unit 330 can determine whether the moving image is a following moving image without using a device such as a camera and a sensor for observing the movement of the eyeball of the viewer.

That is, in the present embodiment, determination unit 330 determines whether all the eyeball angular velocities calculated by eyeball angular velocity calculation unit 320 are equal to or greater than the lower limit of the eyeball angular velocity (threshold angular velocity) in the saccadic eye movement. Specifically, determination unit 330 determines whether a minimum eyeball angular velocity among the eyeball angular velocities for respective regions calculated by eyeball angular velocity calculation unit 320 is equal to or greater than the threshold angular velocity stored in threshold storage unit 180. If it is determined that the minimum eyeball angular velocity is equal to or greater than the threshold angular velocity, it can be considered that all the regions, that is, the overall image is moving at a velocity equal to or greater than the velocity of the saccadic eye movement. That is, determination unit 330 may determines that the moving image is not the following moving image that follows the object.

Figure 12A:
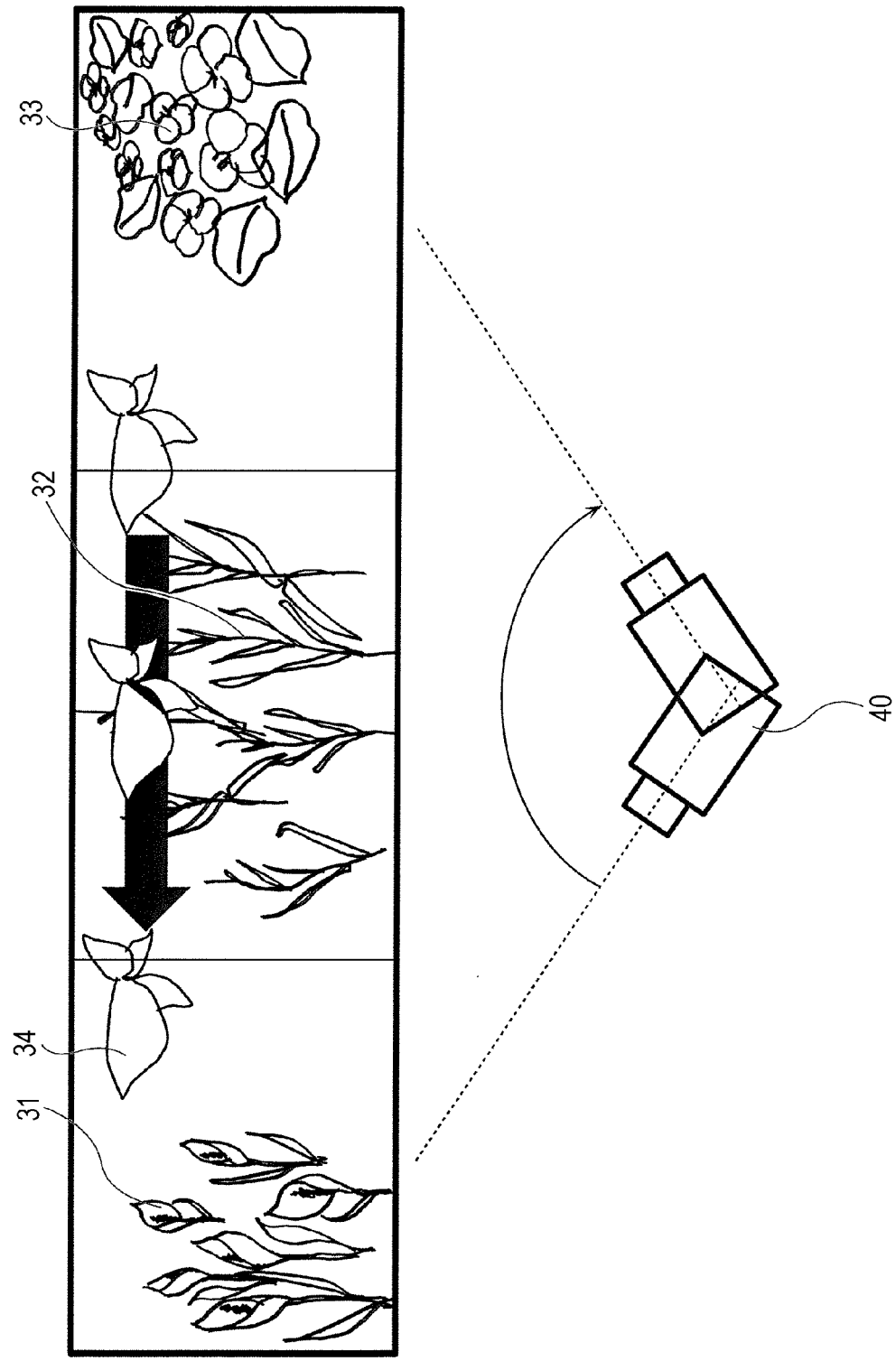
FIG. 12A is a diagram schematically illustrating how the camera captures the image of the moving object without following the object.

FIG. 12A is a diagram schematically illustrating how camera 40 captures an image of a moving object (movable body) without following the object. As illustrated in FIG. 12A, although the movable body (butterfly 34) and the background (flower 31, etc.) are the objects to be captured, camera 40 does not follow the movable body and moves differently from the motion of the movable body.

Figure 12B:
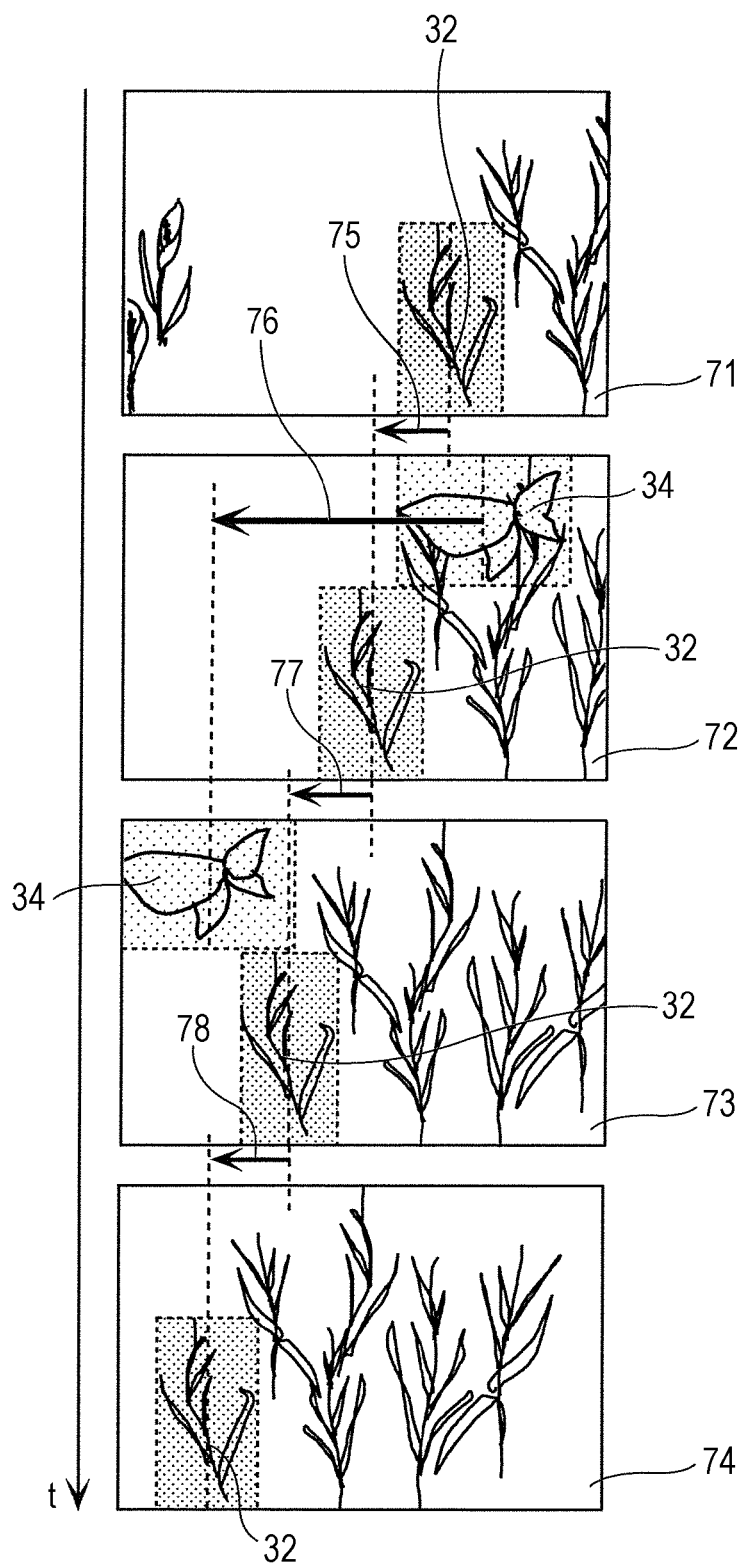
FIG. 12B is a diagram illustrating the plurality of frames included in the moving image captured by the camera illustrated in FIG. 12A.

FIG. 12B is a diagram illustrating a plurality of frames included in the moving image captured by camera 40 illustrated in FIG. 12A. In FIG. 12B, frames 71 to 74 are sequentially placed in time-series order. In addition, FIG. 12B illustrates motion vectors 75 to 78 with solid-line arrows. Note that in FIG. 12B, different types of shading are given to blocks including butterfly 34 and blocks including part of grass 32.

Motion vectors 75, 77, and 78 are motion vectors of grass 32, which is a background. Motion vector 76 is a motion vector of butterfly 34, which is a movable body.

For example, it is assumed here that the size of each of motion vectors 75, 77, and 78 is 260 pixels, and that the size of motion vector 76 is 1020 pixels. In this case, the movement distance of grass 32 on the screen of the 40-inch display is approximately 18 cm per frame. The movement of butterfly 34 on the screen is approximately 70 cm. It is assumed here that viewing distance d is 150 cm, the frame rate of the moving image is 60 Hz, that is, time interval t of two sequential frames is 17 ms. In this case, the eyeball angular velocity when the viewer watches grass 32 is approximately 404 degrees/second. The eyeball angular velocity when the viewer watches butterfly 34 is approximately 1545 degrees/second.

The angular velocity of eye movement with regard to the background other than grass 32 is also similar to the angular velocity of grass 32 calculated as an example. Therefore, when the minimum angular velocity of the eyeball is 400 degrees/second, it is determined that the minimum angular velocity of the eyeball is equal to or greater than the threshold angular velocity. That is, it can be considered that all the regions of the image are moving at a velocity equal to or greater than the velocity of the saccadic eye movement, and determination unit 330 can determine that the moving image is not a following moving image.

On the other hand, when it is determined that the minimum eyeball angular velocity is less than the threshold angular velocity, it can be considered that the region is not moving at least at a velocity equal to or greater than the velocity of the saccadic eye movement. That is, determination unit 330 can determine that the moving image is a following moving image.

In the example of FIG. 12A and FIG. 12B, when the frame rate is 30 Hz, the eyeball angular velocity at which the viewer watches butterfly 34 is approximately 202 degrees/second, which is less than the threshold angular velocity. In this case, it can be considered that the region of butterfly 34 is not moving at a velocity equal to or greater than the velocity corresponding to the saccadic eye movement, and determination unit 330 can determine that the moving image is a following moving image.

Image processor 140 performs stop processing or replacement processing based on determination results by determination unit 330. Specifically, when determination unit 330 determines that the eyeball angular velocity is equal to or greater than the threshold angular velocity, and that the moving image is a following moving image, image processor 140 performs neither stop processing nor replacement processing. When determination unit 330 determines that the eyeball angular velocity is less than the threshold angular velocity, image processor 140 performs neither stop processing nor replacement processing, regardless of whether the moving image is a following moving image.

That is, image processor 140 performs stop processing or replacement processing only when determination unit 330 determines that the eyeball angular velocity is equal to or greater than the threshold angular velocity, and that the moving image is not a following moving image. Specifically, image processor 140 performs stop processing or replacement processing only when determination unit 330 determines that the minimum eyeball angular velocity among the plurality of eyeball angular velocities is equal to or greater than the threshold angular velocity.

Operation of the Image Display Device

Figure 13:
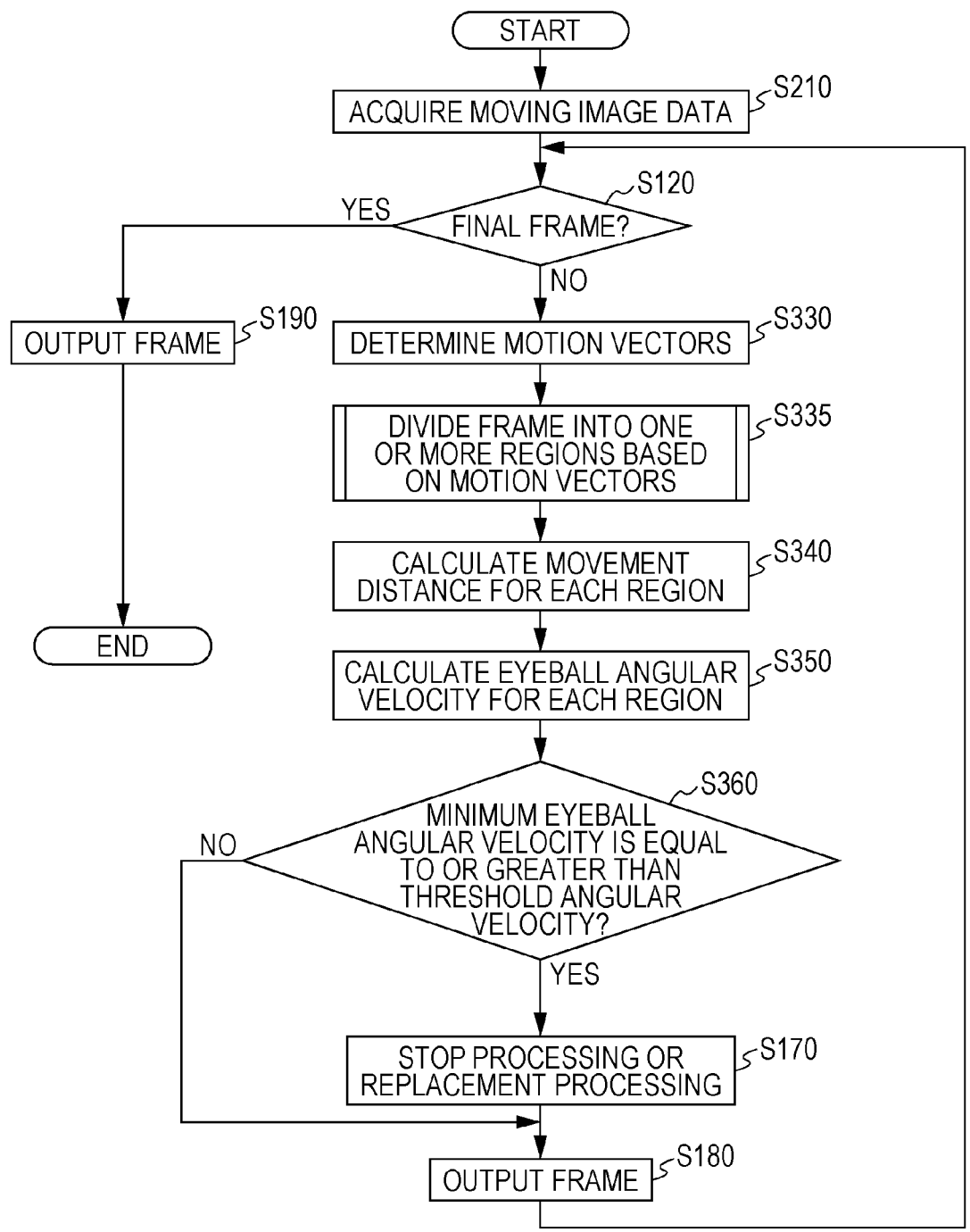
FIG. 13 is a flowchart illustrating an example of the operation of the image display device according to the first variation of the second embodiment.

Subsequently, an operation of image display device 300 according to the present variation will be described with reference to FIG. 13. FIG. 13 is a flowchart illustrating an example of the operation of image display device 300 according to the present variation.

As illustrated in FIG. 13, processing until determination whether the object frame is a final frame (steps S210 to S120) is an operation identical to the operation of image display device 100 according to the second embodiment illustrated in FIG. 6.

Next, motion vector calculation unit 312a acquires a next frame of the object frame from image acquisition unit 111, and determines the plurality of motion vectors between the object frame and the next frame (step S330). Specifically, motion vector calculation unit 312a calculates the motion vector for each extraction block in steps S231 to S236 illustrated in FIG. 7.

Next, region division unit 312b performs region division of the object frame based on distribution of a direction and size of the motion vector for each extraction block calculated by motion vector calculation unit 312a (step S335).

Figure 14:
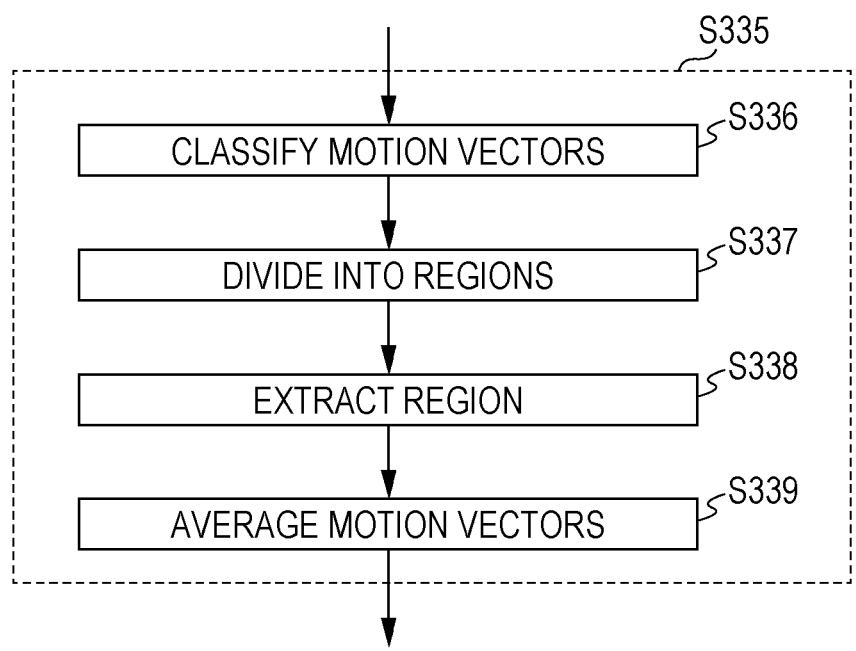
FIG. 14 is a flowchart illustrating an example of a region division method using the motion vector by the image display device according to the first variation of the second embodiment.

Here, details of a method of region division of step S335 will be described with reference to FIG. 14. FIG. 14 is a flowchart illustrating an example of the region division method using the motion vectors by image display device 300 according to the present variation. The present variation describes a method for classifying the plurality of motion vectors by clustering, as an example of region division using the motion vectors.

First, region division unit 312b classifies the plurality of motion vectors (step S336). Specifically, region division unit 312b acquires the motion vectors of the plurality of extraction blocks in the object frame, and clusters the plurality of motion vectors based on directions and sizes of the vectors. Any general statistics method may be used for the method of clustering. For example, region division unit 312b may use a hierarchical method such as a nearest neighbor method, or a division optimization technique such as a k-means method, as the method of clustering.

Next, in accordance with a clustering result of the plurality of motion vectors, region division unit 312b divides the plurality of extraction blocks into groups, thereby dividing the object frame into one or more regions (step S337).

Furthermore, region division unit 312b extracts a region having an area equal to or greater than a certain area from one or more divided regions (step S338). Specifically, region division unit 312b first calculates an area (a number of pixels) of each of the one or more divided regions. Region division unit 312b then extracts only sequential regions having an area equal to or greater than a predetermined area from the one or more divided regions. For example, region division unit 312b extracts sequential regions having 0.1% or more of the area of the entire screen. Note that a reference value for the area is 0.1% as an example, but other values may be used. Regions having an area less than the reference value, that is, regions that are not extracted do not undergo subsequent processing (step S339 illustrated in FIG. 14, and step S340 to step S180 illustrated in FIG. 13).

Next, region division unit 312b determines the motion vector for each extracted region (step S339). That is, region division unit 312b determines the motion vector that represents each extracted region. For example, region division unit 312b generates a mean vector by, for each extracted region, averaging the respective motion vectors of one or more extraction blocks that constitute the region. The mean vector for each extracted region is the motion vector that represents the corresponding region.

Returning to FIG. 13, movement distance calculation unit 313 calculates the movement distance for each region divided and extracted in step S335 (step S340). Specifically, movement distance calculation unit 313 calculates the movement distance corresponding to each of the plurality of motion vectors by using the motion vector for each extracted region and size information acquired by size acquisition unit 160. Calculation of the movement distance is as illustrated in FIG. 9 of the second embodiment.

Next, eyeball angular velocity calculation unit 320 calculates the eyeball angular velocity for each extracted region (step S350). Specifically, as described with reference to FIG. 3, eyeball angular velocity calculation unit 320 calculates the eyeball angular velocity corresponding to each of the plurality of movement distances, based on the distance information acquired by distance acquisition unit 170 and the plurality of movement distances.

Next, determination unit 330 determines whether the minimum eyeball angular velocity among the plurality of eyeball angular velocities is equal to or greater than the threshold angular velocity (S360). Specifically, determination unit 330 reads the threshold angular velocity stored in threshold storage unit 180, and determines whether the smallest angular velocity among the angular velocities calculated for respective regions is equal to or greater than the threshold angular velocity.

If determination unit 330 determines that the minimum eyeball angular velocity is equal to or greater than the threshold angular velocity (Yes in step S360), image processor 140 performs stop processing or replacement processing (step S170). If determination unit 330 determines that the minimum eyeball angular velocity is less than the threshold angular velocity (No in step S360), display unit 150 outputs, that is, displays the object frame of the moving image (step S180). Specific processing of image processor 140 and display unit 150 is similar to the processing in the second embodiment.

After outputting the object frame or the replaced frame (step S180), image display device 300 acquires the next frame as a new object frame, and repeats the processing after step S120.

Summary

As described above, in the present variation, when determination unit 330 determines that all the eyeball angular velocities calculated by eyeball angular velocity calculation unit 320 are equal to or greater than the lower limit of the eyeball angular velocity in the saccadic eye movement, image processor 140 stops the moving image, or replaces the moving image with a single color image. Specifically, region division unit 312b divides the object frame into one or more regions by using the motion vectors, and image processor 140 performs stop processing or replacement processing only when the eyeball angular velocity corresponding to the region where the motion is smallest among the one or more regions is equal to or greater than the threshold angular velocity. When determination unit 330 determines that at least one of the eyeball angular velocities calculated by eyeball angular velocity calculation unit 320 is less than the lower limit of the eyeball angular velocity in the saccadic eye movement, image processor 140 does not stop the moving image, and does not replace the moving image with a single color image.

Accordingly, for example, when a camera is panning or tilting following the movable body that moves fast, image processor 140 performs neither stop processing nor replacement processing. That is, neither stop processing nor replacement processing is performed on a moving image in which, although the background is moving at the velocity corresponding to the saccadic eye movement, the object (regions corresponding to the movable body) is not moving greatly in the image. Therefore, it is possible to alleviate visually induced motion sickness and eye fatigue caused by the overall image moving at high velocity, while inhibiting degradation in the moving image that follows the moving object.

Note that, in the present variation, region division unit 312b handles each of the plurality of motion vectors in a similar manner, regardless of a position of the region in the image corresponding to the motion vector, but region division unit 312b may divide the region by giving weight or conditions depending on a position in the image corresponding to the motion vector. For example, in region division by vector clustering, region division unit 312b may extract a smaller region in a central portion of the image, and may extract a larger region in a peripheral portion of the image. For example, region division unit 312b may extract sequential regions in the central portion of the image, and may extract regions as one region in the peripheral portion of the image if the cluster of the vectors is identical, even if the regions are not sequential.

Figure 15:
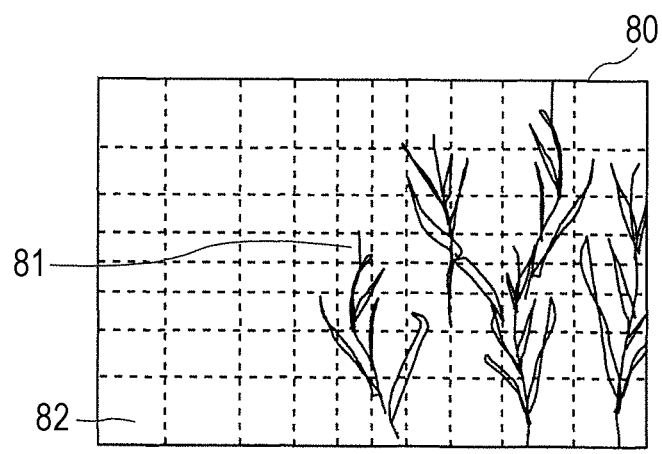
FIG. 15 is a diagram illustrating an example of different sizes in which the image is divided in the first variation of the second embodiment.

FIG. 15 is a diagram illustrating an example of different sizes in which the image is divided in the present variation. Specifically, as illustrated in FIG. 15, frame 80 is divided into smaller regions (blocks) in the central portion of frame 80, whereas frame 80 is divided into larger regions in the peripheral portion of frame 80. In other words, motion vector determination unit 312 (region division unit 312b) divides the image included in frame 80 into the plurality of blocks, so that a number of blocks may become larger in the central portion of frame 80 than in the peripheral portion of frame 80. FIG. 15 illustrates only one frame 80, but region division unit 312b divides the image included in two sequential frames similarly.

Accordingly, block 81 positioned in the central portion of frame 80 is smaller than block 82 positioned in the peripheral portion of frame 80. For example, a height and width of block 81 are half the height and width of block 82. Although both the height and width of the block differ here, only one of the height and width may differ.

For a following moving image, a movable body to be followed is likely to be positioned in the central portion of frame 80. It is possible to calculate a large number of motion vectors by dividing the central portion of frame 80 into smaller regions. This allows image display device 300 to support, for example, a case where camera 40 follows a small movable body, and to increase accuracy of determination of following moving images.

Figure 16:
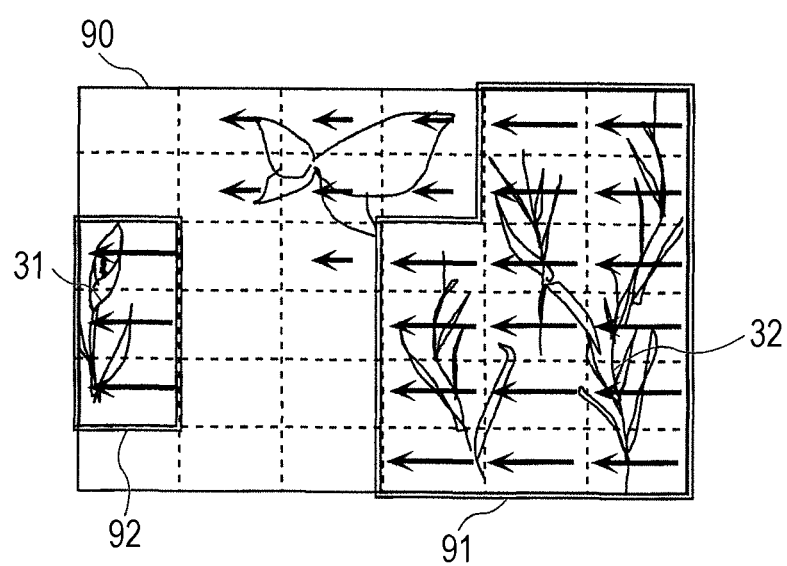
FIG. 16 is a diagram illustrating an example of combining the plurality of blocks depending on similarity of the motion vectors according to the first variation of the second embodiment.

FIG. 16 is a diagram illustrating an example of combining a plurality of blocks depending on similarity of the motion vectors according to the present variation. That is, FIG. 16 is a diagram for describing clustering of the regions with the motion vectors.

In a case where two motion vectors of respective adjacent blocks are similar, motion vector determination unit 312 (region division unit 312b) combines the two adjacent blocks into one block. The case where two motion vectors of respective adjacent blocks are similar refers to a case where the two motion vectors of respective blocks are identical or substantially identical. Specifically, in a case where differences in a size and direction between two motion vectors of respective blocks are within a predetermined range (for example, several percent), the two motion vectors of the respective blocks are similar.

For example, in 16 blocks of FIG. 16 in which right grass 32 is positioned, the motion vectors are substantially identical. Therefore, 16 blocks may be combined into one region 91 with only one motion vector.

Furthermore, not only adjacent regions, but also even distant regions may be combined to be a region that shares the motion vector if the motion vectors are considered to be identical or substantially identical. For example, FIG. 16 illustrates three adjacent blocks in which flower 31 is positioned in a left end. These three blocks, which have motion vectors substantially identical to one another, may be combined into one region 92. Moreover, since the motion vector of region 92 in which flower 31 is positioned is substantially identical to the motion vector of region 91 in which right grass 32 is positioned, two unadjacent regions 91 and 92 may also be combined as one region to share the motion vector.

In the present variation, determination unit 330 determines that the moving image is a following moving image, only by region division with motion vectors and the eyeball angular velocity for each region, but the determination is not limited to this example. For example, determination unit 330 may determine whether the moving image is a following moving image by image recognition processing, etc. using a color or outline of the region.

In the present variation, region division unit 312*b* performs region division, movement distance calculation unit 313 calculates the movement distances for respective regions, and eyeball angular velocity calculation unit 320 calculates the eyeball angular velocities for respective regions. Determination unit 330 performs determination using a minimum value of the eyeball angular velocities calculated for respective regions.

However, eyeball angular velocity calculation unit 320 may calculate the eyeball angular velocity based on the minimum movement distance and viewing distance among the plurality of movement distances. That is, eyeball angular velocity calculation unit 320 may calculate only one eyeball angular velocity corresponding to the minimum movement distance. Specifically, eyeball angular velocity calculation unit 320 may calculate the eyeball angular velocity only for the minimum motion vector among the sizes of the motion vectors (that is, movement distances) calculated by movement distance calculation unit 313 for respective regions. In this case, determination unit 330 may perform determination of the only eyeball angular velocity calculated by eyeball angular velocity calculation unit 320. This allows reduction of an amount of processing required for calculation of the eyeball angular velocity.

The Second Variation of the Second Embodiment

An image display device according to the second variation of the second embodiment retains a distance correspondence table that associates a screen size with a viewing distance, determines the viewing distance from the screen size, and calculates an eyeball angular velocity.

The size of a screen (a display or a monitor) and the viewing distance have correlation. For example, it is generally said that a standard viewing distance is three times a height of the screen (display). This eliminates the need for inputting or measuring the viewing distance, and may alleviate visually induced motion sickness and eye fatigue with a simple configuration.

Figure 17:
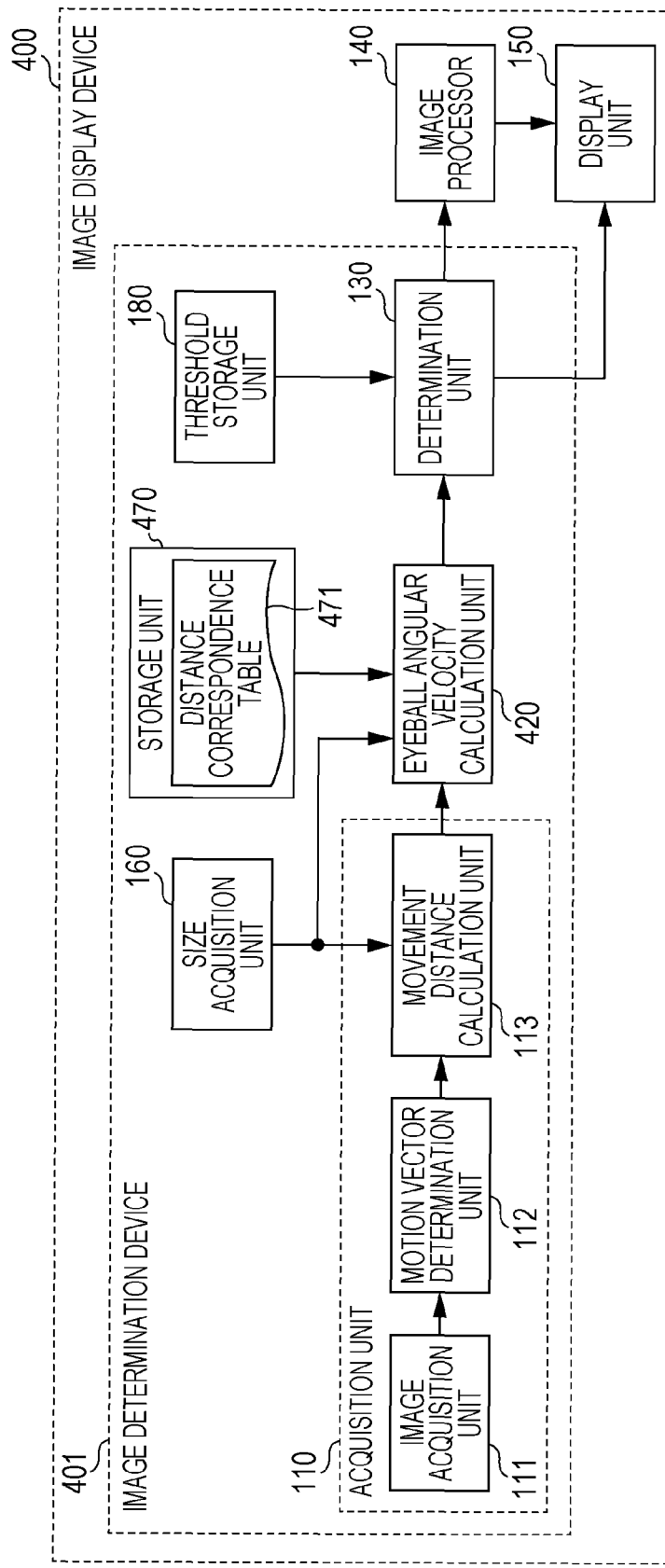
FIG. 17 is a block diagram illustrating an example of the configuration of the image display device according to the second variation of the second embodiment.

First, the image display device according to the present variation will be described with reference to FIG. 17. FIG. 17 is a block diagram illustrating an example of the configuration of image display device 400 according to the present variation.

As illustrated in FIG. 17, image display device 400 includes image determination device 401, image processor 140, and display unit 150. Image determination device 401 differs from image determination device 101 illustrated in FIG. 5 in that image determination device 401 includes eyeball angular velocity calculation unit 420 and storage unit 470 for storing distance correspondence table 471 instead of eyeball angular velocity calculation unit 120 and distance acquisition unit 170. The following description focuses on differences from the second embodiment, and a description about components identical to components of FIG. 5 may be omitted.

Storage unit 470 is, for example, a memory for storing distance correspondence table 471. Storage unit 470 stores predetermined distance correspondence table 471, for example.

Distance correspondence table 471 is a table that associates one or more screen sizes with one or more viewing distances. Specifically, distance correspondence table 471 associates the plurality of screen sizes with corresponding standard viewing distances, respectively.

FIG. 18 is a diagram illustrating an example of distance correspondence table 471 according to the present variation. As illustrated in FIG. 18, distance correspondence table 471 includes, for example, a vertical length and horizontal length of a screen as the screen size. In addition, distance correspondence table 471 includes standard viewing distances corresponding to the respective screen sizes. As described above, the viewing distance associated with the screen size is approximately three times the vertical length of the screen size.

With reference to distance correspondence table 471, eyeball angular velocity calculation unit 420 acquires the viewing distance corresponding to the size acquired by size acquisition unit 160, and calculates the eyeball angular velocity by using the acquired viewing distance and the movement distance calculated by movement distance calculation unit 113. Specifically, eyeball angular velocity calculation unit 420 selects the viewing distance corresponding to size information acquired by size acquisition unit 160 with reference to distance correspondence table 471. Eyeball angular velocity calculation unit 420 then converts, into the eyeball angular velocity, the movement distance calculated by movement distance calculation unit 113 by using the viewing distance selected from distance correspondence table 471. A specific method for calculation of the eyeball angular velocity is similar to the method described in the second embodiment, and thus description thereof is omitted.

For example, when the vertical length of the screen is 597 mm and the horizontal length is 1060 mm in the screen size information acquired by size acquisition unit 160, eyeball angular velocity calculation unit 420 specifies a 48-inch screen size identical to the acquired screen size with reference to distance correspondence table 471 of FIG. 18. Eyeball angular velocity calculation unit 420 acquires a value of 1800 mm, which is the viewing distance corresponding to the specified screen size.

In this way, by retaining distance correspondence table 471, image display device 400 according to the present variation does not need to perform input or measurement of the viewing distance, may omit time and effort of input by the viewer, and may increase user convenience. Alternatively, since a sensor or processing for distance measurement is unnecessary, image display device 400 according to the present variation may alleviate visually induced motion sickness and the like with a simple configuration.

The Third Variation of the Second Embodiment

In the above-described embodiments and variations thereof, examples have been described in which a threshold angular velocity used for determination is a fixed value. The image display device according to the third variation of the second embodiment, however, adjusts the threshold angular velocity based on a ratio of a size of a visual field of a viewer to a screen size.

For example, perception of a movement with a wide visual field has generally greater influence than perception of a movement with a narrow visual field upon a phenomenon caused by a discrepancy between perception of movement with sense of sight and other senses, such as vestibular sensation, like visually induced motion sickness. The image display device according to the present variation uses a fact that an influence of perception of a movement with a wide visual field is great, and that an influence of perception of a movement with a narrow visual field is small. Specifically, the image display device according to the present variation performs stop processing, etc., when the screen size is large with respect to the size of the visual field of the viewer, and adjusts the threshold angular velocity to a larger value when the screen size is small with respect to the size of the visual field of the viewer, thereby avoiding unnecessary processing on a moving image that is unlikely to cause visually induced motion sickness, etc.

A binocular visual field of a human being is generally said to be about 120 degrees in a horizontal direction when a head is upright.

Figure 19:
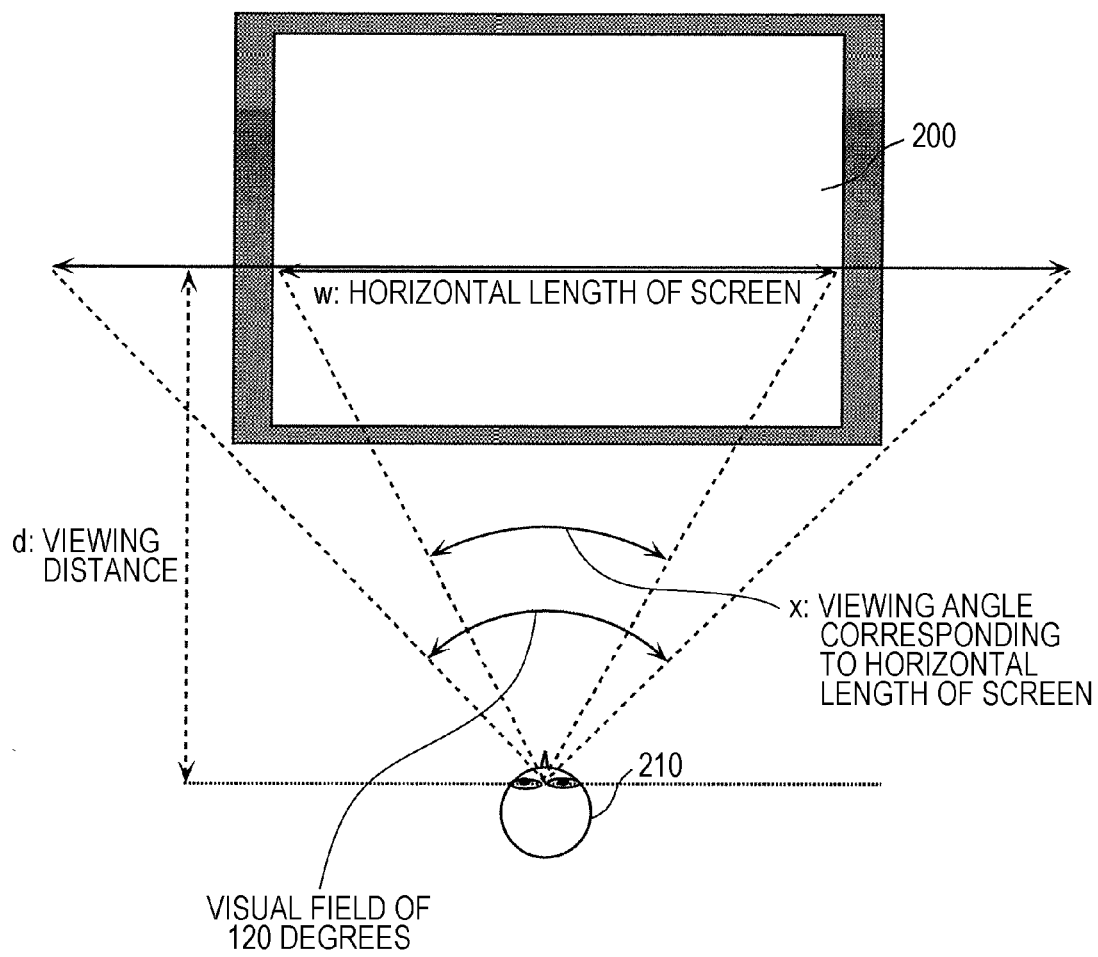
FIG. 19 is a schematic diagram illustrating a relationship between a size of a horizontal visual field of the viewer and a horizontal size of the screen.

FIG. 19 is a diagram schematically illustrating a relationship between the horizontal visual field of the viewer and the horizontal size of the screen. As illustrated in FIG. 19, a ratio of the screen size to the size of the visual field of the viewer is, for example, a ratio of an angle corresponding to horizontal length w of screen 200 viewed by viewer 210 to the binocular horizontal visual field of 120 degrees.

Configuration of the Image Display Device

Figure 20:
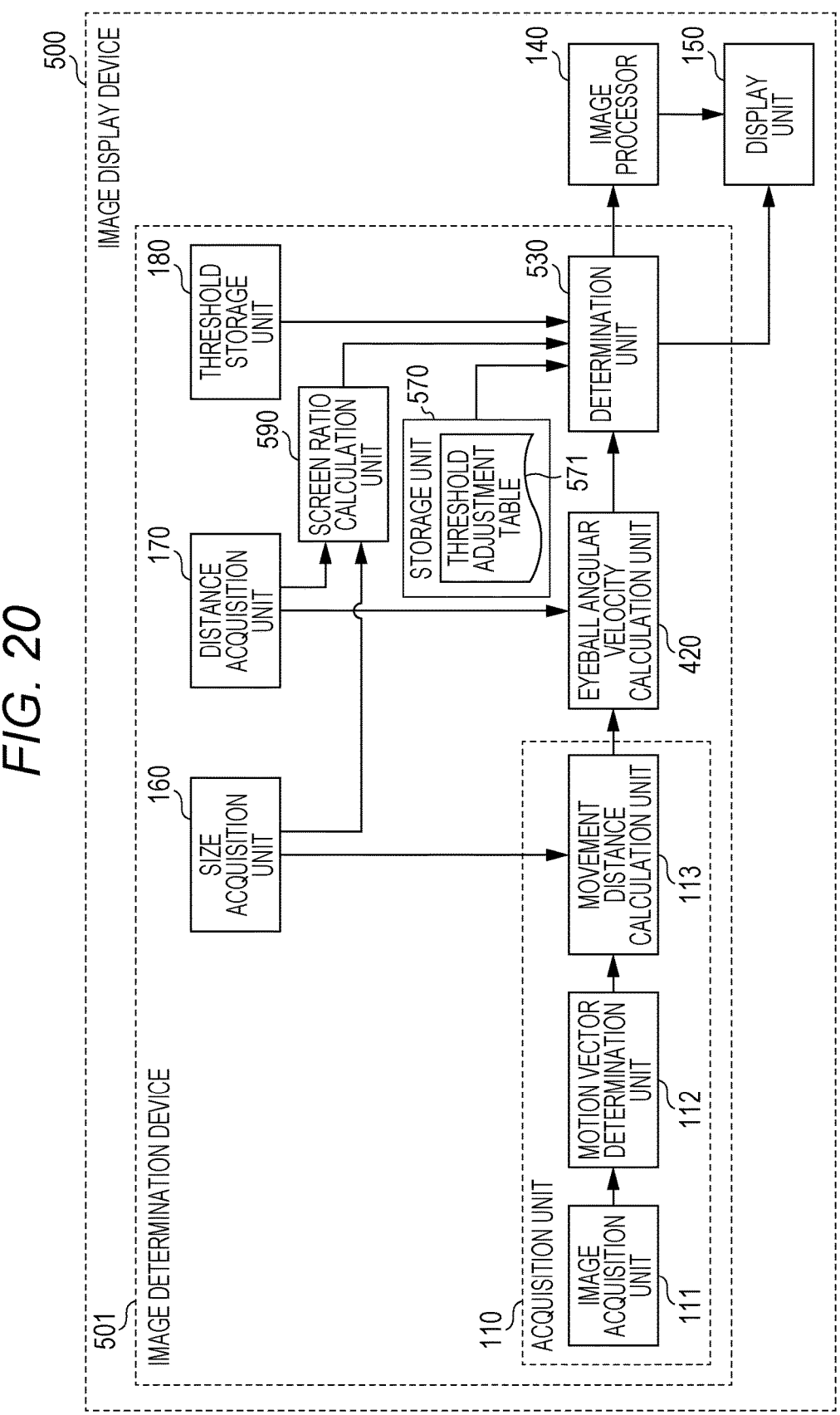
FIG. 20 is a block diagram illustrating an example of the configuration of the image display device according to the third variation of the second embodiment.

FIG. 20 is a block diagram illustrating an example of the configuration of image display device 500 according to the present variation.

As illustrated in FIG. 20, image display device 500 includes image determination device 501, image processor 140, and display unit 150. Image determination device 501 differs from image determination device 101 illustrated in FIG. 5 in that image determination device 501 further includes storage unit 570 for storing threshold adjustment table 571 and screen ratio calculation unit 590, and includes determination unit 530 instead of determination unit 130. The following description focuses on differences from the second embodiment, and a description about components identical to components of FIG. 5 may be omitted.

Screen ratio calculation unit 590 calculates a ratio of the screen size where the moving image is displayed to the size of the visual field of the viewer (hereinafter the ratio may be described as a screen ratio). Specifically, screen ratio calculation unit 590 calculates the size that the screen occupies with respect to the size of the visual field of the viewer.

The screen ratio is, for example, a proportion of viewing angle x corresponding to horizontal length w of screen 200 viewed by viewer 210 to the binocular horizontal visual field of 120 degrees of viewer 210, as illustrated in FIG. 19. For example, screen ratio calculation unit 590 calculates the screen ratio by using horizontal length w of screen 200 acquired from size acquisition unit 160, and viewing distance d acquired from distance acquisition unit 170. Specifically, viewing angle x is calculated by [Equation 4] below.

$$x = 2\arctan(w/2d) \qquad \text{[Equation 4]}$$

Furthermore, screen ratio calculation unit 590 calculates the screen ratio by dividing viewing angle x by 120 degrees, which is the size of the visual field of the viewer.

For example, in an example of viewing the 40-inch display with the vertical length of 49.8 cm and the horizontal length of 88.4 cm, when the viewing distance is three times the vertical length, which is said to be the standard viewing distance, that is approximately 150 cm, the viewing angle is approximately 33 degrees. Therefore, the screen ratio is approximately 0.27. Even for an identical 40-inch display, when the viewing distance is 100 cm, the viewing angle is approximately 48 degrees and the screen ratio is approximately 0.4. Thus, even when an identical display is viewed, the viewing angle and the screen ratio differ depending on the viewing distance.

For a small display such as a 20-inch display with the vertical length of 24.9 cm and the horizontal length of 44.2 cm, even when the viewing distance is 100 cm, the viewing angle is approximately 25 degrees, and the screen ratio is approximately 0.2. For a 8-inch small display with the vertical length of 10.0 cm and the horizontal length of 17.7 cm, even when the viewing distance is 30 cm, the viewing angle is approximately 33 degrees, and the screen ratio is approximately 0.27.

A standard screen ratio is approximately 0.3. The screen ratio smaller than 0.3 is unlikely to cause visually induced motion sickness, and providing an adjustment ratio may inhibit obstruction to viewing of the screen by the viewer.

For example, in the example of FIG. 2A and FIG. 2B, for the 40-inch display with the viewing distance of 150 cm, the eyeball angular velocity is 515 degrees/second, which exceeds the threshold angular velocity of 350 degrees/second. Even when the viewing distance is 200 cm, the eyeball angular velocity is 380 degrees/second, which exceeds the threshold angular velocity of 350 degrees/second.

However, for the 40-inch display with the viewing distance of 200 cm, the screen ratio is approximately 0.21. Therefore, the adjustment ratio 1.2 of the threshold angular velocity is applied, and the threshold angular velocity is obtained by multiplying 380 degrees/second by 1.2, which is 420 degrees/second.

In the example of FIG. 2A and FIG. 2B, since the eyeball angular velocity (380 degrees/second) is less than the adjusted threshold angular velocity (420 degrees/second) when the viewing distance is 200 cm, stop processing or replacement processing of an image is not performed.

Storage unit 570 is, for example, a memory for storing threshold adjustment table 571. Storage unit 570 stores predetermined threshold adjustment table 571.

Threshold adjustment table 571 is a table that associates one or more ratios of the screen size to the size of the visual field of the viewer with one or more parameters for determining the threshold angular velocity. That is, threshold adjustment table 571 associates one or more screen ratios with one or more parameters for threshold adjustment. Specifically, threshold adjustment table 571 stores the parameter for adjusting the threshold angular velocity so that the threshold angular velocity may decrease when the screen ratio increases, and the threshold angular velocity may increase when the screen ratio decreases.

FIG. 21 is a diagram illustrating an example of threshold adjustment table 571 according to the present variation. In the example illustrated in FIG. 21, the adjustment ratios for adjusting the threshold angular velocity are associated with a plurality of ranges of the screen ratio. The adjustment ratio of a larger value is associated with the smaller screen ratio.

Note that the adjustment ratio is a value by which the predetermined threshold angular velocity is multiplied. That is, the threshold angular velocity after adjustment increases as the adjustment ratio increases. The proportion of the screen to the visual field of the viewer decreases as the screen ratio decreases, which is unlikely to cause visually induced motion sickness. Therefore, adjusting the threshold angular velocity to a larger value may prevent visually induced motion sickness, and inhibit obstruction to viewing of the screen by the viewer.

In addition to the function of determination unit 130, determination unit 530 further acquires the parameter corresponding to the screen ratio calculated by screen ratio calculation unit 590 with reference to threshold adjustment table 571, and uses the acquired parameter to determine the threshold angular velocity. Determination unit 530 then determines whether the eyeball angular velocity is equal to or greater than the determined threshold angular velocity.

Specifically, determination unit 530 acquires the adjustment ratio corresponding to the screen ratio calculated by screen ratio calculation unit 590 with reference to threshold adjustment table 571, and uses the acquired adjustment ratio to adjust the threshold angular velocity stored in threshold storage unit 180. Determination unit 530 then compares the threshold angular velocity after adjustment with the eyeball angular velocity calculated by eyeball angular velocity calculation unit 120, to determine whether the moving image may cause visually induced motion sickness.

Operation of the Image Display Device

Figure 22:
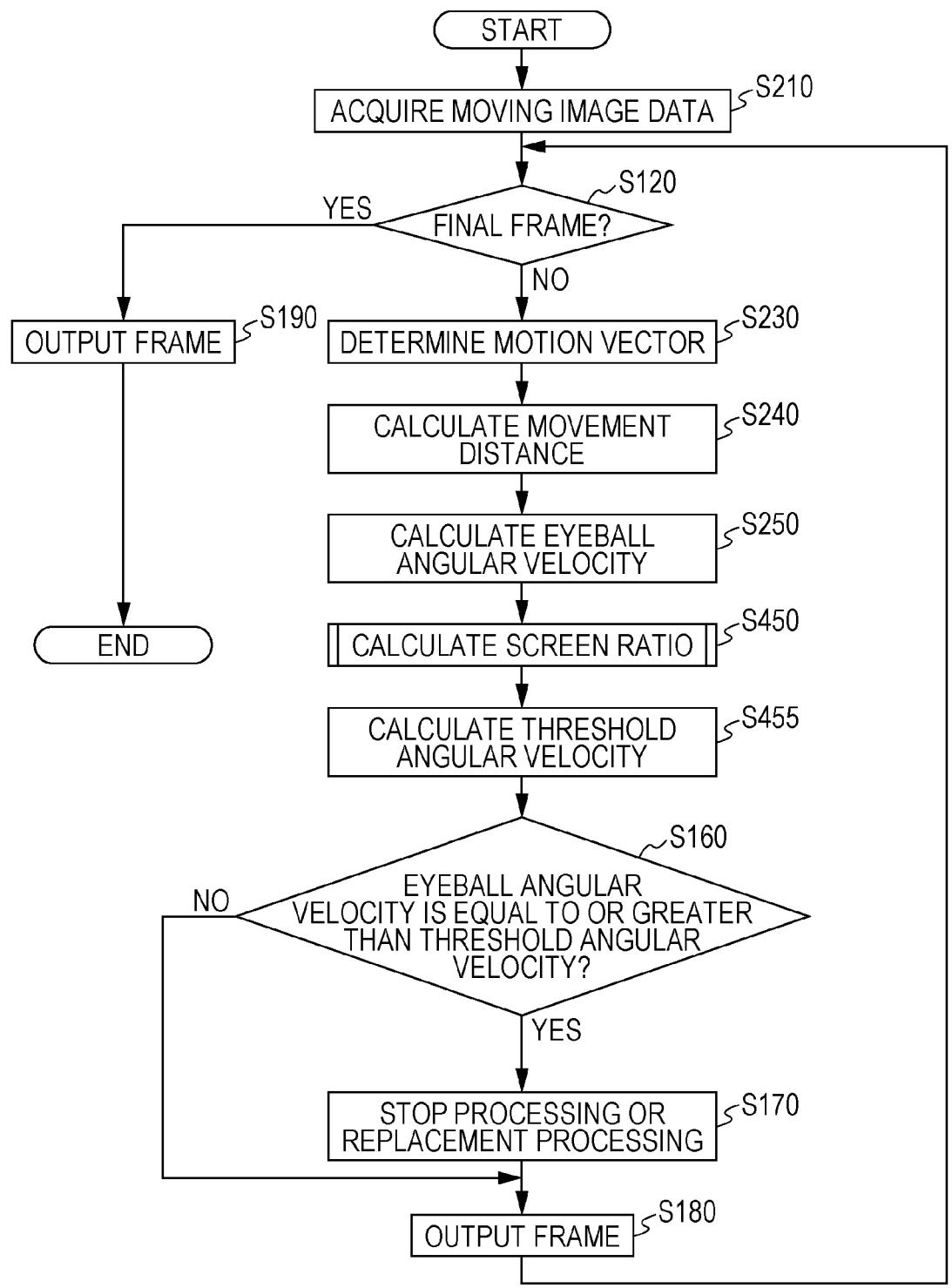
FIG. 22 is a flowchart illustrating an example of the operation of the image display device according to the third variation of the second embodiment.

Subsequently, an operation of image display device 500 according to the present variation will be described with reference to FIG. 22. FIG. 22 is a flowchart illustrating an example of the operation of image display device 500 according to the present variation.

As illustrated in FIG. 22, processing until calculation of the eyeball angular velocity (steps S210 to S250) is identical to the operation of image display device 100 of the second embodiment illustrated in FIG. 6.

Screen ratio calculation unit 590 calculates the screen ratio based on information on the horizontal length of the screen out of the size information acquired by size acquisition unit 160, and on the distance information acquired by distance acquisition unit 170 (step S450).

Figure 23:
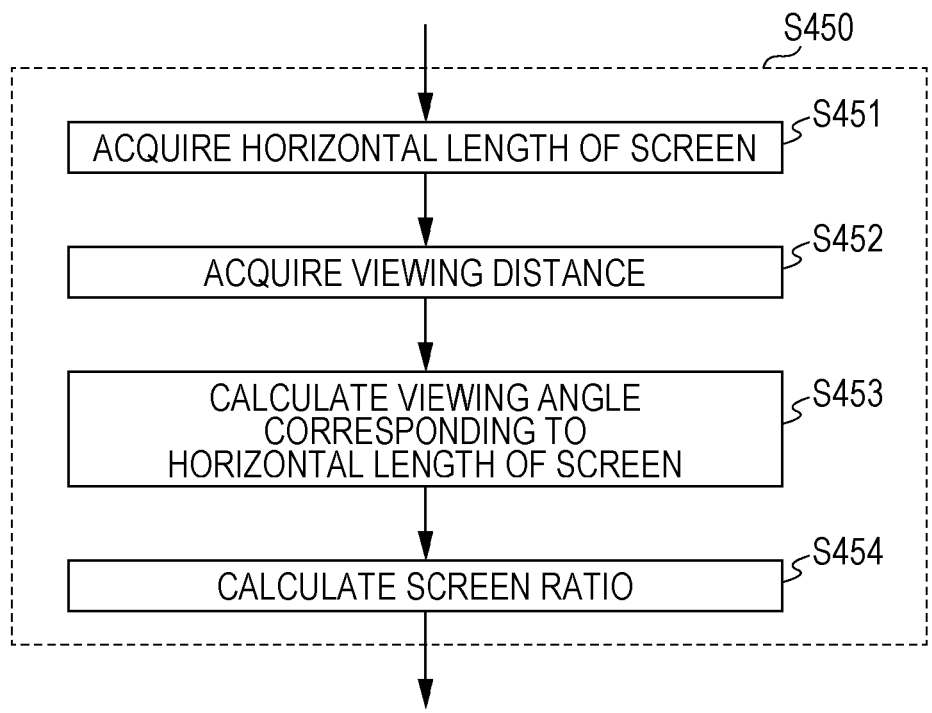
FIG. 23 is a flowchart illustrating an example of a method for calculating a screen ratio by the image display device according to the third variation of the second embodiment.

Here, details of a method for calculating the screen ratio of step S450 will be described with reference to FIG. 23. FIG. 23 is a flowchart illustrating an example of the method for calculating the screen ratio by image display device 500 according to the present variation.

Screen ratio calculation unit 590 acquires, from size acquisition unit 160, the horizontal length of the screen that the viewer is viewing (step S451). Next, screen ratio calculation unit 590 acquires the viewing distance from distance acquisition unit 170 (step S452).

Furthermore, screen ratio calculation unit 590 calculates viewing angle x corresponding to the horizontal length of the screen acquired in step S451 (step S453). Screen ratio calculation unit 590 then calculates the screen ratio by dividing viewing angle x by the size of the horizontal visual field of the viewer, for example, 120 degrees (step S454).

Returning to FIG. 22, determination unit 530 adjusts the threshold angular velocity stored in threshold storage unit 180 (step S455). Specifically, based on the screen ratio calculated by screen ratio calculation unit 590, determination unit 530 first acquires the adjustment ratio for adjusting the threshold angular velocity stored in threshold storage unit 180 with reference to threshold adjustment table 571. Furthermore, determination unit 530 adjusts the threshold angular velocity by multiplying the threshold angular velocity stored in threshold storage unit 180 by the adjustment ratio.

In the present variation, the parameter for threshold adjustment is the adjustment ratio, and determination unit 530 adjusts the threshold by multiplying the threshold angular velocity by the adjustment ratio, but any adjustment method may be used. However, the threshold angular velocity is to be adjusted so that the threshold angular velocity may decrease as the screen ratio increases, and the threshold angular velocity may increase as the screen ratio decreases.

Subsequent processing is similar to processing of the second embodiment, and thus description thereof will be omitted.

[Summary]

As described above, image display device 500 according to the present variation adjusts the threshold angular velocity depending on the proportion of the screen to the visual field (screen ratio), and compares the adjusted threshold angular velocity with the eyeball angular velocity. This makes it possible to alleviate visually induced motion sickness and eye fatigue of the viewer, and to avoid applying unnecessary processing to the screen that is unlikely to cause visually induced motion sickness, etc.

In the present variation, calculation of the screen ratio (step S450) and adjustment of the threshold angular velocity (step S455) are performed between calculation (step S250) and threshold determination (step S160) of the eyeball angular velocity, but processing sequence is not limited to this example. For example, calculation of the screen ratio (step S450) may be performed at any timing after determination of the final frame (step S120) and before adjustment of the threshold angular velocity (step S455). Adjustment of the threshold angular velocity (step S455) may be performed at any timing after calculation of the screen ratio (step S450) and before threshold determination (step S160).

In the present variation, sequence of acquisition of the horizontal length of the screen (step S451) and acquisition of the viewing distance (step S452) may be another sequence.

In the present variation, an example has been described in which the parameter for threshold adjustment is the adjustment ratio, but the parameter is not limited to this example. For example, the parameter may be a function for adjusting the threshold angular velocity.

THIRD EMBODIMENT

The above-described embodiments and variations have described examples of processing and displaying a moving image for each frame. However, an image processing device according to the third embodiment includes an image editing unit that adding, to the moving image, tag information for stopping the moving image or for replacing the moving image with a single color image when it is determined that an eyeball angular velocity is equal to or greater than a threshold angular velocity. Specifically, an image display system including the image processing device according to the present embodiment accumulates determination results for respective frames, and adds the tag information for performing stop processing or replacement processing depending on a screen size at a time of playback of moving image data, etc. This allows generation of the moving image data that may alleviate visually induced motion sickness and eye fatigue caused by rapid movement of the overall image without performing processing every time the moving image is played.

[Configuration of the Image Display System]

Figure 24:
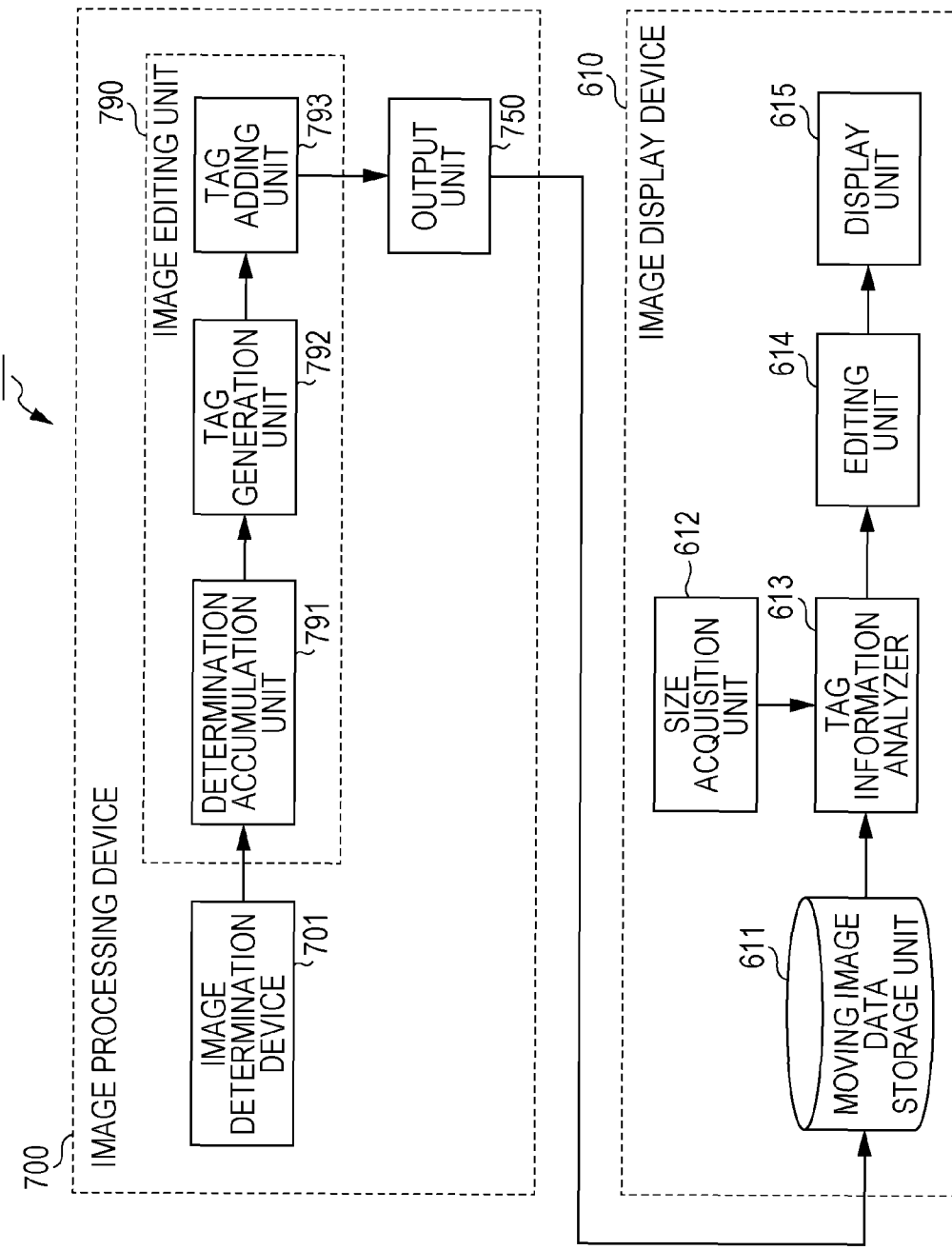
FIG. 24 is a block diagram illustrating an example of the configuration of the image display system according to a third embodiment.
Figure 25:
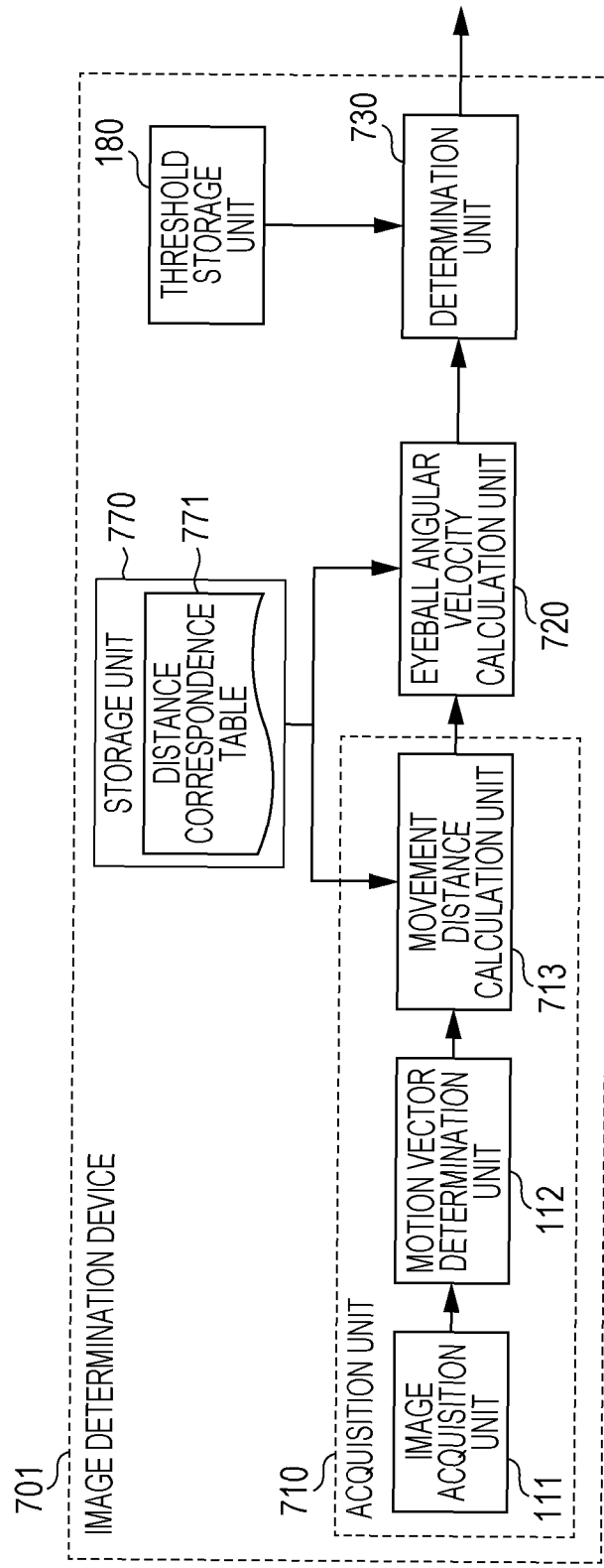
FIG. 25 is a block diagram illustrating an example of the configuration of an image determination device according to the third embodiment.

First, the image display system according to the present embodiment will be described with reference to FIG. 24 and FIG. 25. FIG. 24 is a block diagram illustrating an example of a configuration of image display system 600 according to the present embodiment. FIG. 25 is a block diagram illustrating an example of a configuration of image determination device 701 according to the present embodiment.

As illustrated in FIG. 24, image display system 600 includes image processing device 700 and image display device 610. Image processing device 700 includes image determination device 701, image editing unit 790, and output unit 750.

[Configuration of the Image Processing Device]

First, image determination device 701 included in image processing device 700 will be described with reference to FIG. 25. As illustrated in FIG. 25, image determination device 701 includes acquisition unit 710, eyeball angular velocity calculation unit 720, determination unit 730, storage unit 770 for storing distance correspondence table 771, and threshold storage unit 180. Acquisition unit 710 differs from acquisition unit 110 illustrated in FIG. 5 in that acquisition unit 710 includes movement distance calculation unit 713 instead of movement distance calculation unit 113. The following description focuses on differences from the second embodiment, and a description about components identical to components of FIG. 5 may be omitted.

Movement distance calculation unit 713 calculates sizes of motion vectors on the screen as movement distances of an object based on the predetermined screen sizes. Specifically, movement distance calculation unit 713 calculates the movement distances for respective screen sizes from the motion vectors determined by motion vector determination unit 112, based on size information about the screen illustrated in distance correspondence table 771. That is, movement distance calculation unit 713 calculates the movement distances corresponding to the plurality of respective screen sizes illustrated in distance correspondence table 771. A specific method for calculating the movement distances is identical to the method in the second embodiment, etc.

Eyeball angular velocity calculation unit 720 calculates the eyeball angular velocities by using the movement distances calculated by movement distance calculation unit 713. For example, eyeball angular velocity calculation unit 720 first refers to distance correspondence table 771 to acquire viewing distances for respective screen sizes. Eyeball angular velocity calculation unit 720 then uses the acquired viewing distances for respective screen sizes and the movement distances for respective screen sizes calculated by movement distance calculation unit 713 to calculate the eyeball angular velocities. That is, eyeball angular velocity calculation unit 720 calculates the eyeball angular velocities for respective screen sizes. A specific method for calculating the eyeball angular velocities is identical to the method in the second embodiment, etc.

In a similar manner to determination unit 130, determination unit 730 determines whether each of the eyeball angular velocities is equal to or greater than the threshold angular velocity. Specifically, determination unit 730 compares the eyeball angular velocity calculated for each screen size with the threshold angular velocity stored in threshold storage unit 180 to determine whether to perform stop processing or replacement processing for each screen size.

Storage unit 770 is, for example, a memory for storing distance correspondence table 771. Storage unit 770 stores predetermined distance correspondence table 771, for example.

Distance correspondence table 771 is a table that associates one or more screen sizes with one or more viewing distances, respectively. Specifically, distance correspondence table 771 associates the size information with the viewing distance corresponding to the screen size.

FIG. 26 is a diagram illustrating an example of distance correspondence table 771 according to the present embodiment. As illustrated in FIG. 26, distance correspondence table 771 includes, for example, numbers of vertical pixels of the screen, numbers of horizontal pixels, vertical lengths, and horizontal lengths, as the screen size. In addition, distance correspondence table 771 includes viewing distances corresponding to the respective screen sizes. Each of the viewing distances is approximately three times the vertical length of the screen size, for example.

Subsequently, a configuration of image editing unit 790 will be described with reference to FIG. 24. Image editing unit 790 includes determination accumulation unit 791, tag generation unit 792, and tag adding unit 793.

Determination accumulation unit 791 is, for example, a memory for accumulating the determination results made by determination unit 730. Specifically, determination accumulation unit 791 accumulates the determination results of the eyeball angular velocities for respective frames, which are output from determination unit 730.

Based on the determination results accumulated in determination accumulation unit 791, tag generation unit 792 generates the tag information that indicates a period in which it is determined that the eyeball angular velocity is equal to or greater than the threshold angular velocity (hereinafter the period may be described as an editing section). Specifically, based on the determination results for respective frames accumulated in determination accumulation unit 791, tag generation unit 792 generates the tag information for performing stop processing or replacement processing for alleviating visually induced motion sickness and eye fatigue, in accordance with the size of the screen that displays the moving image during image playback, and the viewing distance.

Tag adding unit 793 adds the tag information to the moving image. Specifically, tag adding unit 793 combines the tag information generated by tag generation unit 792 and image information to generate moving image information with additional information (moving image data).

FIG. 27 is a diagram illustrating an example of the tag information according to the present embodiment. For example, as illustrated in FIG. 27, conditions for performing stop processing or replacement processing are described at time positions in the moving image data.

For example, in the description of FIG. 27, "stop motion" indicates stop processing. "More than 900" and "more than 700" are examples of the conditions for performing stop processing or replacement processing, and indicate that stop processing is to be performed, for example, when the moving image is displayed on the screen with the number of horizontal pixels equal to or greater than 900 pixels and 700 pixels, respectively. "<start>-</end>" indicates a period for performing stop processing, that is, the editing section.

Thus, the tag information includes information for specifying the editing section, and information for specifying the screen size for which stop processing, etc. is to be performed. The screen size information is, for example, information that indicates a minimum size of the screen for which stop processing, etc. is to be performed. Thus, stop processing, etc. may be performed when the moving image is to be displayed on the screen with the size larger than the minimum size.

For example, for moving image data compressed according to a standard such as MPEG (Motion Picture Experts Group), the tag information is added to a header section, etc. specified by the standard.

Output unit 750 outputs the moving image information with additional information generated by tag adding unit 793 to a storage device, such as a HDD (Hard Disk Drive), or a moving image playback device, etc. According to the present embodiment, output unit 750 outputs the moving image information with additional information to image display device 610.

Configuration of the Image Display Device

Next, image display device 610 illustrated in FIG. 24 will be described. As illustrated in FIG. 24, image display device 610 includes moving image data storage unit 611, size acquisition unit 612, tag information analyzer 613, editing unit 614, and display unit 615.

Moving image data storage unit 611 is, for example, a memory for storing the moving image data including the tag information generated by image processing device 700.

Size acquisition unit 612 acquires the screen size of display unit 615. Specifically, size acquisition unit 612 acquires the screen size of the display that displays the moving image. Size acquisition unit 612 may acquire the size information, for example via an unillustrated input section or communication between connected apparatuses. Alternatively, when the screen is fixed, size acquisition unit 612 may read and acquire previously stored screen size information, etc.

Tag information analyzer 613 uses the size acquired by size acquisition unit 612 to analyze the tag information added to the moving image, thereby specifying the period in which stop processing or replacement processing is to be performed. That is, tag information analyzer 613 specifies the period in which it is determined that the eyeball angular velocity is equal to or greater than the threshold angular velocity, that is, the editing section.

Specifically, tag information analyzer 613 extracts a description regarding the editing section for alleviating visually induced motion sickness or eye fatigue caused by the movement distance of the image, from the tag information on the moving image data stored in moving image data storage unit 611. For example, the description regarding the editing section is "<start>-</end>" illustrated in FIG. 27.

Editing unit 614 performs stop processing for stopping the moving image in the editing section specified by tag information analyzer 613, or replacement processing for replacing the moving image in the editing section with a single color image. Specific processing is similar to the processing of image processor 140 illustrated in FIG. 5, and thus description thereof is omitted.

Display unit 615 is a monitor or display that has a screen for displaying the moving image. Display unit 615 displays, for example, the moving image processed by editing unit 614 on the screen.

[Operation of the Image Processing Device]

Figure 28:
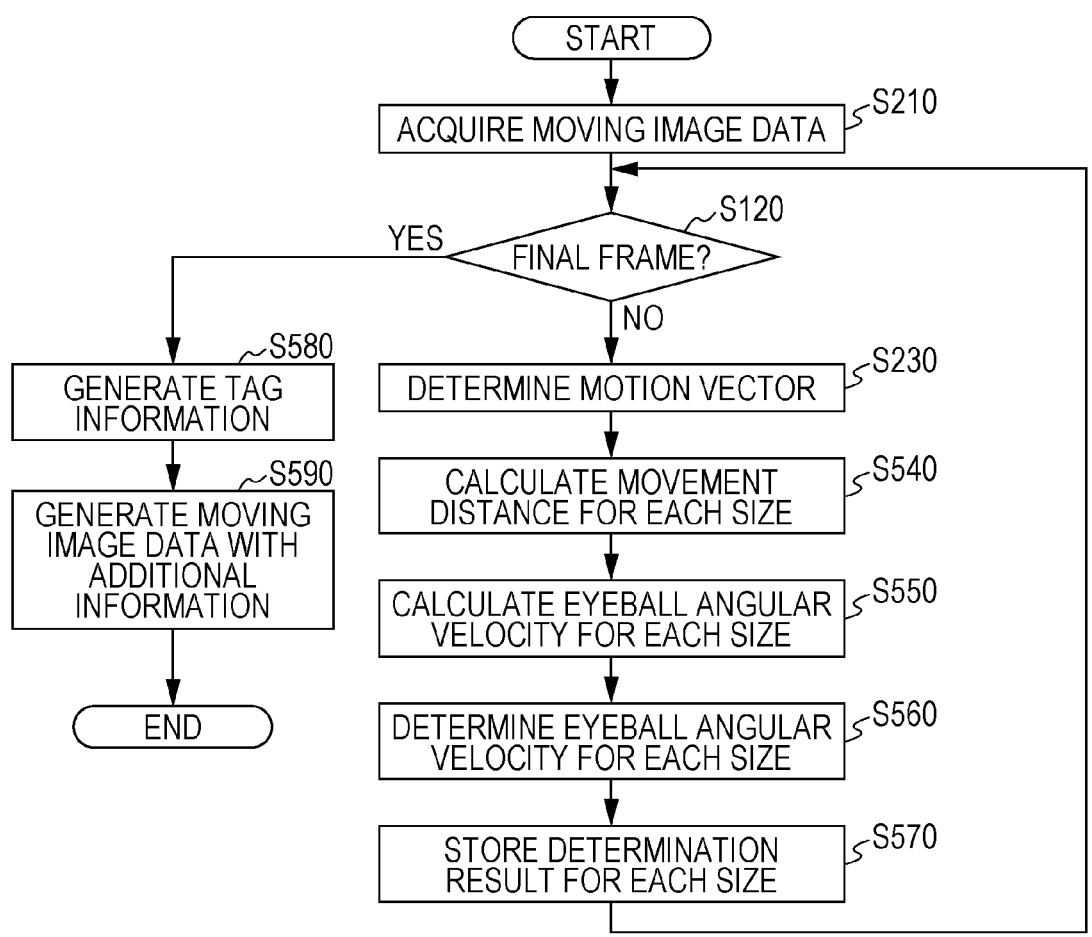
FIG. 28 is a flowchart illustrating an example of an operation of an image processing device according to the third embodiment.

Subsequently, an operation of image processing device 700 according to the present embodiment will be described with reference to FIG. 28. FIG. 28 is a flowchart illustrating an example of the operation of image processing device 700 according to the present embodiment.

As illustrated in FIG. 28, processing until determination of the motion vectors (steps S210 to S230) is an operation identical to the operation of image display device 100 according to the second embodiment illustrated in FIG. 6.

Next, movement distance calculation unit 713 calculates the movement distances for respective screen sizes by using the motion vectors of the object frame determined in step S230 and the size information illustrated in distance correspondence table 771 (step S540). In the present embodiment, movement distance calculation unit 713 calculates the movement distances corresponding to all the respective sizes illustrated in distance correspondence table 771.

Note that movement distance calculation unit 713 does not need to calculate the movement distances for all the sizes illustrated in distance correspondence table 771. For example, depending on a type of acquired moving image, or on a screen size previously registered by the viewer, movement distance calculation unit 713 may select the size for which the movement distance is to be calculated.

Next, eyeball angular velocity calculation unit 720 calculates the eyeball angular velocities for respective screen sizes by using the viewing distances illustrated in distance correspondence table 771 (step S550). Specifically, eyeball angular velocity calculation unit 720 calculates the eyeball angular velocities corresponding to the respective screen sizes based on the viewing distances corresponding to the size information illustrated in distance correspondence table 771.

Next, determination unit 730 determines whether each of the eyeball angular velocities is equal to or greater than the threshold angular velocity for each screen size (step S560). Specifically, determination unit 730 determines whether each of the eyeball angular velocities calculated for each size is equal to or greater than the threshold angular velocity stored in threshold storage unit 180. Thus, determination unit 730 generates and outputs the determination results for respective screen sizes.

Determination accumulation unit 791 stores the determination results made by determination unit 730 for respective screen sizes (step S570).

As illustrated in FIG. 28, after storing the determination results for respective sizes about the object frame (after step S570), image processing device 700 returns to determination of the object frame (step S120). Image processing device 700 repeats processing of from step S120 to step S570 to perform determination of all the frames of the moving image for respective sizes. Thus, determination accumulation unit 791 accumulates the determination results for respective sizes of the all frames.

If the object frame is a final frame (Yes in step S120), tag generation unit 792 generates the tag information (step S580). Specifically, tag generation unit 792 generates the tag information based on the determination result for each screen size, stored in determination accumulation unit 791 for each frame.

The tag information includes, for example, information that indicates a number of a first frame in the editing section of the moving image or a time position of the first frame in the moving image, a number of a final frame in the editing section of the moving image or a time position of the final frame in the moving image, and a minimum screen size for which stop processing is to be performed.

Tag adding unit 793 describes the tag information generated by tag generation unit 792 in accordance with a predetermined form as additional information to the moving image, thereby generating the moving image data with additional information (step S590). The tag information is described by, for example, a description method like MPEG or XML (eXtensible Markup Language).

After step S590, image processing device 700 ends the operation.

Summary

As described above, image processing device 700 according to the present embodiment generates the tag information based on the determination results for respective screen sizes, and adds the generated tag information as additional information to the moving image. Accordingly, when image display device 610 plays the moving image, image processing device 700 performs stop processing or replacement processing, depending on the size of the screen that displays the moving image, in accordance with the additional information to the moving image. Therefore, even without image processing device 700, a playback machine, such as image display device 610, may alleviate visually induced motion sickness and eye fatigue caused by the large movement distance of the moving image.

In addition, editing the moving image in accordance with the determination under conditions of a certain screen size allows inhibition of image degradation caused by the moving image stopping unnecessarily during viewing of the image on a screen smaller than the screen used for the determination, or by the moving image being undisplayed. This also allows inhibition of occurrence of visually induced motion sickness or eye fatigue caused by the insufficient editing section in which stop processing or replacement processing of the moving image is to be performed, during viewing of the image on a screen larger than the screen used for the determination.

The present embodiment has described the example in which the viewing distance is a standard viewing distance corresponding to the screen size, and the editing section is specified only with the screen size during playback, but the method for specifying the editing section is not limited to this example. For example, the eyeball angular velocity may be calculated for combination of the plurality of screen sizes and the plurality of viewing distances. In this case, image display device 610 acquires not only the screen sizes but also the viewing distances, and specifies the editing section depending on the combination of the screen sizes and the viewing distances.

FOURTH EMBODIMENT

A fourth embodiment describes a imaging system including a camera control device that acquires a moving image from a camera, and controls a motion of the camera based on an image processing result on the acquired moving image. The imaging system according to the present embodiment converts a movement distance, on a screen, of an object included in the moving image captured by the camera, into an eyeball angular velocity of an eyeball of a viewer, and determines whether the eyeball angular velocity is equal to or greater than a predetermined threshold angular velocity. If it is determined that the eyeball angular velocity is equal to or greater than the threshold, the imaging system controls at least one of an image-capturing direction and image-capturing position of the camera so that the eyeball angular velocity may become less than the threshold angular velocity.

Configuration of the Imaging System

Figure 29:
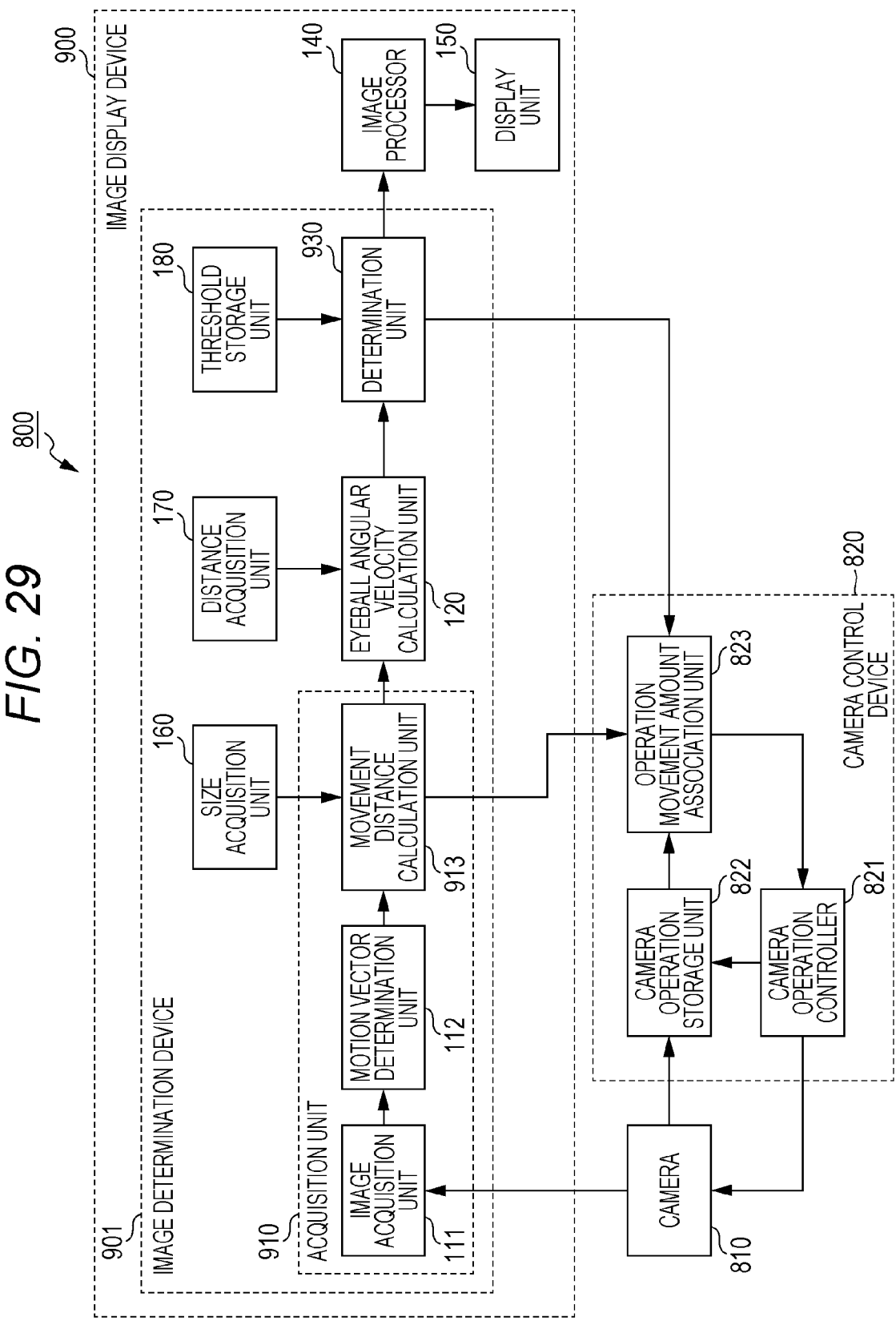
FIG. 29 is a block diagram illustrating an example of a configuration of an imaging system according to a fourth embodiment.

First, the imaging system according to the present embodiment will be described with reference to FIG. 29. FIG. 29 is a block diagram illustrating an example of a configuration of imaging system 800 according to the present embodiment.

As illustrated in FIG. 29, imaging system 800 includes image display device 900, camera 810, and camera control device 820.

Camera 810 captures an image of the object to generate the moving image. At least one of the image-capturing direction and image-capturing position of camera 810 is changeable. For example, camera 810 is fixed onto a camera platform or arm at a changeable angle (image-capturing direction).

The image-capturing direction is, for example, a direction of an optical axis of an optical system, such as a lens, included in camera 810. For example, the image-capturing direction of camera 810 can be changed by a rotational operation such as panning and tilting.

The image-capturing position is a position where camera 810 exists, and for example, is a position of the optical system such as the lens included in camera 810. For example, the image-capturing position of camera 810 can be changed by a moving operation such as dolly capturing.

Camera control device 820 controls at least one of the image-capturing direction and image-capturing position of camera 810. Specifically, based on a determination result of the eyeball angular velocity made by image display device 900, camera control device 820 controls at least one of the image-capturing direction and image-capturing position of camera 810 so that the eyeball angular velocity is less than the threshold angular velocity. As illustrated in FIG. 29, camera control device 820 includes camera operation controller 821, camera operation storage unit 822, and operation movement amount association unit 823.

When it is determined that the eyeball angular velocity is equal to or greater than the threshold angular velocity, camera operation controller 821 controls at least one of the image-capturing direction and image-capturing position of camera 810 so that the eyeball angular velocity is less than the threshold angular velocity. For example, camera operation controller 821 controls the rotational operation of camera 810, such as panning and tilting, and horizontal or vertical parallel translation. Specifically, camera operation controller 821 controls a rotational velocity of the rotational operation, that is, the angular velocity, and the movement distance of the parallel translation.

Camera operation storage unit 822 is, for example, a memory for storing the operation of camera 810. Specifically, camera operation storage unit 822 stores the operation of camera 810 based on the control by camera operation controller 821 as camera operation information.

The camera operation information is information that indicates a history of the operation of camera 810. For example, the camera operation information associates a type of operation and an amount of movement by the operation of camera 810 with information that indicates a frame of the moving image captured by camera 810, and indicates these pieces of information.

FIG. 30 is an example of the information stored in camera operation storage unit 822 according to the present embodiment. As illustrated in FIG. 30, for example, a frame section, the type of operation such as the rotational operation or parallel translation, and the amount of movement thereof are associated with one another.

Operation movement amount association unit 823 associates the information on the operation of camera 810 stored in camera operation storage unit 822 with the movement distance calculated by movement distance calculation unit 913, thereby determining a correspondence between the amount of movement of camera 810 and the movement distance.

Configuration of the Image Display Device

As illustrated in FIG. 29, image display device 900 includes image determination device 901, image processor 140, and display unit 150. Image determination device 901 differs from image determination device 101 illustrated in FIG. 5 in that image determination device 901 includes acquisition unit 910 and determination unit 930 instead of acquisition unit 110 and determination unit 130. Acquisition unit 910 differs from acquisition unit 110 illustrated in FIG. 5 in that acquisition unit 910 includes movement distance calculation unit 913 instead of movement distance calculation unit 113. The following description focuses on differences from the second embodiment.

In addition to performing processing identical to processing of movement distance calculation unit 113 illustrated in FIG. 5, movement distance calculation unit 913 outputs the movement distance, which is a calculation result, to operation movement amount association unit 823 of camera control device 820.

Determination unit 930 determines whether the eyeball angular velocity calculated by eyeball angular velocity calculation unit 120 is equal to or greater than the threshold angular velocity, in a similar manner to determination unit 130 illustrated in FIG. 5. In addition, determination unit 930 outputs the eyeball angular velocity calculated by eyeball angular velocity calculation unit 120 and the threshold angular velocity stored in threshold storage unit 180 to operation movement amount association unit 823 of camera control device 820.

Operation

Figure 31:
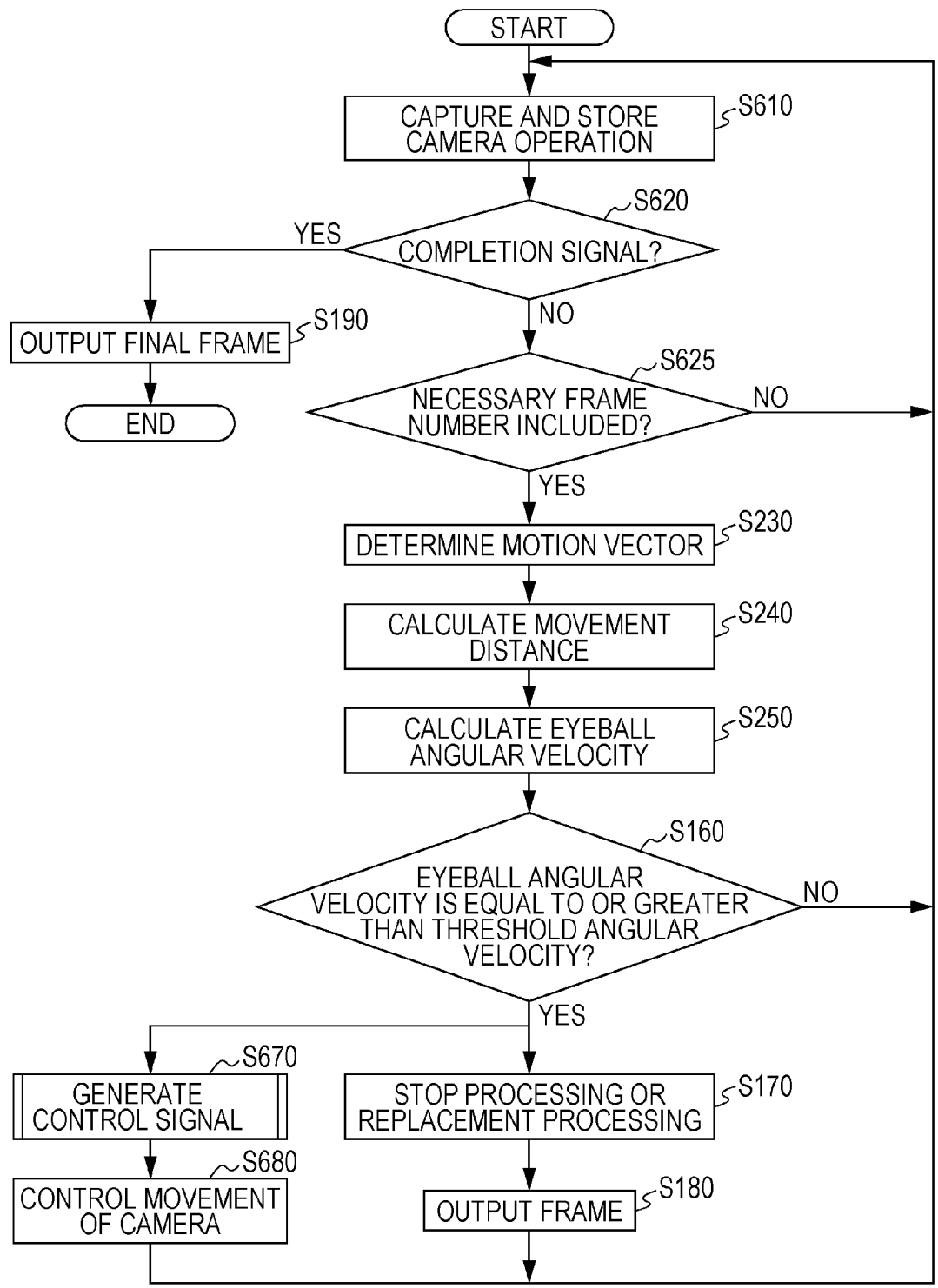
FIG. 31 is a flowchart illustrating an example of an operation of the imaging system according to the fourth embodiment.

Subsequently, an operation of imaging system 800 according to the present embodiment will be described with reference to FIG. 31. FIG. 31 is a flowchart illustrating an example of the operation of imaging system 800 according to the present embodiment.

Imaging system 800 starts processing with an unillustrated switch or the like. For example, when an image-capturing start button of camera 810, etc. is pressed, imaging system 800 starts processing.

First, camera 810 starts capturing based on control by camera operation controller 821. Simultaneously, camera operation controller 821 stores the operation of camera 810 in camera operation storage unit 822 (step S610).

The operation of camera 810 is expressed by, for example, an amount of change in at least one of the image-capturing direction and image-capturing position of camera 810. Specifically, the operation of camera 810 is a movement type of camera 810, such as rotation and parallel translation, and the amount of movement thereof. For example, camera operation controller 821 stores information that indicates an angle of panning or tilting, or a horizontal or vertical movement distance, in camera operation storage unit 822 as the camera operation information.

Next, camera operation controller 821 determines whether a completion signal is input (step S620). The completion signal is input by an unillustrated switch, etc. The completion signal is, for example, a signal that ends capturing by camera 810. If the completion signal is input (Yes in step S620), imaging system 800 outputs a final frame of the moving image data (step S190), and ends the operation.

Next, if the completion signal is not input (No in step S620), image acquisition unit 111 determines whether the moving image data acquired from camera 810 includes the frames having a number equal to or greater than a number of necessary frames (step S625). The number of necessary frames is the number of frames necessary for calculating the motion vector of the image. For example, the number of necessary frames is the number of frames including two frames at a predetermined time interval. In the present embodiment, the motion vector is calculated between two sequential frames, and thus the number of necessary frames is two.

If the acquired moving image data does not include the number of necessary frames (No in step S625), imaging system 800 returns to step S610, and waits until the frames having the number of necessary frames are acquired.

If the acquired moving image data includes the frames having the number equal to or greater than the number of necessary frames (Yes in step S625), motion vector determination unit 112 determines the motion vector (step S230). The processing in image display device 900 from determination of the motion vector until output of the object frame (steps S250 to S180) is identical to the operation of image display device 100 according to the second embodiment illustrated in FIG. 6.

If determination unit 930 determines that the eyeball angular velocity is equal to or greater than the threshold angular velocity (step S160), concurrently with stop processing or replacement processing (step S170) and outputting of the object frame (step S180), camera control device 820 generates a control signal for limiting the movement distance of the camera based on the determination result made by determination unit 930 and the calculation result made by movement distance calculation unit 913 (step S670). A method for generating the control signal will be described later with reference to FIG. 32.

Next, camera operation controller 821 outputs the control signal to camera 810 to limit the movement distance of camera 810 (step S680). After camera operation controller 821 limits the movement distance of the camera (after step S680), imaging system 800 returns to step S610, and repeats the processing described above.

Method for Generating the Control Signal

Figure 32:
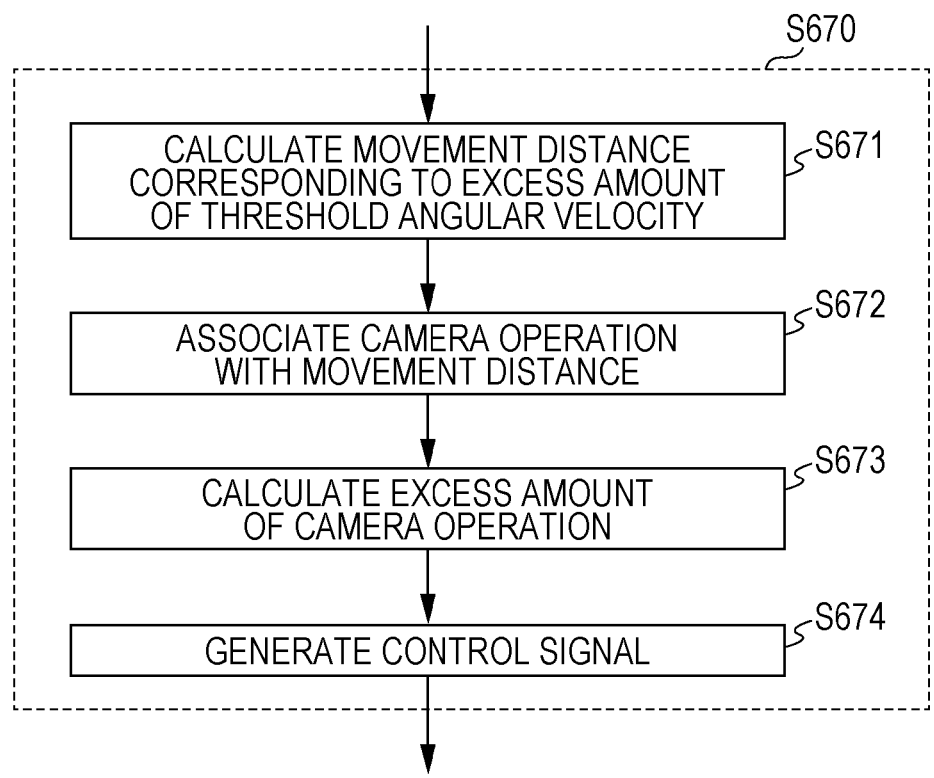
FIG. 32 is a flowchart illustrating an example of a method for generating a control signal by a camera control device according to the fourth embodiment.

Subsequently, the method for generating the control signal of step S670 illustrated in FIG. 31 will be described with reference to FIG. 32. FIG. 32 is a flowchart illustrating an example of the method for generating the control signal by camera control device 820 according to the present embodiment.

First, operation movement amount association unit 823 calculates the movement distance corresponding to an excess amount of the eyeball angular velocity (step S671).

Specifically, operation movement amount association unit 823 acquires the eyeball angular velocity and threshold angular velocity from determination unit 930, and calculates the excess amount of the eyeball angular velocity. The excess amount of the eyeball angular velocity is calculated from a difference between the eyeball angular velocity and the threshold angular velocity. Operation movement amount association unit 823 then calculates a ratio of the excess amount to the eyeball angular velocity.

Furthermore, operation movement amount association unit 823 acquires the movement distance from movement distance calculation unit 913. Operation movement amount association unit 823 then multiplies the movement distance by the calculated ratio to calculate the movement distance corresponding to the excess amount of the eyeball angular velocity.

For example, when the eyeball angular velocity is 400 degrees/second and the threshold angular velocity is 350 degrees/second, the excess amount of the eyeball angular velocity is 50 degrees/second. At this time, the ratio of the excess amount to the eyeball angular velocity is 50/400=1/8. Therefore, when the movement distance corresponding to the eyeball angular velocity is 160 cm, the movement distance corresponding to the excess amount is 20 cm.

Operation movement amount association unit 823 associates the operation of camera 810 stored in camera operation storage unit 822 with the movement distance calculated by movement distance calculation unit 913 (step S672). For example, operation movement amount association unit 823 calculates a correspondence between a unit operation of camera 810 and the movement distance. The unit operation of camera 810 is, for example, an operation of camera 810 per unit, and specifically, is rotation of 1 degree, or parallel translation of 1 cm, etc.

For example, as in the example illustrated in FIG. 30, in the frame section (frame section "23452817-23453011" in FIG. 30), when an operation of camera 810 rotating 9 degrees in an upper right direction is, for example, the amount of movement of 45 cm on a display screen of a 42-inch display (52.3 cm high by 93.0 cm wide), the amount of movement of 5 cm on the screen may be considered to correspond to 1-degree rotation of camera 810.

Next, operation movement amount association unit 823 calculates the excess amount of the camera operation (step S673). Specifically, in accordance with the correspondence associated in step S672 between the operation of camera 810 and the movement distance, operation movement amount association unit 823 converts the movement distance corresponding to the excess amount of the angular velocity calculated in step S671 into the excess amount of the camera operation.

As in the example used in step S672, a case is taken as an example where the movement distances of 5 cm on the screen corresponds to 1-degree rotation of camera 810. In this case, when the movement distance corresponding to the excess amount of the eyeball angular velocity calculated in step S671 is 20 cm, the excess amount of rotation of camera 810 is 4 degrees.

Next, based on the excess amount of the camera operation calculated in step S673, camera operation controller 821 determines a limit value for the camera operation, and generates the control signal based on the determined limit value (step S674). For example, when the excess amount of rotation of camera 810 is 4 degrees, the original camera operation is 9-degree rotation in the upper right direction, and thus rotation should be limited to 5 degrees. Therefore, camera operation controller 821 determines a velocity limit that limits a maximum value of rotation in an upper right direction in the frame section to 5 degrees. Camera operation controller 821 then generates the control signal for performing control to prohibit a camera manipulation at a velocity equal to or greater than the velocity limit.

Summary

As described above, in the moving image data captured by camera 810, imaging system 800 according to the present embodiment determines whether the eyeball angular velocity caused by movement of the image is equal to or greater than the threshold angular velocity. When the eyeball angular velocity is equal to or greater than the threshold angular velocity, that is, when the moving image data may cause visually induced motion sickness and eye fatigue, camera control device 820 limits the movement distance of camera 810 that causes movement of the image.

Accordingly, in the moving image captured after the limitation, the image moves at a velocity that is unlikely to cause visually induced motion sickness and eye fatigue. Therefore, this can alleviate visually induced motion sickness and eye fatigue of the viewer. Control of the camera according to the present embodiment is effective, for example, in capturing of a distant place by extreme zooming, or in capturing of a fine object through magnification.

OTHER EMBODIMENTS

The image display device, image processing device, image display system, imaging system, and image processing method according to one or more aspects have been described above based on the embodiments. However, the present disclosure is not limited to these embodiments. Embodiments to which various modifications conceivable by a person skilled in the art are made, and embodiments made by combining elements of different embodiments are also included within the scope of the present disclosure, as long as such embodiments do not depart from the spirit of the present disclosure.

For example, in the above-described embodiments and variations thereof, description has been given of the examples in which the viewer is one person, but the viewer may be two or more persons. When the viewer is two or more persons, distance acquisition unit 170 acquires the viewing distances of all the respective viewers, and outputs a shortest viewing distance from among those acquired viewing distances. This leads to making a determination under conditions of the viewer with the shortest viewing distance and a largest proportion of the screen to a visual field. This allows a safest determination with respect to occurrence of visually induced motion sickness and eye fatigue.

For example, in the above-described embodiments and variations thereof, when acquiring information, the acquisition unit (for example, acquisition unit 110) may acquire the information from outside of the image display device by user input, etc., or may acquire the information by reading the information from the storage unit included in the image display device. Such information includes, for example, the size of the screen that the viewer views, movement distances, time interval t, viewing distance d, etc.

In the above-described embodiments, each element may be implemented by dedicated hardware, or may be implemented through execution of a software program suitable for each element. Each element may be implemented by a program execution unit, such as a CPU and a processor, reading and executing the software program recorded in a recording medium, such as a hard disk and a semiconductor memory. Here, the software that implements the image display device or image processing device of the above-described embodiments is the following program.

That is, a non-transitory computer-readable recording medium storing a program causes a computer to acquire: (i) a size of a screen a viewer views, (ii) a movement distance moved by an object included in a moving image including a plurality of frames between sequential two of the frames on the screen that has the size, (iii) a time interval between the two sequential frames, and (iv) a viewing distance that is a distance between the viewer and the screen; to calculate an angular velocity of an eyeball of the viewer viewing the object as an eyeball angular velocity by an equation: eyeball angular velocity=(2 arctan (s/2d))/t, where the movement distance is s, the time interval is t, and the viewing distance is d; to determine whether the calculated eyeball angular velocity is equal to or greater than a lower limit of an eyeball angular velocity in a saccadic eye movement; (a) to stop the moving image or to replace the moving image with a single color image, in a case where it is determined that the calculated eyeball angular velocity is equal to or greater than the lower limit of the eyeball angular velocity in the saccadic eye movement, (b) to not stop the moving image and to not replace the moving image with the single color image, in a case where it is determined that the calculated eyeball angular velocity is less than the lower limit of the eyeball angular velocity in the saccadic eye movement; and to display the stopped moving image or the replaced single color image, or the moving image that is neither stopped nor replaced.

The above-described program may be recorded in a recording medium, and distributed or circulated. For example, installing the distributed program in devices and causing processors of the devices to execute the program makes it possible to cause the devices to perform various kinds of processing.

Part or all of the elements that constitute each device described above may include one system LSI (Large Scale Integration). The system LSI is a super-multifunctional LSI manufactured by integration of a plurality of elements on one chip, and specifically is a computer system that includes a microprocessor, a ROM, a RAM, etc. The ROM stores the computer program. The system LSI achieves functions thereof by the microprocessor loading the computer program from the ROM to the RAM and executing operations such as calculation in accordance with the loaded computer program.

Part or all of the elements that constitute each device described above may include an IC card detachable from the device or a standalone module. The IC card or module is a computer system that includes a microprocessor, a ROM, a RAM, etc. The IC card or module may include the above-described super-multifunctional LSI. The IC card or module achieves functions thereof by the microprocessor operating in accordance with the computer program. This IC card or module may be tamper-proof.

The present disclosure may be implemented by the computer program or digital signal recorded in a computer-readable recording medium, such as a flexible disk, a hard disk, a CD-ROM, a MO, a DVD, a DVD-ROM, a DVD-RAM, a BD (Blu-Ray Disc (registered trademark)), and a semiconductor memory, for example. Furthermore, the present disclosure may be implemented by the digital signal recorded in these recording media.

The computer program or digital signal according to the present disclosure may be transmitted via electric telecommunication lines, wireless or wired communication lines, a network represented by the Internet, data broadcasting, etc.

The present disclosure may be implemented by another independent computer system through recording of the above program or digital signal in the recording medium for transportation, or through transportation of the above program or digital signal via the network or the like.

In the above-described embodiments, each processing (each function) may be implemented by a single device (system) performing central processing, or may be implemented by a plurality of devices performing distributed processing.

Various modifications, substitutions, additions, and exclusions can be made to the above-described embodiments within the scope of the claims and equivalents thereof.

The present disclosure may be widely used for devices that capture, edit, and display moving images, and is useful in outputting moving images to a display, for example, a movie camera, a display, a recording playback device, a monitor for robotic manipulation, etc. In particular, for example, the present disclosure is useful in outputting, on a large display, a moving image magnified and captured.

REFERENCE SINGS LIST 10, 100, 300, 400, 500, 610, 900 image display device
20 measurement unit
31, 33 flower
32 grass
34 butterfly
40 camera
41, 42, 43, 44, 61, 62, 71, 72, 73, 74, 80 frame
51 object frame
52 reference frame
53, 54, 55 block
53a, 55a center of gravity
56 vector
63, 64, 75, 76, 77, 78 motion vector
81, 82 block
91, 92 region
101, 301, 401, 501, 701, 901 image determination device
110, 310, 710, 910 acquisition unit
111 image acquisition unit
112, 312 motion vector determination unit
113, 313, 713, 913 movement distance calculation unit
120, 320, 420, 720 eyeball angular velocity calculation unit
130, 330, 530, 730, 930 determination unit
140 image processor
150 display unit
160, 612 size acquisition unit
170 distance acquisition unit
180 threshold storage unit
200 screen
210 viewer
211 eyeball
312a motion vector calculation unit
312b region division unit
470, 570, 770 storage unit
471, 771 distance correspondence table
571 threshold adjustment table
590 screen ratio calculation unit
600 image display system
611 moving image data storage unit
613 tag information analyzer
614 editing unit
615 display unit
700 image processing device
750 output unit
790 image editing unit
791 determination accumulation unit
792 tag generation unit
793 tag adding unit
800 imaging system
810 camera
820 camera control device
821 camera operation controller
822 camera operation storage unit
823 operation movement amount association units

What is claimed is:

1. An image display device comprising:
a display; and
circuitry which, in operation:
acquires (i) a size of a screen a viewer views, (ii) a movement distance moved by at least one object included in a moving image including a plurality of frames between sequential two of the frames on the screen that has the size, (iii) a time interval between the sequential two of the frames, and (iv) a viewing distance that is a distance between the viewer and the screen;
calculates an angular velocity of an eyeball of the viewer viewing the at least one object as an eyeball angular velocity by an equation:

eyeball angular velocity=$(2 \arctan(s/2d))/t$, where the movement distance is s, the time interval is t, and the viewing distance is d;
determines whether the calculated eyeball angular velocity is equal to or greater than a lower limit of an eyeball angular velocity in a saccadic eye movement;
stops the moving image or replaces the moving image with a single color image, in a case where the calculated eyeball angular velocity is determined to be equal to or greater than the lower limit of the eyeball angular velocity in the saccadic eye movement,
wherein
the display unit that displays the moving image stopped by or the single color image replaced by the circuitry.

2. The image display device according to claim 1, wherein
the moving image includes the at least one object comprising a plurality of objects,
the circuitry calculates the eyeball angular velocities of the viewer with respect to the plurality of respective objects, and
the circuitry stops the moving image or replaces the moving image with the single color image, in a case where all of the calculated eyeball angular velocities are determined to be equal to or greater than the lower limit of the eyeball angular velocity in the saccadic eye movement.

3. The image display device according to claim 1, wherein
the circuitry determines a motion vector that indicates an amount of movement and a direction of movement of the at least one object between the sequential two of the frames; and
the circuitry calculates a size of the motion vector on the screen as the movement distance, based on the size of the screen.

4. The image display device according to claim 3, wherein
the circuitry:
divides the image included in the sequential two of the frames into a plurality of blocks;
calculates a degree of difference between each of a plurality of first blocks included in a first frame of the sequential two of the frames, and each of a plurality of second blocks included in a second frame of the sequential two of the frames; and
determines a vector that connects a center of gravity of each of the first blocks and a center of gravity of each of the second blocks in which the calculated degree of difference becomes smallest, as the motion vector.

5. The image display device according to claim 4, wherein
the circuitry divides the image included in the sequential two of the frames into the plurality of blocks so that a number of blocks may become larger in a central portion of each of the frames than in a peripheral portion of each of the frames.

6. The image display device according to claim 4, wherein
when the motion vectors of respective two of the blocks included in one of the sequential two of the frames are similar, the circuitry combines the two of the blocks into one block.

7. A method for displaying an image on a display, the method comprising:
acquiring (i) a size of a screen a viewer views, (ii) a movement distance moved by an object included in a moving image including a plurality of frames between sequential two of the frames on the screen that has the size, (iii) a time interval between the sequential two of the frames, and (iv) a viewing distance that is a distance between the viewer and the screen;
calculating an angular velocity of an eyeball of the viewer viewing the object as an eyeball angular velocity by an equation:

eyeball angular velocity=$(2 \arctan(s/2d))/t$, where the movement distance is s, the time interval is t, and the viewing distance is d;
determining whether the calculated eyeball angular velocity is equal to or greater than a lower limit of an eyeball angular velocity in a saccadic eye movement;
adding, to the moving image, tag information for stopping the moving image or for replacing the moving image with a single color image, in a case where the calculated eyeball angular velocity is determined to be equal to or greater than the lower limit of the eyeball angular velocity in the saccadic eye movement; and
outputting the moving image which the tag information has been added to the display.

8. A non-transitory computer readable medium with an executable program stored thereon, wherein the program instructs circuitry to perform the following steps:
acquiring (i) a size of a screen a viewer views, (ii) a movement distance moved by an object included in a moving image including a plurality of frames between sequential two of the frames on the screen that has the size, (iii) a time interval between the sequential two of the frames, and (iv) a viewing distance that is a distance between the viewer and the screen;
calculating an angular velocity of an eyeball of the viewer viewing the object as an eyeball angular velocity by an equation:

eyeball angular velocity=$(2 \arctan(s/2d))/t$, where the movement distance is s, the time interval is t, and the viewing distance is d;
determining whether the calculated eyeball angular velocity is equal to or greater than a lower limit of an eyeball angular velocity in a saccadic eye movement;
adding, to the moving image, tag information for stopping the moving image or for replacing the moving image with a single color image, in a case where the calculated eyeball angular velocity is determined to be equal to or greater than the lower limit of the eyeball angular velocity in the saccadic eye movement; and
outputting the moving image which the tag information has been added to the display.

9. An image processing device, comprising:
a memory including a size of a screen a viewer views and a viewing distance that is a distance between the viewer and the screen;

an output terminal; and
circuitry which, in operation:
- acquires (i) the size of the screen the viewer views, (ii) a movement distance moved by at least one object included in a moving image including a plurality of frames between sequential two of the frames on the screen that has the size, (iii) a time interval between the sequential two of the frames, and (iv) the viewing distance that is a distance between the viewer and the screen;
- calculates an angular velocity of an eyeball of the viewer viewing the at least one object as an eyeball angular velocity by an equation:

$$\text{eyeball angular velocity} = (2 \arctan(s/2d))/t,$$

where the movement distance is s, the time interval is t, and the viewing distance is d;
- determines whether the calculated eyeball angular velocity is equal to or greater than a lower limit of an eyeball angular velocity in a saccadic eye movement;
- stops the moving image or replaces the moving image with a single color image, in a case where the calculated eyeball angular velocity is determined to be equal to or greater than the lower limit of the eyeball angular velocity in the saccadic eye movement, wherein
the moving image stopped by or the single color image replaced by the circuitry is output through the output terminal.

* * * * *